(12) United States Patent
Ertas et al.

(10) Patent No.: US 12,000,359 B2
(45) Date of Patent: Jun. 4, 2024

(54) CASCADE THRUST REVERSER ACTUATION ASSEMBLY FOR A TURBOFAN ENGINE

(71) Applicant: General Electric Company, Schenectady, NY (US)

(72) Inventors: Bugra Han Ertas, Niskayuna, NY (US); Trevor Howard Wood, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/890,572

(22) Filed: Aug. 18, 2022

(65) Prior Publication Data

US 2024/0060458 A1 Feb. 22, 2024

(51) Int. Cl.
*F02K 1/76* (2006.01)
*F02K 1/72* (2006.01)

(52) U.S. Cl.
CPC ............... *F02K 1/763* (2013.01); *F02K 1/72* (2013.01); *F05D 2220/323* (2013.01); *F05D 2260/50* (2013.01)

(58) Field of Classification Search
CPC .......... F05D 2220/323; F05D 2260/57; F05D 2270/051; F02K 1/70; F02K 1/74; F02K 1/72; F02K 1/625; F02K 1/763; F02K 1/76; F02K 1/1207; F02K 1/766
See application file for complete search history.

(56) References Cited

U.S. PATENT DOCUMENTS

| | | | |
|---|---|---|---|
| 3,861,822 A | 1/1975 | Wanger | |
| 4,000,868 A | 1/1977 | Gregor | |
| 9,126,690 B2 | 9/2015 | Moradell-Casellas | |
| 9,874,176 B2 * | 1/2018 | Nakhjavani | F02K 1/763 |
| 10,041,443 B2 | 8/2018 | Foutch | |
| 10,077,739 B2 | 9/2018 | James | |
| 10,208,708 B2 * | 2/2019 | Gormley | F02K 1/763 |
| 10,378,481 B2 * | 8/2019 | Fert | F02K 1/70 |
| 10,514,004 B2 | 12/2019 | Crawford | |
| 10,533,521 B2 | 1/2020 | Harpal et al. | |
| 10,634,001 B2 | 4/2020 | Scotti Del Greco et al. | |
| 10,655,564 B2 | 5/2020 | Gormley | |

(Continued)

FOREIGN PATENT DOCUMENTS

| | | | | |
|---|---|---|---|---|
| EP | 3176415 A1 * | 6/2017 | | F01D 25/24 |
| GB | 2156004 A | 10/1985 | | |

OTHER PUBLICATIONS

EP-3176415-A1 English Translation (Year: 2017).*

(Continued)

*Primary Examiner* — Anthony Ayala Delgado
(74) *Attorney, Agent, or Firm* — Dority & Manning, P.A.

(57) ABSTRACT

A cascade thrust reverser assembly is provided for a turbofan engine. The turbofan engine includes a nacelle assembly defining a bypass passage, and the cascade thrust reverser assembly includes at least one cascade assembly configured to be at least partially enclosed by the nacelle assembly. The cascade assembly may further include a plurality of cascade segments and an actuation assembly operably connected to the plurality of cascade segments, wherein the actuation assembly is configured to increase an axial extent of the cascade assembly and rotate the plurality of cascade segments.

20 Claims, 25 Drawing Sheets

(56) References Cited

U.S. PATENT DOCUMENTS

| | | |
|---|---|---|
| 10,718,221 B2 | 7/2020 | Rice |
| 10,859,036 B2 | 12/2020 | Morgan et al. |
| 2018/0045140 A1 | 2/2018 | Bond |

OTHER PUBLICATIONS

You et al., Study of Flow Separation Over an Airfoil with Synthetic Jet Control Using Large-Eddy Simulation By, Stanford Edu, Center for Turbulence Research Annual Research Briefs, 2007, 11 Pages.

* cited by examiner

CASCADE THRUST REVERSER ACTUATION ASSEMBLY FOR A TURBOFAN ENGINE

FIELD

The present disclosure generally relates to thrust reversers in a turbofan engine.

BACKGROUND

Turbofan engines generally include a fan and a turbomachine arranged in flow communication with one another. The turbomachine of the turbofan engine generally includes, in serial flow order, a compression section, a combustion section, a turbine section, and an exhaust section. In operation, the air provided to the turbomachine flows through the compression section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Thrust reverser systems can be employed in turbofan engines to reduce a landing distance or a load on braking systems of an aircraft. Thrust reverser systems can be bulky, increasing the engine size and weight. For example, some known thrust reverser systems require a relatively large nacelle length, thus increasing propulsion system weight and drag and reducing engine efficiency. Furthermore, as fan sizes increase to improve propulsive efficiency, there is an increasing need to reduce the thickness of the nacelle to reduce drag. Both these effects lead to challenges in developing a thrust reverser system that is more compact than traditionally used to enable overall efficiency benefits for the propulsion system in flight. Accordingly, the inventors of the present disclosure have found that there is a need for actuation of one or more features to reduce a weight and/or overall size of a turbofan engine.

BRIEF DESCRIPTION OF THE DRAWINGS

The accompanying drawings, which are incorporated in and constitute a part of this specification, illustrate embodiments of the present disclosure and, together with the description, serve to explain principles of the disclosure.

Other aspects and advantages of the embodiments disclosed herein will become apparent upon consideration of the following detailed description, wherein similar or identical structures may have similar or identical reference numerals.

DETAILED DESCRIPTION

Figure 1:
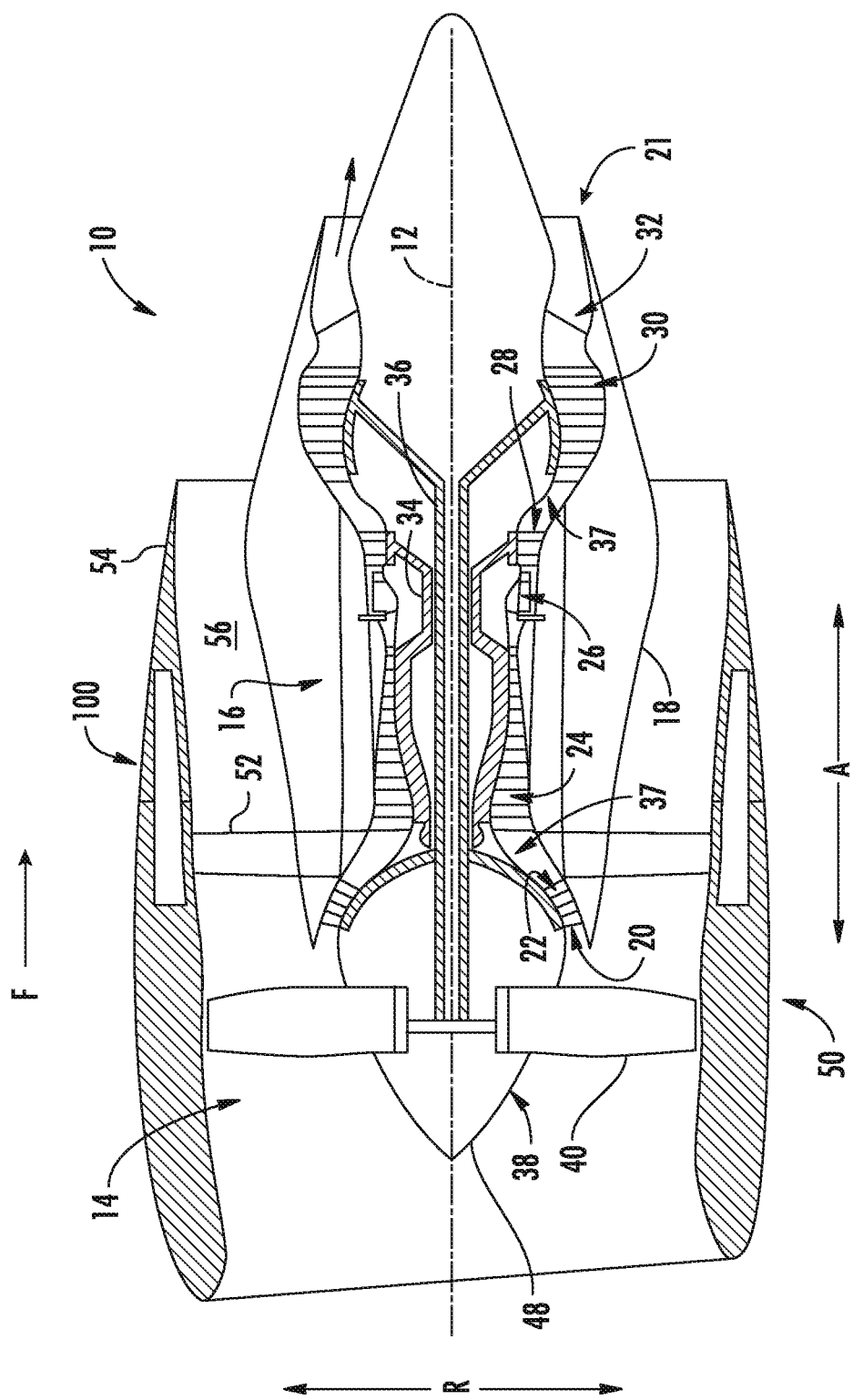
FIG. 1 is a schematic cross-sectional view of an exemplary turbofan engine according to various embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components.

The terms "forward" and "aft" refer to relative positions within a turbofan engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, in certain contexts, the approximating language may refer to being within a 10% margin.

Here and throughout the specification and claims, range limitations may be combined and interchanged, such that ranges identified include all the sub-ranges contained therein unless context or language indicates otherwise. For example, all ranges disclosed herein are inclusive of the endpoints, and the endpoints are independently combinable with each other.

The term "turbomachine" refers to a machine including one or more compressors, a heat generating section (e.g., a combustion section), and one or more turbines that together generate a torque output.

The term "turbofan engine" refers to an engine having a turbomachine as all or a portion of its power source. Example turbofan engines include gas turbine engines, including turboprop engines, turbojet engines, turboshaft engines, etc., as well as electric or hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

In some embodiments, one or more components of the turbofan engine described hereinbelow may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein enable the production of airfoils, turbine vanes and rotors, compressor vanes and rotors, and/or fan blades. Such components may have unique features, configurations, thicknesses, materials, densities, fluid passageways, headers, and mounting structures that may not have been possible or practical using prior manufacturing methods. Some of these features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The present application is directed generally towards a turbofan engine including an expanding cascade thrust reverser assembly (e.g., stowed in a nacelle of the turbofan engine in a contracted configuration and deployed to an expanded configuration). In particular, the present disclosure is directed to a cascade thrust reverser assembly for a turbofan engine having a nacelle assembly, the cascade thrust reverser assembly including a cascade assembly configured to be at least partially enclosed by the nacelle assembly. The cascade assembly may include one or more cascade members forming a cascade segment, with the one or more cascade members movable between a stowed configuration and a deployed configuration. In the stowed configuration, the one or more cascade members forming the cascade segment define a first radial extent, and in the deployed configuration the one or more cascade members forming the cascade segment define a second radial extent. The second radial extent is greater than the first radial extent.

The cascade segment may be formed of a single cascade member that rotates between the stowed and deployed configurations to increase its radial extent. Alternatively, the cascade segment may be formed of two or more cascade members that move, e.g., relative to one another between the stowed and deployed configurations to increase the radial extent of the cascade segment. The cascade assembly may include a plurality of cascade segments to provide a desired redirection of airflow in the deployed configurations to generate a reverse thrust.

The authors of the present disclosure have discovered that such a configuration may allow for a more compact nacelle, potentially allowing the engine to be installed on an aircraft wing in a manner that may result in an overall lighter engine with less drag during operation. In particular, the authors of the present disclosure have found that providing for a cascade thrust reverser assembly with cascade segments that expand along a radial direction may enable a more effective thrust reverser and a more compact nacelle.

Referring now to the drawings, FIG. 1 is a schematic cross-sectional view of a turbofan engine in accordance with an exemplary embodiment of the present disclosure. More particularly, for the embodiment of FIG. 1, the turbofan engine is a high-bypass turbofan jet engine 10, referred to herein as "turbofan engine 10." As shown in FIG. 1, the turbofan engine 10 defines an axial direction A (extending parallel to a longitudinal centerline 12 of the turbofan engine 10 provided for reference) and a radial direction R. An airflow direction F is also defined, describing the general directional flow of air through the turbofan engine 10 during normal operation such as takeoff and cruise. The turbofan engine 10 may also define a circumferential direction C (see FIG. 2) extending circumferentially about the axial direction A. In general, the turbofan engine 10 includes a fan section 14 and a turbomachine 16 disposed downstream from the fan section 14.

The exemplary turbomachine 16 depicted is generally enclosed within a substantially tubular outer casing 18 that defines an annular inlet 20 and an annular exhaust 21. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37 therethrough.

For the embodiment depicted, the fan section 14 includes a fixed pitch fan 38 having a plurality of fan blades 40. The fan blades 40 may for example each be attached to a disk with the fan blades 40 and disk together rotatable about the longitudinal centerline 12 by the LP shaft 36. For the embodiment depicted, the turbofan engine 10 is a direct drive turbofan engine, such that the LP shaft 36 drives the fan 38 of the fan section 14 directly, without use of a reduction gearbox. However, in other exemplary embodiments of the present disclosure, the turbofan engine 10 may include a reduction gearbox, in which case the LP shaft 36 may drive the fan 38 of the fan section 14 across the gearbox.

Referring still to the exemplary embodiment of FIG. 1, the disk 42 is covered by a rotatable front hub 48 aerodynamically contoured to promote an airflow through the plurality of fan blades 40. Additionally, the exemplary turbofan engine 10 includes an annular nacelle assembly 50 that circumferentially surrounds the fan 38 and/or at least a portion of the turbomachine 16. For the embodiment depicted, the nacelle assembly 50 is supported relative to the turbomachine 16 by a plurality of circumferentially-spaced outlet guide vanes 52. Moreover, a downstream section 54 of the nacelle assembly 50 extends over an outer portion of the outer casing 18 so as to define a bypass airflow passage 56 therebetween. The ratio between a first portion of air through the bypass airflow passage 56 and a second portion of air through the inlet 20 of the turbomachine 16, and through the core air flowpath 37, is commonly known as a bypass ratio.

Additionally, as will be discussed in greater detail with reference to the exemplary embodiments below, the nacelle assembly 50 includes a thrust reverser assembly 100, which is depicted as a cascade thrust reverser assembly in a stowed configuration.

It should be appreciated, however, that the exemplary turbofan engine 10 depicted in FIG. 1 is by way of example only, and that in other exemplary embodiments, the turbofan engine 10 may have any other suitable configuration, including, for example, any other suitable number of shafts or spools, a pitch change mechanism for the fan 38 (which would no longer be a fixed pitch fan), a reduction gearbox between the LP shaft 36 and the fan 38, etc.

Figure 2:
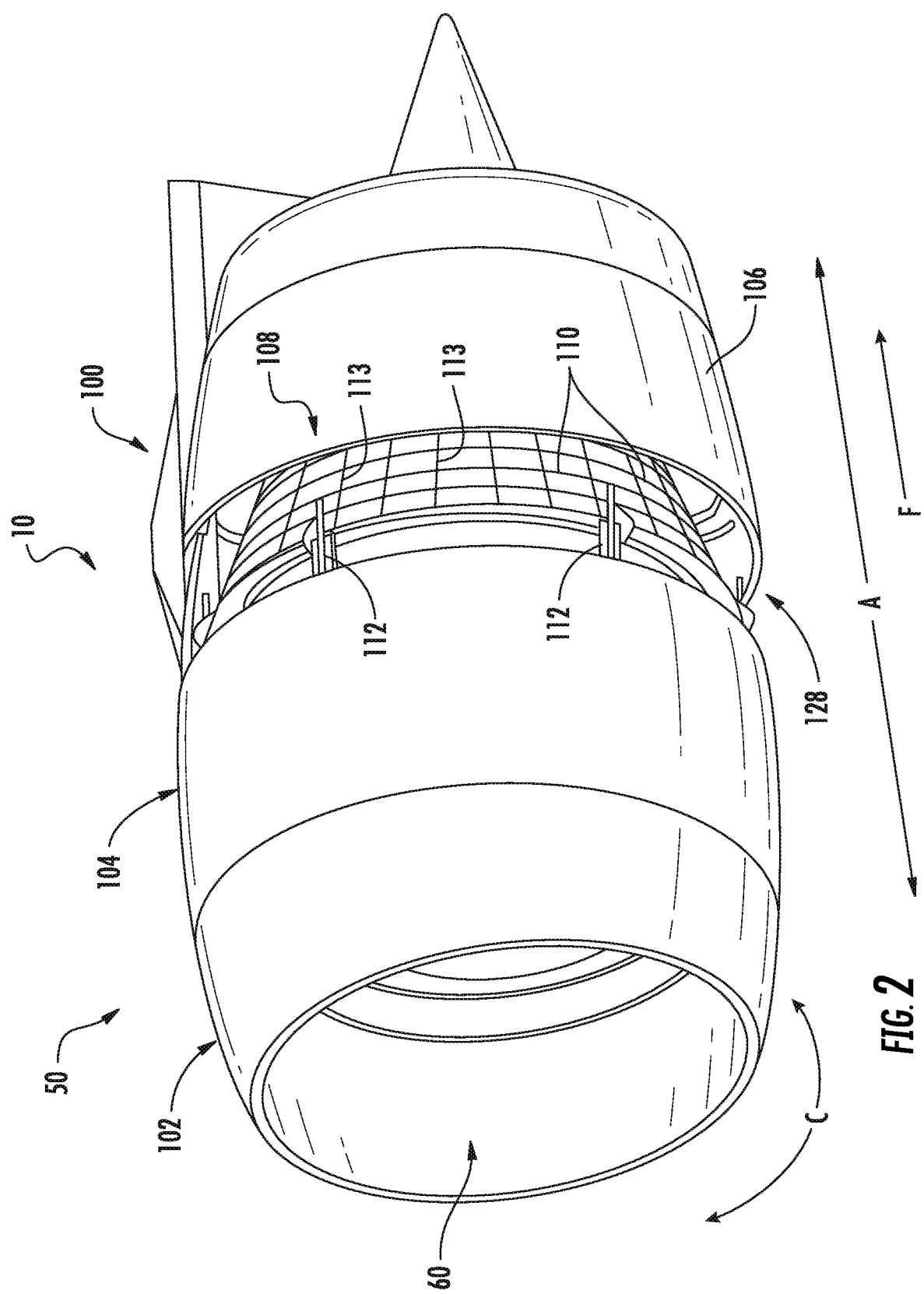
FIG. 2 is a perspective view of an exemplary turbofan engine according to an exemplary embodiment of the present disclosure having a thrust reverser assembly in a deployed configuration.
Figure 3:
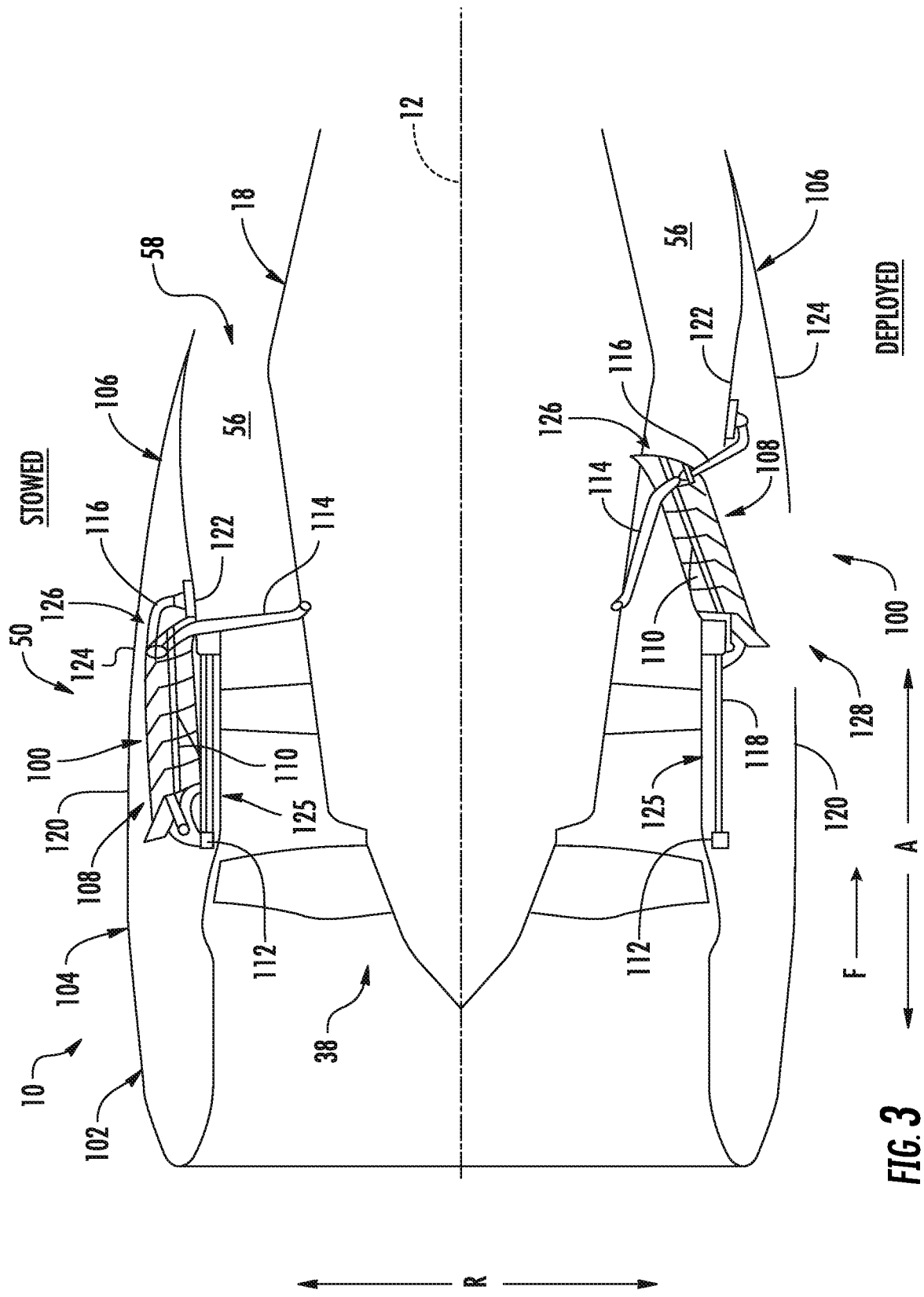
FIG. 3 is an axial, side, sectional view of the exemplary turbofan engine of FIG. 2 depicting the thrust reverser assembly in a stowed configuration and in a deployed configuration in the upper and lower halves of the view, respectively.

Referring now to FIGS. 2 and 3, a turbofan engine 10 in accordance with another exemplary embodiment of the present disclosure is provided. The exemplary turbofan engine 10 depicted in FIGS. 2 and 3 includes a thrust reverser assembly 100 in accordance with an exemplary embodiment of the present disclosure. Specifically, FIG. 2 provides a perspective view of the exemplary turbofan engine 10 with the thrust reverser assembly 100 in a deployed configuration; and FIG. 3 provides a cross-sectional schematic view of the exemplary turbofan engine 10 along an axial direction A, an upper half of which depicting the thrust reverser assembly 100 in a stowed configuration and a lower half of which depicting the thrust reverser assembly 100 in a deployed configuration. The exemplary turbofan engine 10 of FIGS. 2 and 3 may be configured in substantially the same manner as the exemplary turbofan engine 10 of FIG. 1. Accordingly, the same numbering may refer to the same or functionally equivalent components.

As depicted, a nacelle assembly 50 of the turbofan engine 10 generally includes an inlet assembly 102, a fan cowl 104, and the thrust reverser assembly 100. The inlet assembly 102 is positioned at a forward end of the nacelle assembly 50 and the fan cowl 104 is positioned aft of the inlet assembly 102 and at least partially surrounds a fan 38. The thrust reverser assembly 100 may, in turn, be positioned at least partially or substantially completely within the fan cowl 104 when in the stowed configuration. As is depicted, an outer casing 18 of a turbomachine 16 defines a radially inward boundary of a bypass airflow passage 56 and the nacelle assembly 50 defines a radially outward boundary of the bypass airflow passage 56. Bypass air of the turbofan engine 10 passes through the bypass airflow passage 56 and exits through a fan exit nozzle 58 during certain operations.

The thrust reverser assembly 100 of FIGS. 2 and 3 may include a translating cowl (transcowl) 106 slidably mounted to the fan cowl 104, and a cascade assembly 108. As evident from FIG. 2, the transcowl 106 is the aft-most section of the nacelle assembly 50, located aft of the fan cowl 104 and circumscribing the outer casing 18 of the turbomachine 16. When in a deployed configuration (see FIG. 2 and lower half of FIG. 3), the cascade assembly 108 is also located at least partially aft of the fan cowl 104 and circumscribes the outer casing 18 of the turbomachine 16. By contrast, when in a stowed configuration (see top portion of FIG. 3) the cascade assembly 108 is stowed substantially completely within the fan cowl 104. Notably, as the cascade assembly 108 is stowed substantially completely within the fan cowl 104 when in the stowed configuration (and slides/translates into the deployed configuration generally along the axial direction A), inclusion of a stowable configuration of the cascade assembly 108 may allow for reduced overall dimensions of the nacelle assembly 50.

The cascade assembly 108 may also be provided in an axially-fixed configuration. For example, cascade assembly 108 may be fixed in the axial direction A relative to the fan cowl 104. In this example, translating of the transcowl 106 aft in the axial direction A relative to the fan cowl 104 and the cascade assembly 108 can reveal the cascade assembly 108 in the deployed configuration as shown in FIG. 2 and the lower halves of FIGS. 3 and 4.

It should be understood that axial movement of the cascade assembly 108 may be employed in various embodiments independent of other movements or transformations of the cascade assembly 108. For example, the cascade assembly 108 may be lowered in the radial direction R as depicted in the lower half of FIG. 3 without first undergoing any axial movement or sliding within the turbofan engine 10. Furthermore, it should be understood that expansion of the cascade assembly 108 in the radial direction R, as described with reference to FIGS. 5-32, may also be independently combined with axial sliding and/or radial lowering of the cascade assembly 108.

Referring still to FIGS. 2 and 3, the cascade assembly 108 depicted is formed of and includes a plurality of individual cascade segments 110 that are circumferentially spaced around a circumference of the nacelle assembly 50. As evident from FIG. 3, the cascade segments 110 of the cascade assembly 108 may be adapted to deploy from an axially stowed configuration, shown in the upper half of FIG. 3, to an axially deployed configuration shown in the lower half of FIG. 3. For the embodiment depicted, the transcowl 106 and cascade assembly 108 are adapted to be translated in unison in an aft direction of the turbofan engine 10, generally along the axial direction A, when the thrust reverser assembly 100 is moved from the stowed configuration to the deployed configuration (i.e., is deployed). More particularly, to deploy the cascade assembly 108 into the bypass airflow passage 56, the transcowl 106 is moved aft from the fan cowl 104 generally along the axial direction A and the cascade assembly 108 is translated and pivoted, causing a flow of bypass air within the bypass airflow passage 56 to be diverted through the deployed cascade assembly 108 to provide a thrust reversal effect. For this purpose, FIGS. 2 and 3 represent the cascade segments 110 as pivotally coupled to the nacelle assembly 50 through respective actuation assemblies 112 mounted to the nacelle assembly 50. The actuation assemblies 112 are configured to move the thrust reverser assembly 100 from the stowed configuration to the deployed configuration. The actuation assemblies 112 can be of any suitable type and can be driven by, e.g., pneumatic, hydraulic, or electric motors. Additionally, the cascade segments 110 are depicted as coupled to a fixed structure of the nacelle assembly 50 with guided connections 125. Further, FIG. 3 represents the cascade segments 110 as pivotally coupled to the outer casing 18 of the turbomachine 16 with drag links 114, and represent the transcowl 106 as pivotally coupled to the cascade segments 110 through drag links 116 for translation therewith.

Translation of the cascade assembly 108 and transcowl 106 in the aft direction along the axial direction A causes the cascade segments 110 to be deployed into the bypass airflow passage 56 in a manner represented in FIG. 3. From FIG. 3 it can be appreciated that, when stowed, the cascade segments 110 can be enclosed and completely concealed between an inner engine fan case 118 and an outer engine fan case 120 of the fan cowl 104, and, for the embodiment depicted, an inner wall 122 and an outer wall 124 of the transcowl 106. Accordingly, when the thrust reverser assembly 100 is stowed, the inner engine fan case 118 and the inner wall 122 of the transcowl 106 define a portion of the radially outer flow surface of the bypass airflow passage 56 and completely separate the cascade assembly 108 from the bypass airflow passage 56.

By contrast, when moved to the deployed configuration, the cascade segments 110 of the thrust reverser assembly 100 may, but are not required to, extend entirely across a radial width of the bypass airflow passage 56 so that an aft end 126 of the thrust reverser assembly 100 contacts, or nearly contacts, the outer casing 18 of the turbomachine 16. As represented in FIG. 3, as bypass air within the bypass airflow passage 56 encounters the cascade assembly 108, the air is diverted by openings in the cascade segments 110 and expelled through a circumferential opening 128 defined between the inner and outer engine fan cases 118, 120 and the inner and outer walls 122, 124 of the transcowl 106. As depicted in FIG. 3, each cascade segment 110 can be equipped with an extension (not shown) that promotes the capture of air flowing along the outer surface of the outer casing 18 of the turbomachine 16.

As evident from the above, the embodiment depicted incorporates to some extent a role of a blocker door function into the cascade assembly 108, and does so by rotation of the cascade assembly 108. To serve in this role, each cascade segment 110, when in the deployed configuration, must have a sufficient length and be sufficiently angled downward to, in certain embodiments, completely or substantially completely block the bypass airflow passage 56.

It should be appreciated, however, that the exemplary thrust reverser assembly 100 depicted is provided by way of example only, and that in other exemplary embodiments, the thrust reverser assembly 100 may have any other suitable configuration. For example, while the embodiment of FIGS. 2 and 3 depict each cascade segment 110 as equipped with two different drag links 114 and 116 rotatably coupled near the aft end 126 of each cascade segment 110 to impart and control the rotational movement of the cascade segment 110 during deployment, in other exemplary embodiments the drag link 114 may be eliminated in order to further decrease aerodynamic drag and other flow perturbations that can cause aerodynamic or acoustic inefficiencies.

Additionally, it should be appreciated that the translational and/or rotational motion of the cascade segments 110 is not dependent on any particular type of cascade design, aside from the requirement that the cascade assembly 108 is capable of redirecting the air flow within the bypass airflow passage 56. For example, in still other embodiments, the thrust reverser assembly 100 may not include either of the drag links 114, 116 shown, and instead may, e.g., rely on a geometry of the cascade assembly 108 and a kinematic deployment system.

Furthermore, although for the embodiments of FIGS. 2 and 3 the plurality of cascade segments 110 are configured to translate generally along the axial direction A and further to rotate inwardly along the radial direction R as they are moved from the stowed configuration to the deployed configuration, in other exemplary embodiments of the present disclosure, the cascade assembly 108 may not be configured to pivot or rotate.

Figure 4:
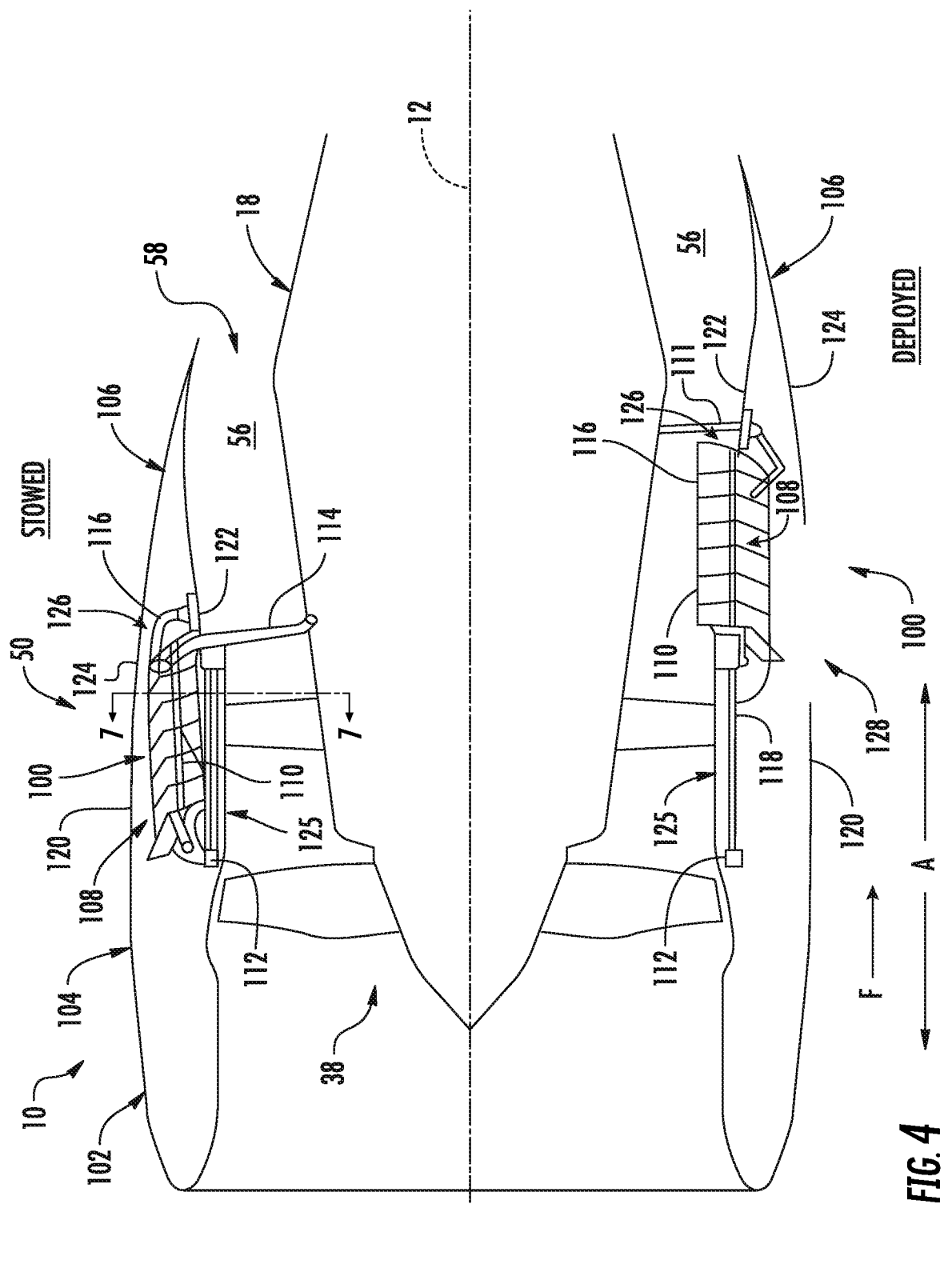
FIG. 4 is an axial, side, sectional view of a turbofan engine in accordance with another exemplary embodiment of the present disclosure depicting the thrust reverser assembly in a stowed configuration and in a deployed configuration in the upper and lower halves of the view, respectively.

For example, referring now to FIG. 4, a cross-sectional schematic view of a turbofan engine 10 in accordance with another exemplary embodiment is provided. Specifically, the exemplary embodiment of FIG. 4 depicts at an upper half, a thrust reverser assembly 100 in accordance with another exemplary embodiment in a stowed configuration and at a lower half, the exemplary thrust reverser assembly 100 in a deployed configuration. The turbofan engine 10 and thrust reverser assembly 100 may be configured in substantially the same manner as the turbofan engine 10 and thrust reverser assembly 100 of FIG. 3. However, for the embodiment of FIG. 4, the plurality of cascade segments 110 may instead simply translate generally along the axial direction A between a stowed configuration and a deployed configuration, and one or more blocker doors 111, or in other embodiments some other structure (not shown), are deployed within the bypass airflow passage 56 to divert airflow from the bypass airflow passage 56 through the cascade segments 110 to achieve a desired thrust reversal effect. As described above, it should be understood with regard to the embodiment of FIG. 4 that the cascade assembly 108 may also be axially fixed relative to the fan cowl 104. For example, a transcowl 106 with larger axial and/or radial dimensions may be provided to cover a fixed configuration of the cascade assembly 108 in a stowed configuration.

Figure 5:
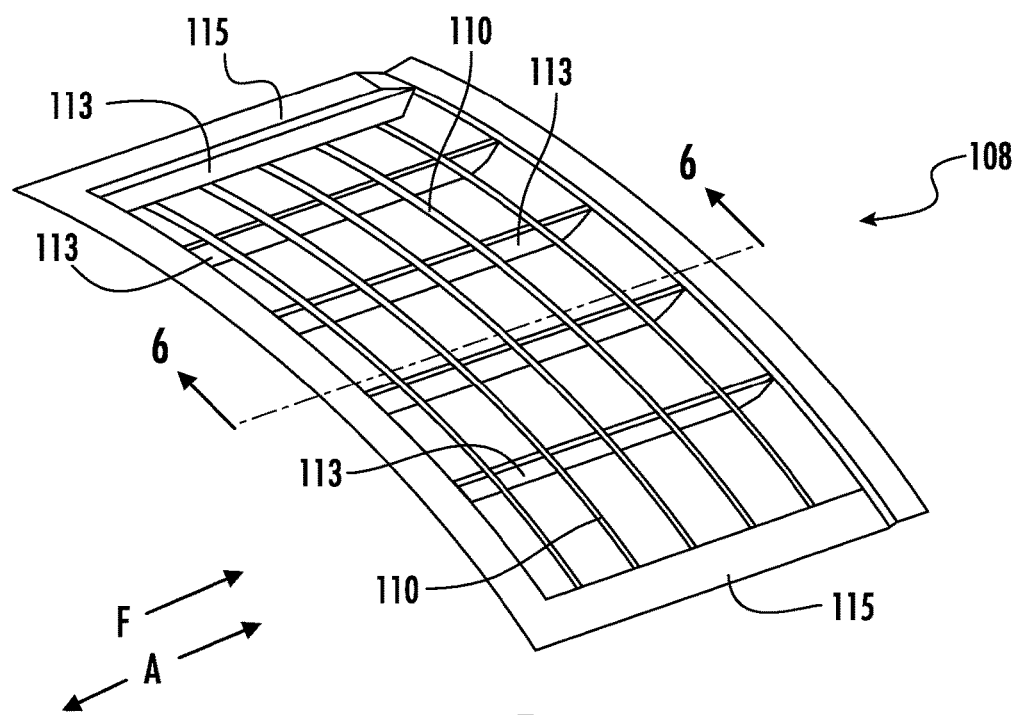
FIG. 5 is a perspective view of an exemplary cascade assembly.

Referring now to FIG. 5, a perspective view of an exemplary cascade assembly 108 is shown removed from the turbofan engine 10. As depicted, the cascade segments 110 may be supported by at least one cascade support 113. For example, a plurality of cascade supports 113 may be provided at regular intervals between cascade segments 110.

The cascade supports 113 can be configured to facilitate movement of the cascade segments 110 relative to other components. For example, as described in more detail below, the cascade supports 113 may facilitate rotation of at least part of a cascade segment 110. In an embodiment, the cascade segments 110 provide at least one anchor point for an actuation assembly as shown in FIGS. 8-18.

As shown in FIG. 5, and also FIG. 2, a plurality of cascade supports 113 may be radially spaced apart around the turbofan engine 10. The thrust reverser assembly 100 may further include a plurality of cascade assemblies 108. For example, a plurality of cascade assemblies 108 may be provided for ease of manufacture, repair, or replacement. Individual cascade assemblies 108 as shown in FIG. 5 can be separated by a cascade boundary 115. In an embodiment, cascade boundaries 115 may be provided with one or more mounting features (not shown) for attachment to the turbofan engine 10.

Figure 6:
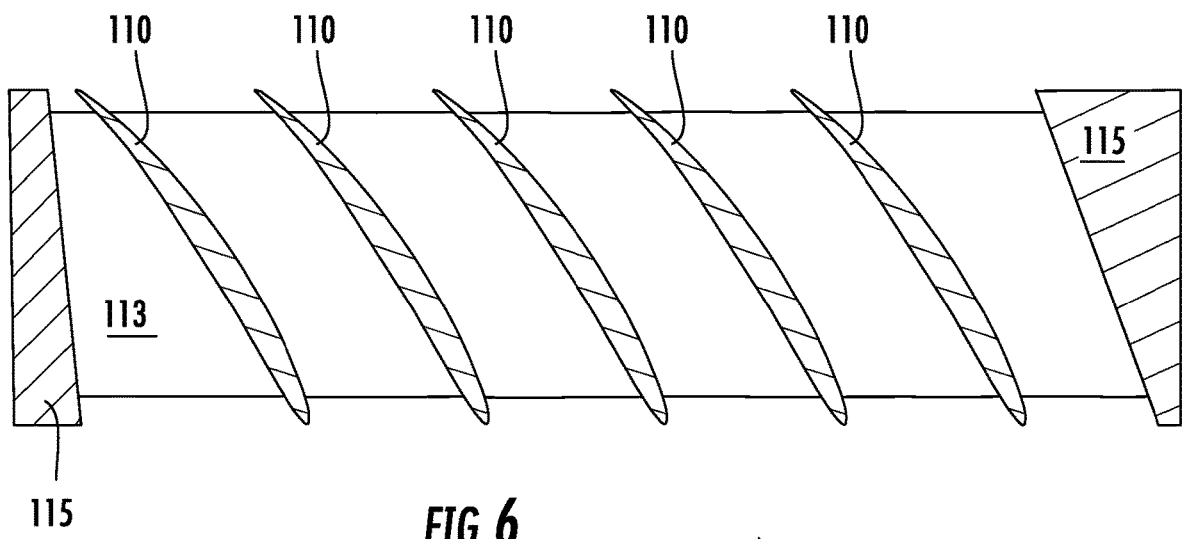
FIG. 6 is a sectional, side view of the cascade assembly of FIG. 5.

FIG. 6 is a sectional, side view of the cascade assembly of FIG. 5. As shown in FIG. 6, the plurality of cascade segments 110 can be located by at least one cascade support 113, for example between a pair of cascade supports 113. For example, the plurality of cascade segments 110 may be displaceable and/or rotatable relative to the cascade support 113 as described in greater detail with reference to FIGS. 8-48 below.

Figure 7:
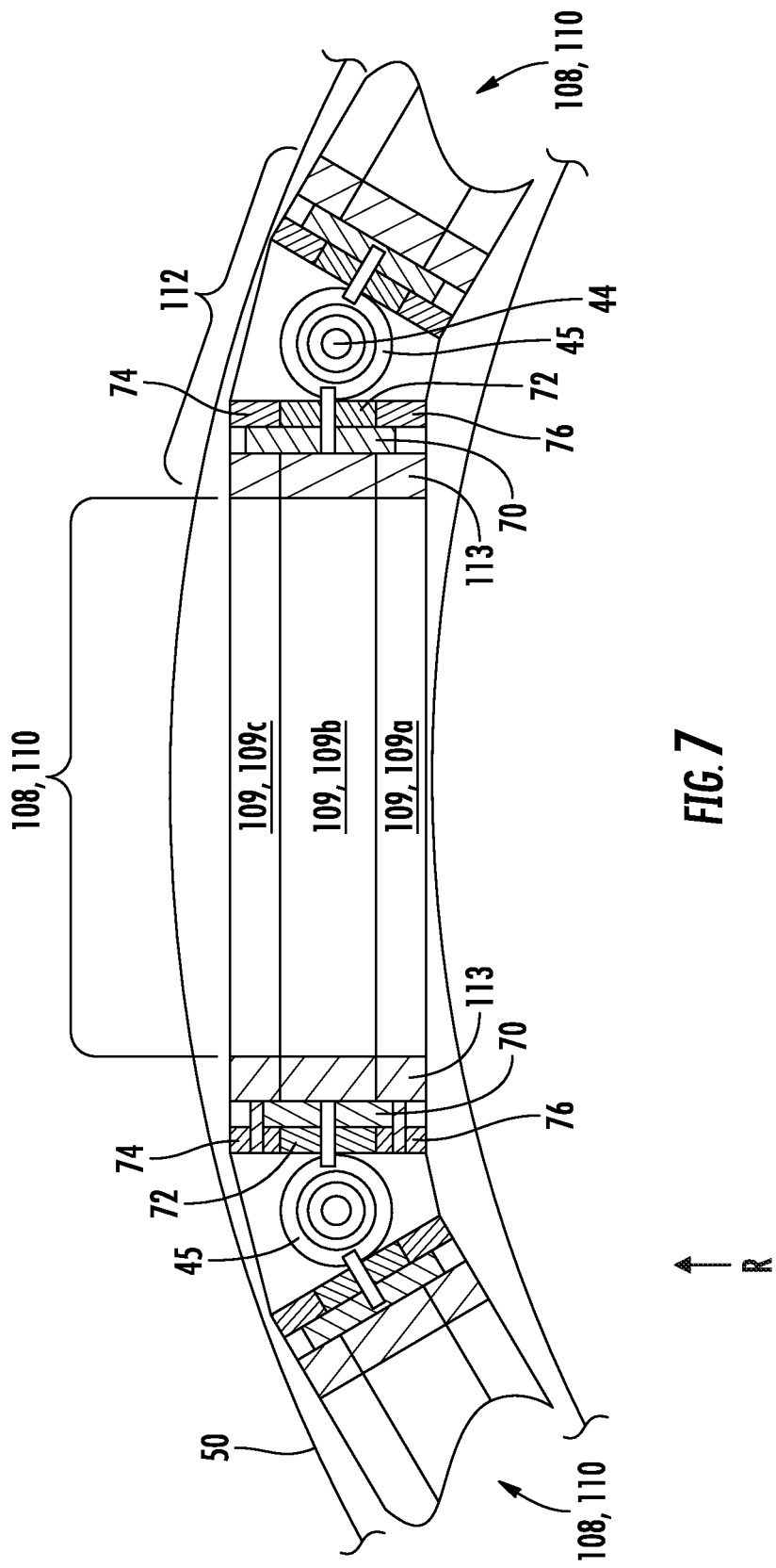
FIG. 7 is a sectional, longitudinal view of an exemplary actuation assembly of the turbofan engine of FIG. 4.
Figure 8:
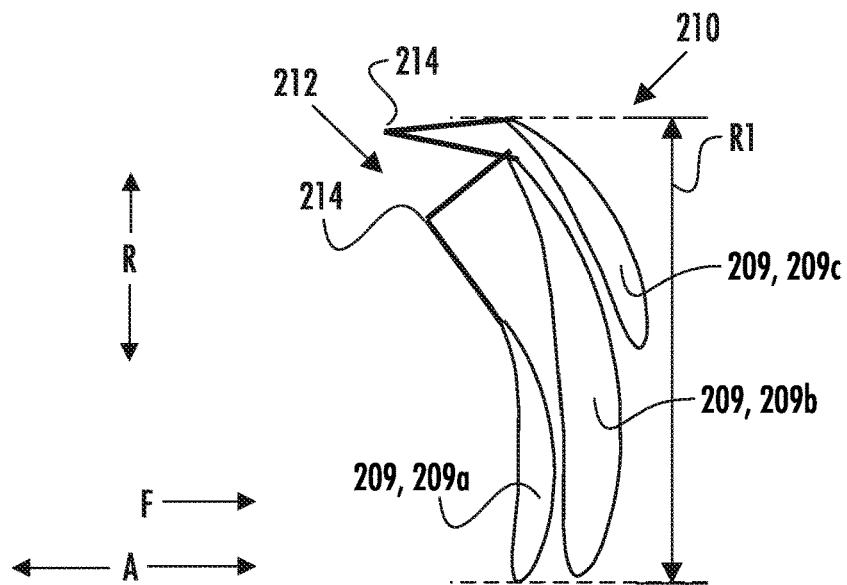
FIG. 8 is a schematic, side view of components of a cascade assembly in a stowed configuration.

Referring now to FIG. 7, a sectional, longitudinal view of taken as indicated in FIG. 4, an individual cascade segment 110 is shown in the stowed configuration. As depicted, the embodiment shown in FIG. 7 includes a plurality of cascade members 109, for example as also depicted in FIG. 8 below with relation to the plurality of cascade member 209. Each of the plurality of cascade members 109, which are sized and shaped for example as components of a high lift airfoil, are configurable to deploy as a cascade segment 110. As shown, each cascade segment 110 is disposed between a pair of cascade supports 113, however it should be appreciated that various other configurations of support may be provided as described below.

The cascade members 109 may be individually referred to based on relative positioning in the deployed and/or stowed configurations. As depicted in FIG. 7, the radially innermost of the cascade members 109 may also be referred to as a leading member 109a, the radially outermost of the cascade members 109 may be referred to as a trailing member 109c, and one or more of the cascade members 109 disposed radially therebetween may be referred to as an intermediate member 109b. Such reference in this embodiment is based on the configuration of the cascade members 109 in the deployed configuration, for example as shown in FIG. 8. It should be understood that such reference to leading, trailing, and intermediate members is with regard to airflow in the deployed configuration. Although FIG. 7 depicts the leading member 109a as the radially innermost of the cascade members 109 in the stowed configuration, it should also be appreciated that the stowed configuration may rearrange the plurality of cascade members 109 relative to one another in the deployed configuration.

FIG. 7 depicts an actuation assembly 112 operably connected to the plurality of cascade members 109. It should be understood that such actuation assembly 112 may also be operably connected to a further plurality of cascade segments 110 behind the plane of the page in FIG. 7. The actuation assembly 112 is operably connected with to the plurality of cascade segments 110 through one or more cascade supports 113 as described above. The cascade supports 113 may be controlled by various other components to achieve actuation. As shown, the cascade supports 113 and thus cascade members 109 may are controlled by an actuation member 44. The actuation member 44 may for example be a linear actuator or an actuation rod connected to a motive device. As shown, the actuation member 44 is controlled by an actuation bearing 45. The actuation bearing 45 is provided to control movement in the nacelle assembly 50, for example from a remote actuator (not shown). In this configuration, the actuation bearing 45 may also be referred to as a linear guide. Such a configuration may be used to reduce thickness of the nacelle assembly 50 in the area of the cascade segments 110. Movement of the actuation member 44 facilitates moving between the deployed and stowed configurations, for example to increase an axial extent of the cascade assembly 108, a radial extent of the cascade assembly 108, and/or to rotate at least some of the cascade members 109 or cascade segments 110 of the cascade assembly 108.

In addition to the actuation member 44, at least one biasing member 70 may be provided to control the cascade assembly 108. For example, the at least one biasing member 70 may be used to counteract a deployment or stowing force applied by the actuation member 44. Combined use of the biasing member 70 and the actuation member 44 may be tuned for efficient operation, to counteract aerodynamic or inertial forces, or for various other operational benefits.

The actuation assembly 112, also referred to interchangeably as a cascade actuation assembly, may further include a rotational guide 72. As shown in FIG. 7, a plurality of rotational guides 72 are provided. Although a pair of rotational guides 72 are provided on either end of each cascade assembly 108, it should be appreciated that some embodiments may provide one or more than two rotational guides 72 for each cascade assembly 108. For example, each cascade segment 110 may include a rotational guide 72. The rotational guide 72 is configured to control at least one of the cascade segments 110 between its rotational positions, from a minimum segment rotation to a maximum segment rotation. The rotational guide 72 may also be configured to control other aspects of deployment and/or stowage, for example cascade expansion to increase a linear extent of the plurality of cascade members 109 of a given cascade segment 110 as described in greater detail with reference to FIGS. 19-22 below.

The at least one biasing member 70 may be configured to control deployment and stowage as described above. It should be appreciated that the at least one biasing member 70 may include a metallic spring, pressurized cylinder, etc. With reference to the rotational guide 72 described above, it should be appreciated that the at least one biasing member 70 may control multiple deployment or stowage transformations as well. For example, the at least one biasing member 70 may control minimum and/or maximum segment rotation and control the linear extent of the plurality of cascade members 109 of a given cascade segment 110. As described in greater detail with reference to FIGS. 19 and 20, the at least one biasing member 70 may be anchored to the leading member 109*a* and the trailing member 109*c* to control both rotation and linear extent of a given cascade segment 110.

As also shown in FIG. 7, the nacelle assembly 50 may be configured to accommodate a plurality of cascade assemblies 108. As depicted, the plurality of cascade assemblies 108 may be spaced circumferentially apart from one another, for example around the entire circumference of the nacelle assembly 50. Each of the cascade assemblies 108 may be separated from the next by a shared actuation member 44 and/or actuation bearing 45. Accordingly, it should be appreciated that multiple actuation members 44 may control a single cascade assembly 108 and that a single actuation member 44 may control multiple cascade assemblies 108. It should also be understood that a plurality of actuation bearings 45 may be provided as such. In some embodiments, at least some actuation bearings 45 may be provided without an actuation member 44. Actuation may still be achieved by other connected actuation members 44, thus reducing the need for extra actuation members while retaining control with a greater number of actuation bearings 45. In an embodiment, an actuation bearing 45 is provided disposed circumferentially between each of the plurality of cascade assemblies.

FIG. 7 further depicts an upper bearing 74 configured to control at least one cascade member 109 and a lower bearing 76 configured to control at least one cascade member 109. The upper bearing 74 depicted is configured to control the trailing member 109*c* and the lower bearing 76 is configured to control the leading member 109*a*. The upper bearing 74 and the lower bearing 76 may each interface with the rotational guide 72. For example, the rotational guide 72 may control rotation and/or linear extent of one or more cascade segments 110 by controlling movement of the upper bearing 74 and the lower bearing 76 connected to their respective cascade members 109. Although not shown in FIG. 7, it should be appreciated that the upper bearing 74 and the lower bearing 76 may be controlled by various other features, such as respective tracks in which they run. Such a configuration is described in greater detail with reference to FIGS. 20-33. Furthermore, regardless of whether constrained in a physical track, upper and lower paths may be defined to describe this constrained movement.

Referring now to FIG. 8, an embodiment of one or more cascade members 209 of a cascade assembly, such as the cascade assembly 108 described above, of a thrust reverser assembly, such as the thrust reverser assembly 100 described above, is depicted. The cascade assembly 108 includes one or more cascade member 209, and more specifically, in the embodiment depicted includes a plurality of cascade members 209. As depicted, the plurality of cascade members 209 may be configured in a stowable manner such that dimensions of the nacelle assembly 50 (FIG. 7) can be reduced. It should be understood that cascade members 209 of this configuration can be employed in various embodiments including axially translating, axially fixed, tilting, and/or radially lowering cascade assemblies 108. As described above, each of the plurality of cascade members 209 may be individually referred to as a leading member 209*a*, an intermediate member 209*b*, and a trailing member 209*c*, for example indicative of leading, trailing, and intermediate aerodynamic positions as deployed.

The plurality of cascade members 209 are depicted in a stowed configuration in FIG. 8. As depicted, the plurality of cascade members 209 may be described as stacked. The depicted plurality of cascade members 209 are deployable to form a cascade segment 210. More specifically, the plurality of cascade members 209 form the cascade segment 210 when in a deployed configuration. It will be appreciated that as used herein, a "cascade member" generally refers to any structure that alone, or in combination with other cascade member(s), forms a cascade segment for redirecting an airflow. A cascade member may be an airfoil shape, or may in coordination with other cascade members form an airfoil shape.

By moving between the stowed configuration and the deployed configuration, a relatively compact but effective cascade assembly 108 can be provided.

Figure 9:
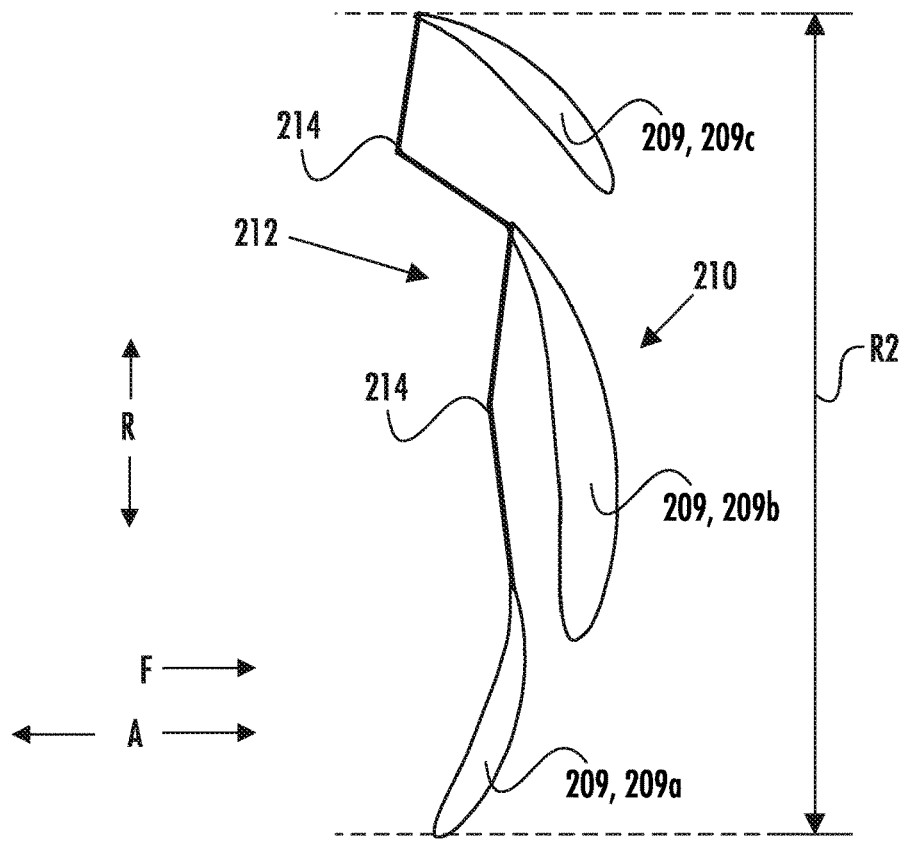
FIG. 9 is a schematic, side view of the components of FIG. 8 in a deployed configuration.

For example, the plurality of cascade members 209 defines a first radial extent R1 as shown in FIG. 8 when in the stowed configuration. The term "radial extent" with respect to one or more cascade members (such as cascade members 209) that form a cascade segment (such as the cascade segment 210) refers to a total length of the cascade member(s) 209 in the radial direction R. In certain embodiments, the radial extent R1 may refer to a measure along the radial direction R from a leading edge of a cascade segment (such as the cascade segment 210) to a trailing edge of the cascade segment. In other embodiments, the radial extent R1 may refer to a maximum measure along the radial direction R of the cascade segment 210 at a given axial location along longitudinal centerline 12. The plurality of cascade members 209 can then be deployed to form the cascade segment 210 as shown in FIG. 9. In FIG. 9, the plurality of cascade members 209 defines a second radial extent R2 that is greater than the first radial extent R1. Movement of the plurality of cascade members 209 of the cascade segment 210 from the stowed configuration in FIG. 8 to the deployed configuration in FIG. 9 can thus be described as increasing from the first radial extent R1 to the second radial extent R2 or increasing a length of the cascade segment 210.

As depicted in FIG. 9, the plurality of cascade members 209 are configured to form a compound aerodynamic shape for the cascade segment 210. It should be understood that the arrangement and configuration of the plurality of cascade members 209 when in the deployed configuration are tunable to achieve desired properties. For example, the plurality of cascade members 209 can be arranged in a high lift configuration utilizing independent aerodynamic surfaces such as in slat, slot, flap, and/or cuff configurations.

As depicted in FIGS. 8 and 9, a cascade actuation assembly 212 is provided to move the plurality of cascade members 209 that form the cascade segment 210 (at least in the deployed configuration) of the cascade assembly 108 (see FIGS. 1-4) between the stowed configuration of FIG. 8 and the deployed configuration of FIG. 9. The cascade actuation assembly 212 is operably connected to the plurality of cascade members 209 to control their movement. For example, the cascade actuation assembly 212 is configured to control a radial expansion of the plurality of cascade members 209, and may further be configured to control rotation and/or alignment of the plurality of cascade members 209. As described with reference to FIGS. 5 and 6, it should be understood that the cascade actuation assembly 212 can further be operably connected to at least one cascade support 113.

The embodiment of FIGS. 8 and 9 includes a cascade actuation assembly 212 of a flexure configuration. As depicted, one or more actuation points 214 are actuable by pushing, pulling, pressurizing, and/or inducing strain. By this actuation, deployment of the cascade segment 210 of the cascade assembly 108 can be achieved by a change in length and/or orientation of the cascade actuation assembly 212. The configuration depicted in FIGS. 8 and 9 may also be known as a bellows configuration of a cascade actuation assembly 212.

Figure 10:
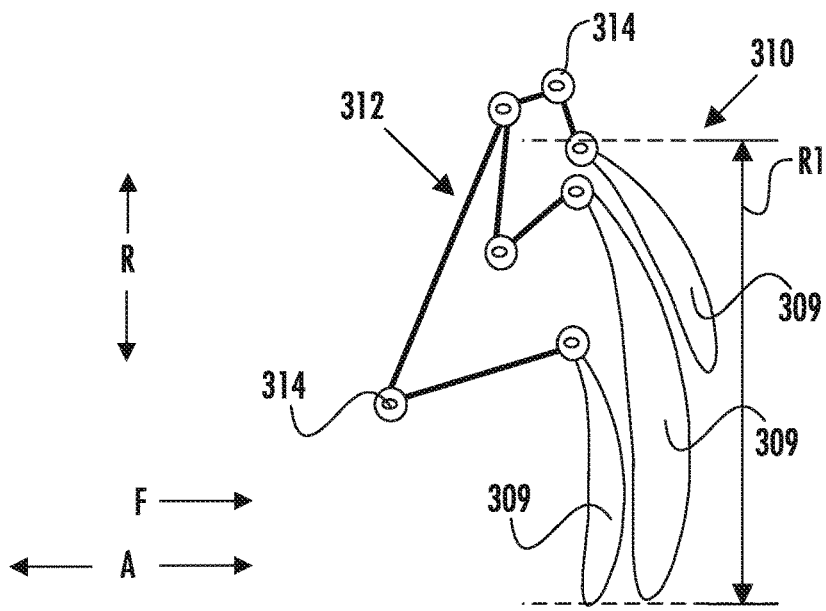
FIG. 10 is a schematic, side view of another embodiment of components of a cascade assembly in a stowed configuration.
Figure 11:
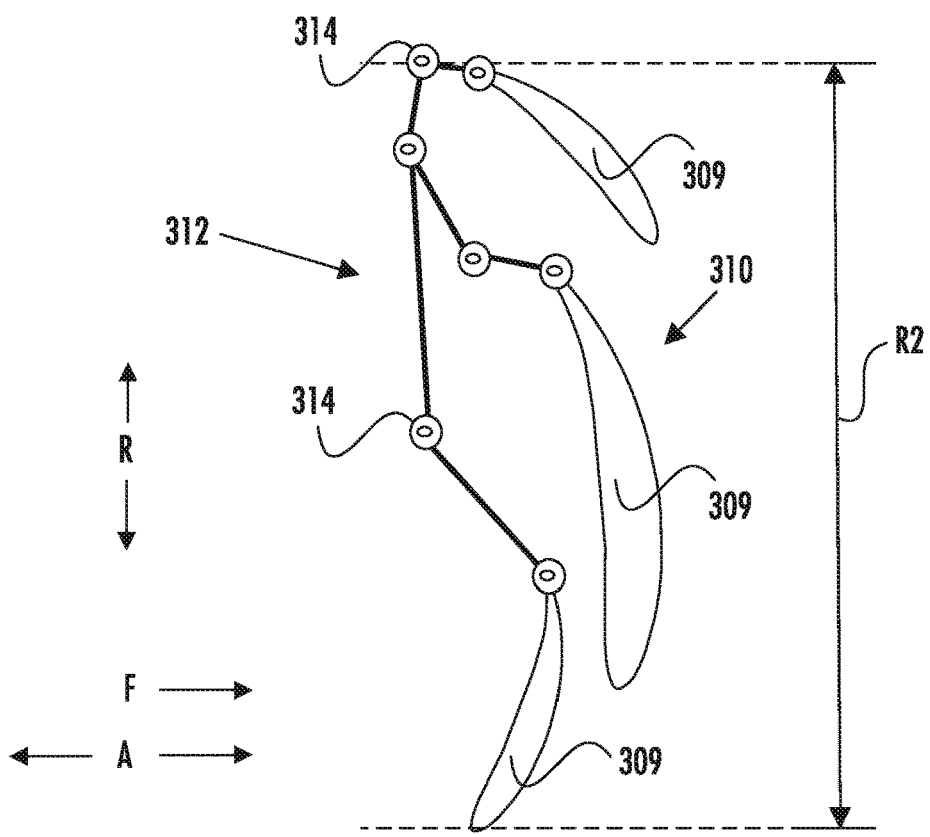
FIG. 11 is a schematic, side view of the components of FIG. 10 in a deployed configuration.

Referring now to FIGS. 10 and 11, one or more cascade members 309 that form a cascade segment 310 of a cascade assembly, for example the cascade assembly 108 described above, in a deployed configuration according to another embodiment is depicted. As with the embodiment of FIGS. 8 and 9, the embodiment of FIGS. 10 and 11 similarly includes a cascade actuation assembly 312. In contrast with the embodiment of FIGS. 8 and 9, however, the cascade actuation assembly 312, operable to move the one or more cascade members 309 that form the cascade segment 310 between a stowed configuration and a deployed configuration, is of a linkage configuration. The cascade actuation assembly 312 depicted is actuable at one or more actuation points 314 by rotary, linear, and/or curved motion. For example, the cascade actuation assembly 312 may be an articulated mechanism, a slider crank, an n-bar linkage, a cam mechanism, or any combination thereof. In an embodiment, the one or more actuation points 314 may be controlled with one or more parallel motion devices. Actuation at the one or more actuation points 314 in turn can align the one or more cascade members 309, or rather a plurality of cascade members 309 in the embodiment shown, to form the cascade segment 310.

Actuation motion in the embodiments of FIGS. 8-11 may be achieved by any suitable motive force and can be driven by, e.g., pneumatic, hydraulic, or electric motors. For example, one or more actuation assemblies 112 as described with reference to FIGS. 3 and 4 may provide motive force to move the cascade assembly 108 (see FIGS. 3 and 4) between stowed and deployed configurations. In an embodiment, the same component or group of components can provide motive force for movement of the transcowl 106 in the axial direction A (see FIGS. 2-4), movement of the cascade assembly 108 (see FIGS. 2-4) or the cascade members 309 in the radial direction R (see FIG. 3), movement of the cascade assembly 108 in the axial direction A (see FIGS. 3 and 4), deployment of the cascade assembly 108 e.g. in the radial direction R (see FIGS. 8-11), and movement of blocker doors 111 or other suitable thrust redirection mechanisms (see FIGS. 3 and 4). For example, the cascade actuation assembly 212, 312 of FIGS. 8-11 may be operably connected to a blocker assembly including the blocker doors 111 of FIG. 4.

Referring still to the embodiments of FIGS. 8-11, it should be understood that the described stowed and deployed configurations are merely instructive and are not limiting as to a total number of configurations of the cascade segments 210, 310. For example, one or more intermediate configurations between the stowed and deployed configurations may also be provided. It is also contemplated that variable control of the plurality of cascade members 209, 309 may be employed independently or as a grouped cascade segment 210, 310, for example to rotate the plurality of cascade members 209, 309.

Figure 12:
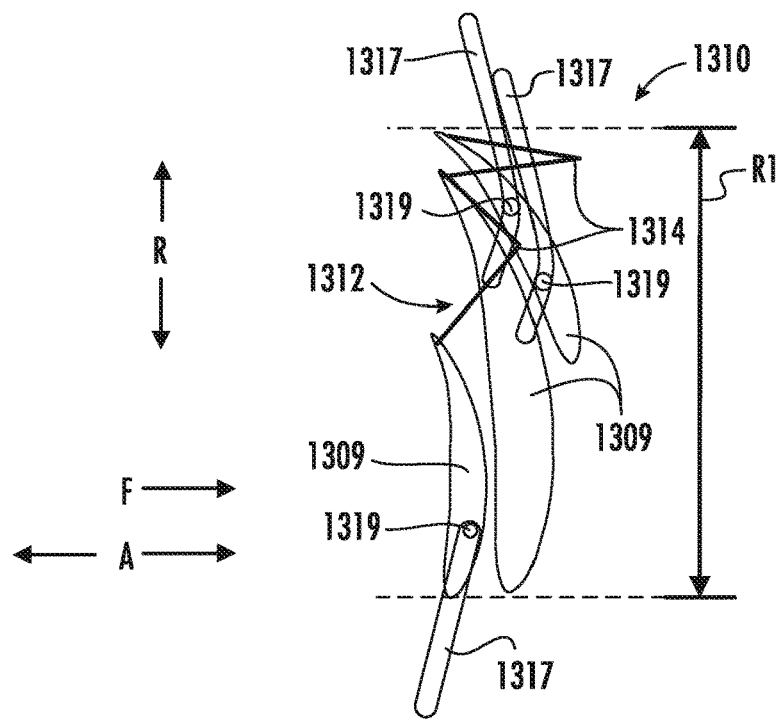
FIG. 12 is a schematic, side view of another embodiment of components of a cascade assembly in a stowed configuration.
Figure 13:
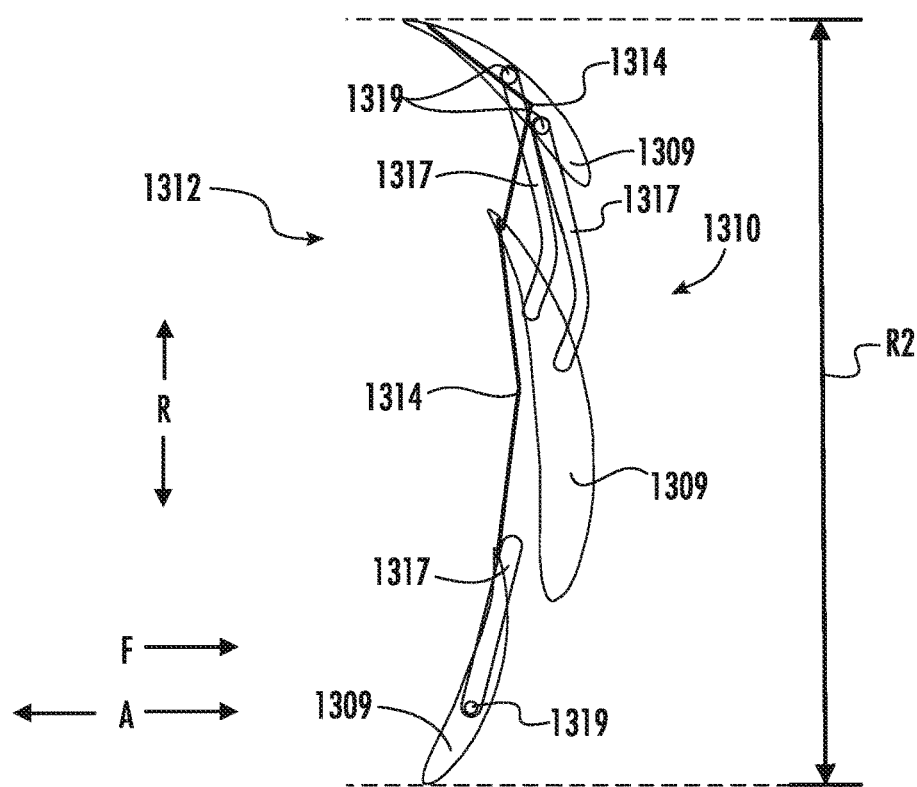
FIG. 13 is a schematic, side view of the components of FIG. 12 in a deployed configuration.

Referring now to FIGS. 12 and 13, another embodiment of a cascade segment 1310 is shown. The depicted embodiment includes a plurality of cascade members 1309 stowed in FIG. 12 and deployable to form a plurality of cascade segments 1310 as shown in FIG. 13. The embodiment of FIGS. 12 and 13 differs from the embodiments of FIGS. 8-11 at least in that a cascade actuation assembly 1312 is configured such that its actuation points 1314 overlap with the cascade members 1309. The configuration depicted in FIGS. 12 and 13 may provide a particularly compact cascade segment 1310 in the axial direction A.

As further depicted in FIGS. 12 and 13, an individual cascade segment 1310 may comprise one or more actuation constraints 1319. The actuation constraints 1319 depicted are distinct from the actuation points 1314, but it should be appreciated that these features may also be combined. As depicted, one or more actuation tracks 1317 may further be provided to locate the one or more actuation constraints 1319. In certain embodiments, the actuation constraints 1319 and actuation tracks 1317 may be configured to control relative movement of individual cascade members 1309 relative to one another. For example, a pair of actuation tracks 1317 can be provided to facilitate rotation during part of an actuation movement and to maintain a rotational position during another part of the actuation movement.

Figure 14:
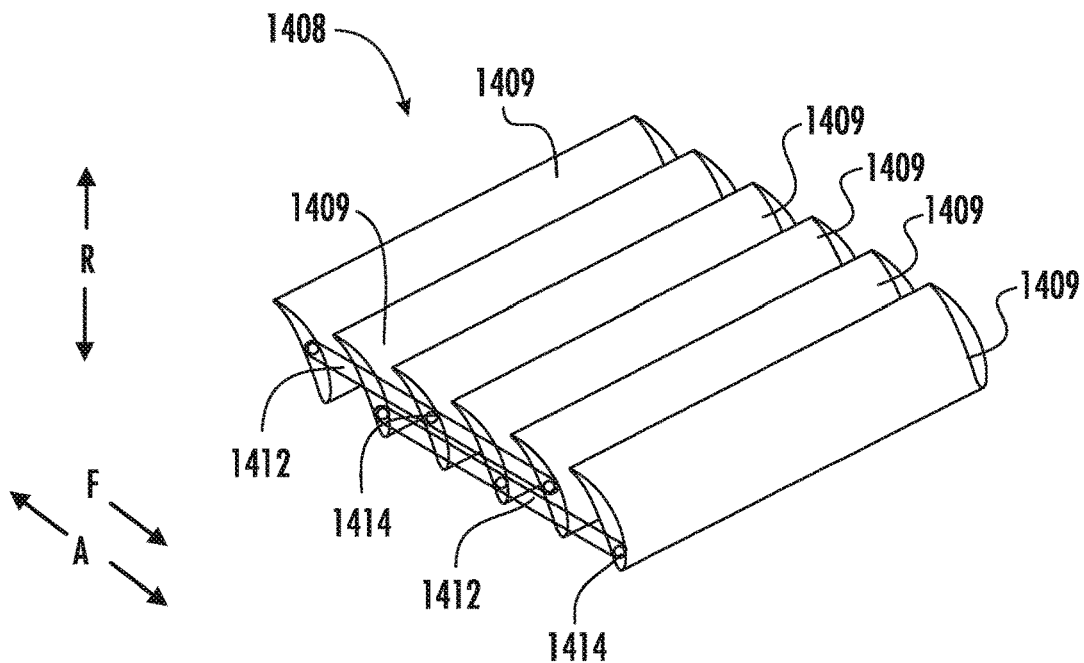
FIG. 14 is a schematic, perspective view of an embodiment of components of a cascade assembly in a stowed configuration.
Figure 15:
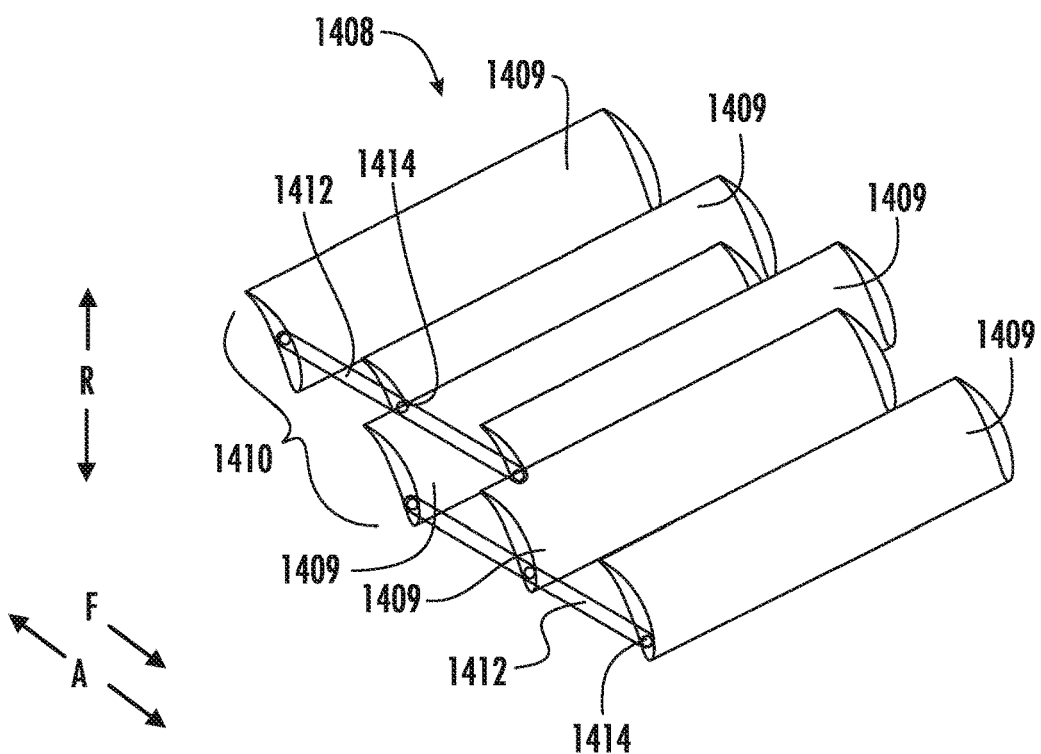
FIG. 15 is a schematic, perspective view of the components of FIG. 14 in a deployed configuration.

Referring now to FIGS. 14 and 15, a configuration of a cascade assembly 1408 according to another embodiment is shown. The depicted embodiment includes a plurality of cascade members 1409 stowed in FIG. 14 and deployable to form a plurality of cascade segments 1410 as shown in FIG. 15. The cascade members 1409 are provided in pairs such that a cascade member 1409 arranged on a first one of a cascade actuation assembly 1412 cooperates with a corresponding cascade member 1409 on a second one of a cascade actuation assembly 1412 to form a cascade segment 1410. As shown between FIGS. 14 and 15, relative movement between the independent actuation assemblies 1412 can be sufficient to form a plurality of cascade segments 1410. However, it should be understood that various other configurations may be used for further actuation as described herein, for example further controlling rotation. Each of the cascade actuation assemblies 1412 is provided with at least one actuation point 1414 for controlling actuation, for example relative to a cascade support 113 as described with reference to FIGS. 5 and 6.

Figure 16:
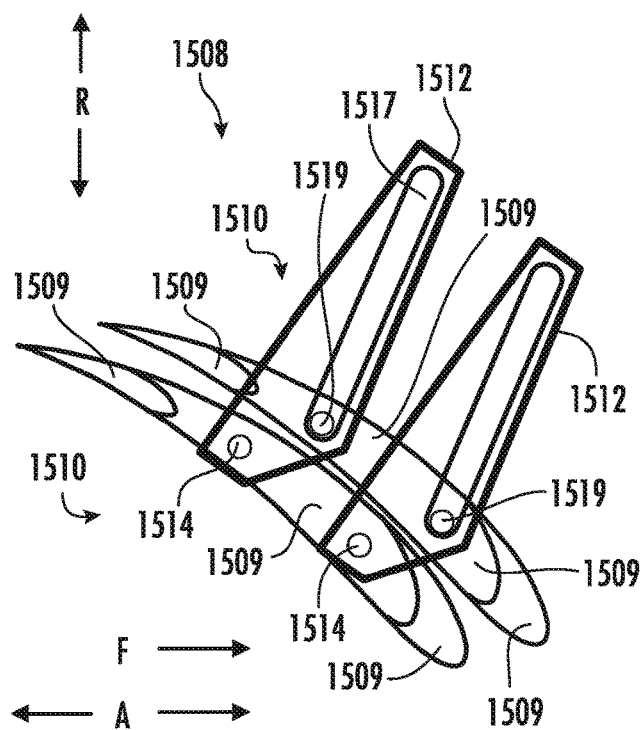
FIG. 16 is a schematic, side view of another embodiment of components of a cascade assembly in a first stowed configuration.
Figure 17:
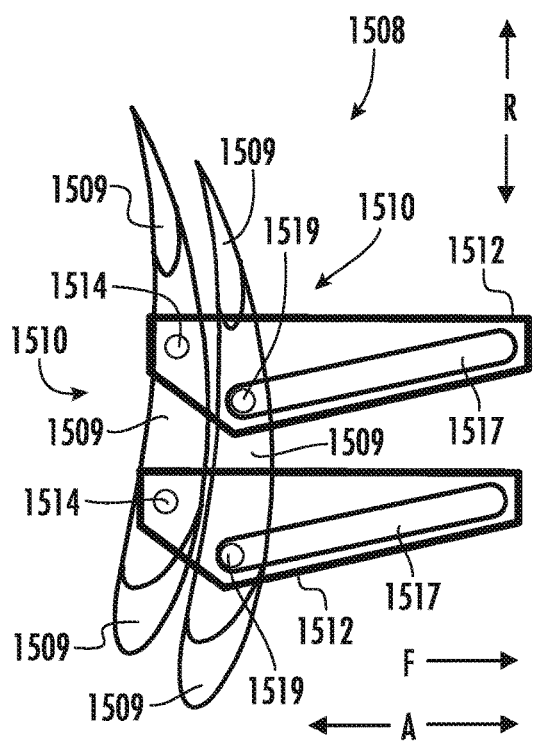
FIG. 17 is a schematic, side view of the components of FIG. 16 in a second stowed configuration.
Figure 18:
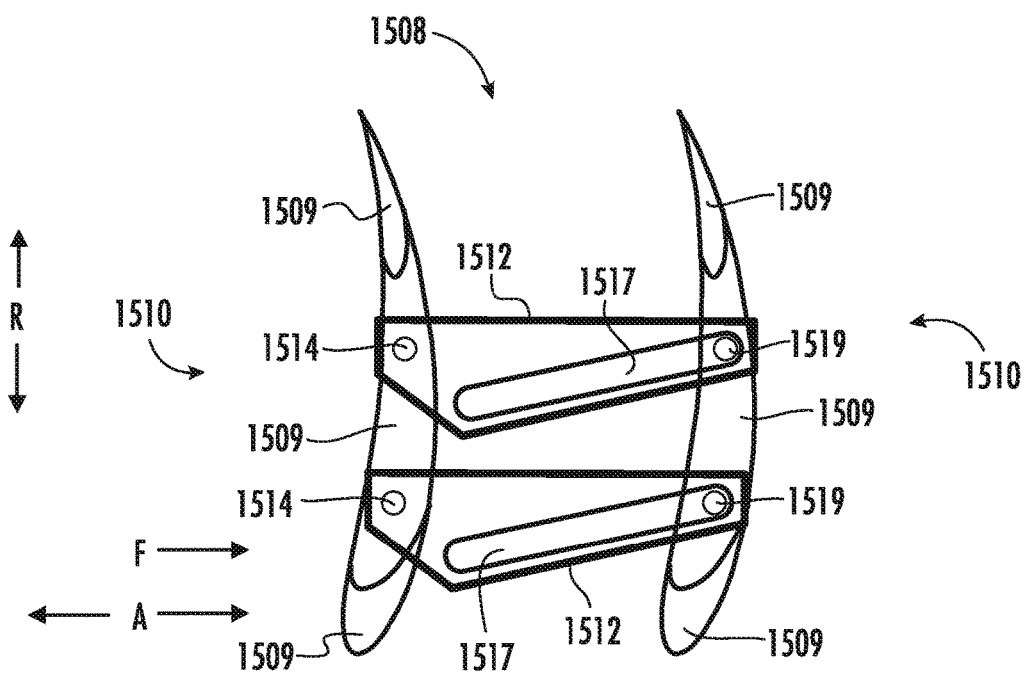
FIG. 18 is a schematic, side view of the components of FIG. 16 in a deployed configuration.

Referring now to FIGS. 16-18 a further embodiment of a cascade assembly 1508 is depicted. The cascade assembly 1508 as shown includes a plurality of cascade members 1509 cooperating to form a plurality of cascade segments 1510. A first one of the cascade segments 1510 can be controlled and/or actuated relative to a further one of the cascade segments 1510 using one or more cascade actuation assemblies 1512. In the exemplary embodiment depicted, a pair of cascade actuation assemblies 1512 are provided with a pair of cascade segments 1510. However, it should be appreciated that the number of cascade actuation assemblies 1512 and the number of cascade segments 1510 need not correspond with one another. For example, one cascade actuation assembly 1512 may be configured to actuate a plurality of cascade segments 1510.

FIG. 16 depicts the cascade assembly 1508 in a first stowed configuration, which may also be referred to as a stowed and rotated configuration. As shown, first and second cascade segments 1510 each include a plurality of nested cascade members 1509. The first and second cascade segments 1510 are stowed adjacent one another. In certain embodiments, the first and second cascade segments 1510 may be stowed abutting one another.

Movement between the configurations of the cascade assembly 1508 depicted may be controlled by the one or more cascade actuation assemblies 1512 as described above. As depicted in FIGS. 16-18, the pair of cascade actuation assemblies 1512 controls movement between the first stowed configuration of FIG. 16, a second stowed configuration of FIG. 17 and a deployed configuration of FIG. 18. As depicted, the cascade actuation assembly 1512 includes a plurality of control features: an actuation point 1514, an actuation track 1517, and an actuation constraint 1519. It should be appreciated that these features may be combined or omitted to achieve various actuation between configurations. The embodiment shown provides an actuation point 1514 attaching the cascade actuation assembly 1512 to the first cascade segment 1510. The actuation point 1514 may be completely fixed to the first cascade segment 1510, or may have some degree of freedom, for example rotation, relative to the first cascade segment 1510. In some embodiments, the actuation point 1514 may transmit force from an actuation assembly 112, for example connected to a cascade support 113 as described with reference to FIGS. 5-7.

Turning to FIG. 17, the second stowed configuration shown represents a rotation of the cascade assembly 1508. This rotation may serve to increase the radial extend of the cascade segments 1510 and thus the cascade assembly 1508 as described with reference to FIGS. 8-11. Rotation may be controlled by actuation relative to another component, for example the cascade support 113 as described with reference to FIGS. 5 and 6.

FIGS. 16-18 further depict the actuation track 1517 of the cascade actuation assembly 1512. Turning to FIG. 18, this actuation track 1517 may facilitate movement into the deployed configuration depicted. As shown, the actuation constraint 1519 is configured to control relative motion of the first cascade segments 1510 into the deployed configuration. It should be appreciated, however, that the movements between FIGS. 16, 17, and 18 can be performed stepwise or in combination in any order.

The deployed configuration of FIG. 18 may in some embodiments represent a first deployed configuration, wherein further deployment is possible. For example, the plurality of cascade members 1509 may be spaced apart, for example as described in greater detail with reference to FIGS. 39-42.

Figure 19:
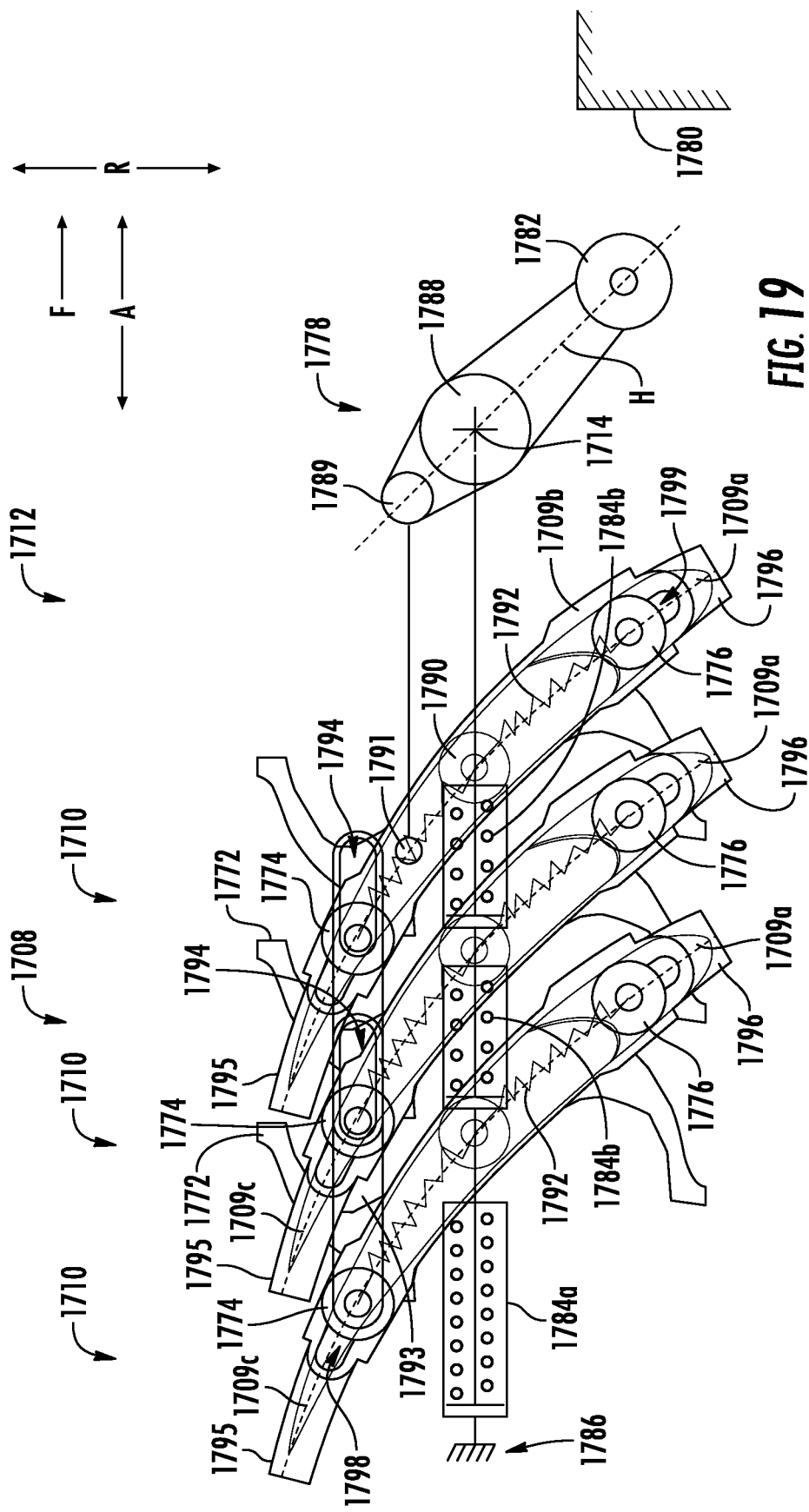
FIG. 19 is a schematic, side view of another embodiment of components of a cascade assembly in a stowed configuration.

Referring now to FIG. 19, a schematic, side view of another embodiment of components of a cascade assembly 1708 is depicted in a stowed configuration. The embodiment of FIG. 19 provides for rotation, linear extension, and radial extension of the cascade assembly 1708. As shown, the cascade assembly 1708 is controlled by at least one actuation point 1714, to which an actuation member or actuator (not shown) may impart an actuation force. In this embodiment, the actuation point 1714 lies on a rotational actuator 1778, but it should be appreciated that the actuation point 1714 may lie on any movable component of the cascade assembly 1708.

Figure 20:
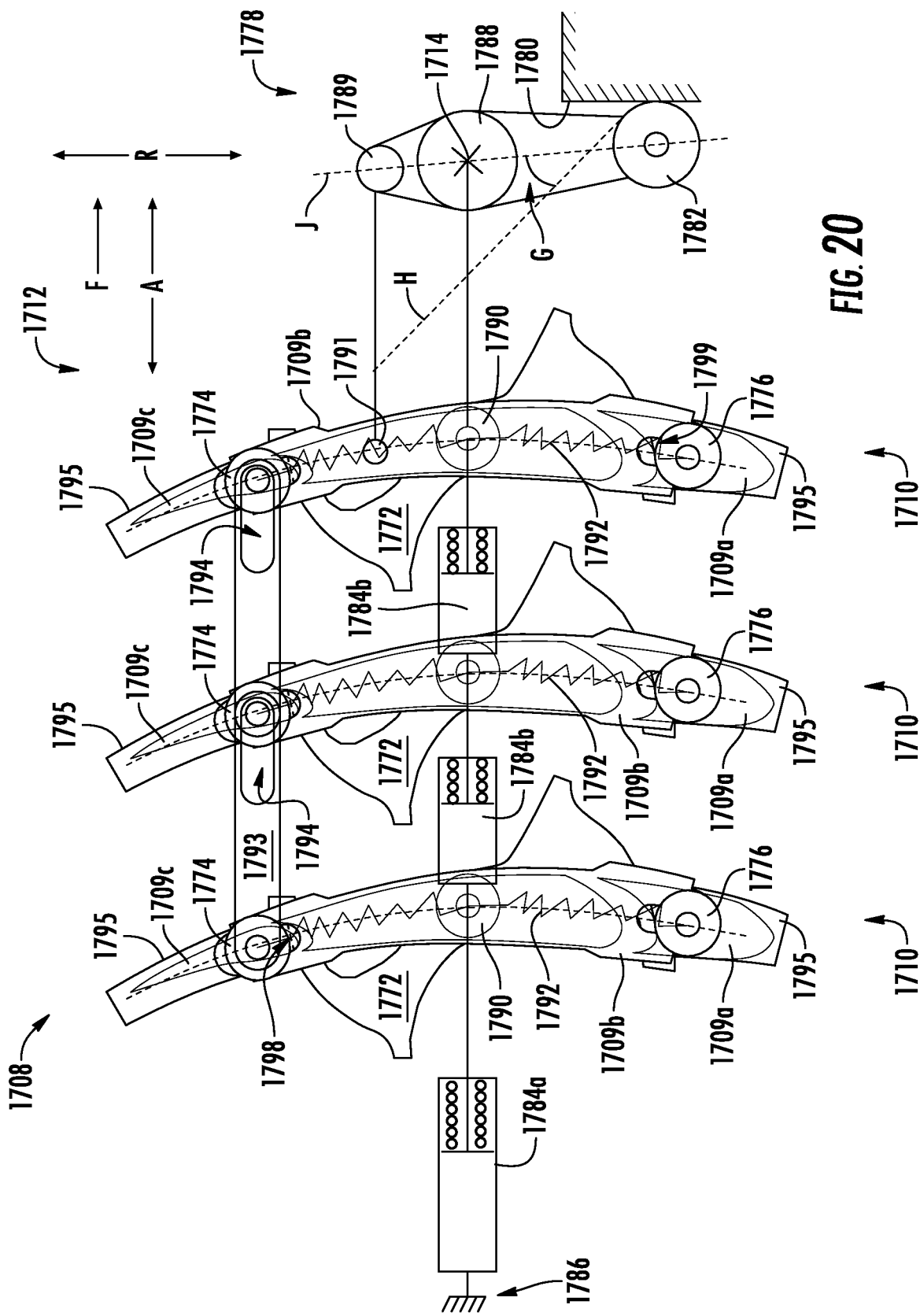
FIG. 20 is a schematic, side view of the components of FIG. 19 in a deployed configuration.

The rotational actuator 1778 in FIG. 19 is configured to control rotation of the cascade assembly 1708. As shown, force generated on the actuation point 1714 in the airflow direction F will result in movement of the rotational actuator 1778 in the airflow direction F towards a linear stop 1780. It should be appreciated that this movement need not be in the airflow direction F based on various rearrangements of components, for example to enable deployment movement opposite to airflow direction F. As shown in FIG. 20, movement of the rotational actuator 1778 in the direction of deployment (shown in this embodiment as the airflow direction F) results in contact of the rotational actuator 1778 with the linear stop 1780. A stop feature 1782 is provided on the rotational actuator 1778 to interface with the linear stop 1780. Upon contact with the linear stop 1780, the stop feature 1782 imparts force from linear actuation of a cascade assembly such as the cascade assembly 108 of FIG. 7 to the same cascade assembly as a rotational force. In turn, this force is operable to rotate the plurality of cascade segments 1710 as depicted in FIG. 20.

As shown, an actuation assembly 1712 may be configured such that radial expansion, linear expansion, and rotation are appropriately timed relative to one another. For example, movement of the rotational actuator 1778 as described above rotates the plurality of cascade segments 1710 only after some linear movement without rotation. This amount of non-rotational linear movement may facilitate tight packing of the plurality of cascade segments 1710 to the point where relative rotation would not be possible without first spacing apart of each cascade segment 1710 relative to the next. Additionally or alternatively, such non-rotational linear movement can facilitate removal from the nacelle assembly (see, e.g. FIG. 7) prior to rotation. Accordingly in such an embodiment, the nacelle assembly (not shown) may be configured with a relatively small radial dimension configured to enclose only cascade segments 1710 which have already been rotated to a compact configuration.

In the embodiment of FIGS. 19 and 20, one or more biasing members may be provided to control actuation, that is deployment or stowage. For example, a biasing member may be provided opposing any aspect of deployment, such as rotation, axial expansion, or radial expansion. Additionally or alternatively, biasing members may be provided to oppose any aspect of stowage, such as rotation, axial contraction, or radial contraction. As shown in FIGS. 19 and 20, a first linear biasing member 1784a is provided between the cascade assembly 1708 and a fixed point 1786. The fixed point 1786 may be located on a nacelle component or any other suitable component relative to which at least parts of the cascade assembly 1708 are movable. The first linear biasing member 1784a and any other biasing member described herein may be a metallic spring, pressurized cylinder, or any combination of features to provide spring force.

Movement of the actuation assembly 1712 generated at the actuation point 1714 is operable to act on the first linear biasing member 1784a. In the embodiment shown, the first linear biasing member 1784a is configured to resist deployment, but it should be understood that the first linear biasing member 1784a could also be configured to assist in deployment and resist stowage, for example by providing the actuation force opposite the deployment direction.

FIGS. 19 and 20 further include a second linear biasing member 1784b disposed between each of the cascade segments 1710. The second linear biasing members 1784b control axial expansion of the cascade segments 1710 relative to one another. Used in combination with the first linear biasing member 1784a, the second linear biasing member 1784b may independently control axial expansion of the cascade assembly 1708 from axial shifting of the cascade assembly 1708 controlled by the first linear biasing member 1784a. For example, axial shifting may happen before or at a faster rate than axial expansion of the cascade assembly 1708

The linear biasing members 1784a, 1784b may be operable to control rotation of the cascade assembly 1708. For example, impingement of the stop feature 1782 as shown in FIG. 20 causes the rotational actuator 1778 to pivot about a rotational pivot 1788. The rotational pivot 1788 may, but not need be, disposed on the same point as the actuation point 1714. In this embodiment, the rotational actuator 1778 forms a lever, with an action point 1789 disposed opposite the stop feature. The action point 1789 is configured to connect to a component of the cascade assembly 1708, for example at least one of the cascade segments 1710 as shown. The cascade assembly 1708 as shown has a corresponding reaction point 1791 operably connected with the action point 1789, for example by a linkage, hydraulically, pneumatically, etc.

Rotation of the rotational actuator 1778 may be defined by an actuator angular change G. As shown in FIG. 20, the actuator angular change G is defined by a difference between a stowed actuator position H and a deployed actuator position J. The actuator angular change G in this embodiment is equal to an angular change of each of the cascade segments 1710, but need not be. For example, offset linkages or reaction points may be provided on one or more of the cascade segments 1710 relative to the action point 1789 and/or each other, defining different lever arm lengths and allowing tunability of rotation between each of the cascade segments 1710.

The embodiment of FIGS. 19 and 20 further includes a rotational guide 1772 provided for each of the cascade segments 1710. The rotational guide 1772 is configured to control rotation of the cascade segments 1710. For example, each cascade segment 1710 shown includes an upper bearing 1774 attached to its trailing member 1709c and a lower bearing 1776 attached to its leading member 1709a, each configured to interact with the rotational guide 1772. The rotational guide 1772 may not only control rotation between the stowed and deployed configurations, but may further control radial expansion of the cascade segments 1710 as described in greater detail with reference to FIGS. 21 and 22 below.

The actuation assembly 1712 is configured to increase an axial extent of the cascade assembly 1708. Expansion of the cascade segments 1710 may be accomplished by spacing apart of individual cascade members 1709a, 1709b, and 1709c of a given cascade segment 1710. Controlling this expansion, a segment biasing member 1792 may be provided for each of the cascade segments 1710. The segment biasing member 1792 as shown is attached to the leading member 1709a and the trailing member 1709c of a given cascade segment 1710. For compactness, the segment biasing member 1792 may be configured as a conformal spring, such as a spring formed by one or more electro discharge machine processes. The segment biasing member 1792 may be sized and shaped to follow an aerodynamic profile, for example a camber line of the given cascade segment 1710. In an embodiment, the segment biasing member 1792 is configured to conform to the intermediate member 1709b, for example along its camber line.

The segment biasing member 1792 acts to resist expansion of the given cascade segment 1710, and may also act to resist rotation of the given cascade segment 1710 axial shifting, and/or axial expansion of the cascade assembly 1708. As shown in FIGS. 19 and 20, each of the cascade segments 1710 is pivotable about a segment pivot 1790. In this embodiment, the segment pivots 1790 may also serve as attachment points for respective ones of the first linear biasing member 1784a and the second linear biasing members 1784b. Relative rotation of the cascade segments 1710 to one another may be controlled by various linkages as described above. As shown in FIGS. 19 and 20, an upper track 1793 may be provided to connect two or more cascade segments 1710 with one another. As shown leftmost on the page in FIGS. 19 and 20, one of the cascade segments 1710 may be directly fixed, for example through its upper bearing 1774, with the upper track 1793. Remaining cascade segments 1710 may have upper bearings 1774 that interface with one or more upper track slots 1794, allowing relative movement between the upper bearings 1774. As shown in the embodiment of FIGS. 25-30, it should be appreciated that a lower track (not shown) may additionally or alternatively be provided to control the cascade segments 1710 relative to one another using their respective lower bearings 1776.

Further features may also be provided to control expansion of a given cascade segment 1710. As shown in FIGS. 19 and 20, each of the cascade segments 1710 may be provided with an upper segment slot 1798 configured to control expansion with the trailing member 1709c and a lower segment slot 1799 configured to control expansion with the leading member 1709*a*. The upper segment slot 1798 is configured to control the upper bearing 1774 and the lower segment slot 1799 is configured to control the lower bearing 1776. By providing the upper and lower segment slots 1798 and 1799 on the cascade segment 1710, for example integral with its intermediate member 1709*b*, relative movement of the cascade members 1709*a*, 1709*b*, 1709*c* from each other can be achieved, for example to provide a high lift airfoil.

In the depicted embodiment, the upper and lower bearings 1774, 1776 are controlled in the respective upper and lower segment slots 1798, 1799 with respect at least to expansion of the cascade segment 1710. Relative rotation between cascade members 1709*a*, 1709*b*, 1709*c* may be independently controlled, for example with one or more anti-rotation features. For example, a non-circular bearing surface may be provided to control rotation within the upper and lower segment slots 1798, 1799. In the embodiment depicted, an upper anti-rotation feature 1795 is configured to control rotation of the trailing member 1709*c* and a lower anti-rotation feature 1796 is configured to control rotation of the leading member 1709*a*. The upper anti-rotation feature 1795 is configured to interface between the trailing member 1709*c* and the intermediate member 1709*b* and the lower anti-rotation feature 1796 is configured to interface between the leading member 1709*a* and the intermediate member 1709*b*. For example, the intermediate member 1709*b* may be configured with a slot configuration on either end to accept a pin configuration of each of the trailing member 1709*c* and the leading member 1709*a*.

Figure 21:
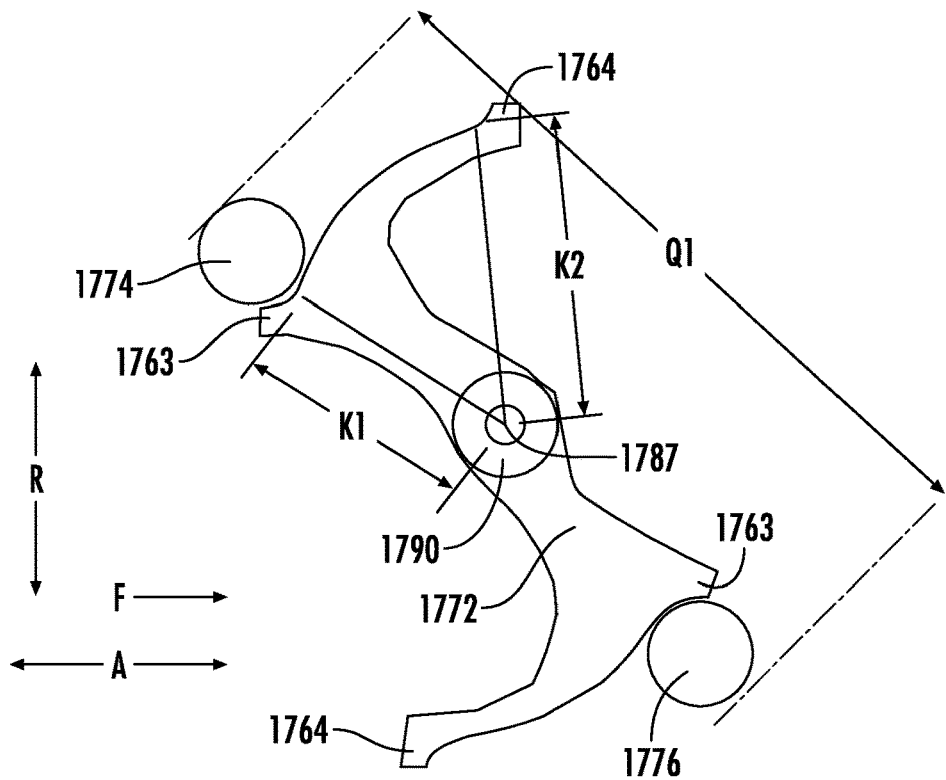
FIG. 21 is a schematic, side view of components of FIG. 19 in isolation in the stowed configuration.
Figure 22:
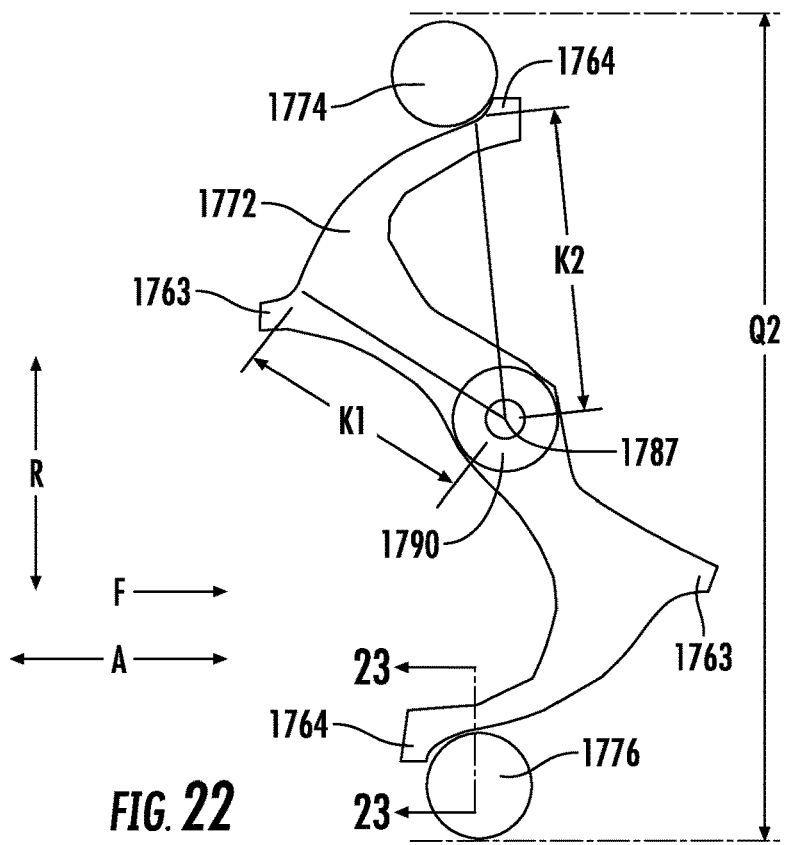
FIG. 22 is a schematic, side view of the components of FIG. 21 in the deployed configuration.

Turning now to FIGS. 21 and 22, FIG. 21 is a schematic, side view of the rotational guide 1772 and upper and lower bearings 1774, 1776 of FIG. 19 in isolation in the stowed configuration, while FIG. 22 depicts the same in the deployed configuration. The upper and lower bearings 1774, 1776 are configured to run along a surface of the rotational guide 1772 between a stowage stop 1763 and a deployment stop 1764. The stowage stop 1763 is configured to stop movement of the upper and lower bearings 1774, 1776 at a fully stowed position, while the deployment stop 1764 is configured to stop movement of the upper and lower bearings 1774, 1776 at a fully deployed position. As such, the stowage stop 1763 and the deployment stop 1764 can control a maximum amount of rotation of the cascade segments 1710. In cooperation with one or more other features, such as the upper track 1793 and/or the upper segment slot 1798 and/or the lower segment slot 1799, the stowage stop 1763 and the deployment stop 1764 can also effectively control axial shifting or expansion of the cascade assembly 1708 (FIG. 20) as a whole.

Movement of the upper or lower bearings 1774, 1776 from the stowage stop 1763 to the deployment stop 1764 may also control expansion of the cascade segment 1710 (FIG. 20), for example to increase its radial extent in the deployed configuration. As shown in FIGS. 21 and 22, a first bearing distance K1 represents a distance between one of the upper or lower bearings 1774, 1776 at the stowage stop 1763 and a pivot point 1787. The pivot point 1787 represents a point of relative rotation between the rotational guide 1772 and the cascade segment 1710. A second bearing distance K2 represents a distance between one of the upper or lower bearings 1774, 1776 at the deployment stop 1764 and the pivot point 1787. To increase the radial extent of a given cascade segment in the deployed configuration and decrease that radial extent for stowage, the rotational guide 1772 is configured such that the second bearing distance K2 is greater than the first bearing distance K1. The rotational guide 1772 may be configured such that the first and second bearing distances K1, K2 are the same for both the upper and lower bearings 1774, 1776, providing a first bearing spacing Q1 more than double the first bearing distance K1 and a second bearing spacing Q2 more than double the second bearing distance K2. However, it should also be appreciated that the first and second bearing distances K1, K2 may differ for the upper and lower bearings 1774, 1776, for example with the same interval at a higher or lower starting point, or with a different interval and same or different starting points.

Figure 23:
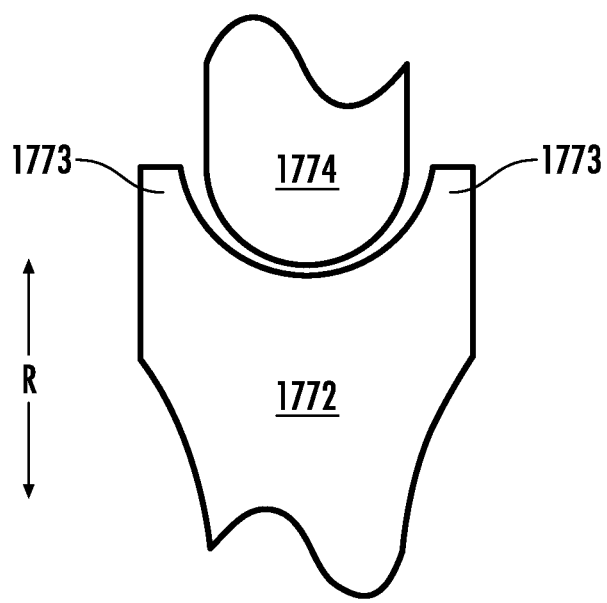
FIG. 23 is a partial, sectional view of components of FIG. 22 in isolation.

Referring now to FIG. 23, depicted is a partial, sectional view of the upper bearing 1774 and the rotational guide 1772 as shown in FIG. 22. The rotational guide 1772 may further include one or more control stops 1773 to maintain the upper and/or lower bearings 1774, 1776. As shown, a control stop 1773 is provided on either side of the upper bearing 1774 to resist movement of the upper bearing 1774 off of the rotational guide 1772.

Figure 24:
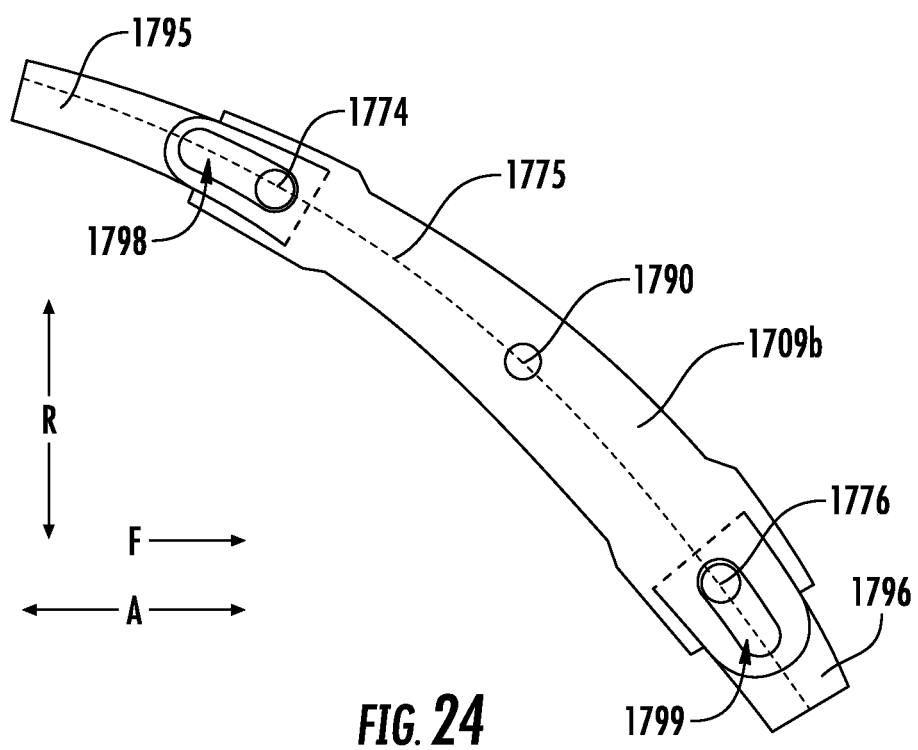
FIG. 24 is a schematic, side view of components of FIG. 19 in isolation in the stowed configuration.

Referring now to FIG. 24, a schematic, side view of an intermediate member 1709*b* and associated component of FIG. 19 are shown in isolation in the stowed configuration. As can be seen, at least a portion of the upper bearing 1774 is configured to ride within the upper segment slot 1798 between a minimum (stowed) and a maximum (deployed) position. The lower bearing 1776 and the lower segment slot 1799 are configured in a similar arrangement. The lower bearing 1776 may be connected with the lower anti-rotation feature 1796 and the upper bearing 1774 connected with the upper anti-rotation feature 1795, for example as the pin and slot configuration described above. Also, the portion of the upper bearing 1774 in the upper segment slot 1798 and the portion of the lower bearing 1776 in the lower segment slot 1799 may be configured so as to be non-rotatable within the respective slot, for example as an oblong configuration. In such an embodiment, lateral travel of the respective bearing and slot may be accomplished while maintaining a relative rotational position. It should be appreciated that, as shown in FIGS. 19 and 20, the leading and trailing members 1709*a*, 1709*c* may also be operably connected to the respective bearings 1774, 1776 and anti-rotation features 1795, 1796. In an embodiment, the leading member 1709*a* and/or the trailing member 1709*c* may cooperate with the intermediate member 1709*b* to control rotation without the need for a distinct anti-rotation feature.

Also depicted in FIG. 24 is a camber line 1775 of the intermediate member 1709*b*, which is indicative of a camber line of the airfoil formed by the cascade members 1709*a*, 1709*b*, 1709*c*. The arrangement may be configured such that the segment slots 1798, 1799 follow the camber line 1775, such that the airfoil maintains its camber line when deployed and stowed. Additionally, the segment biasing member (not shown, reference numeral 1792 in FIGS. 19 and 20) may also conform to this camber line 1775 as described in greater detail with reference to FIGS. 19 and 20. It should also be appreciated that the arrangement may be configured such that the airfoil follows any intended deployment path and is not constrained to conforming with the camber line 1775.

Figure 25:
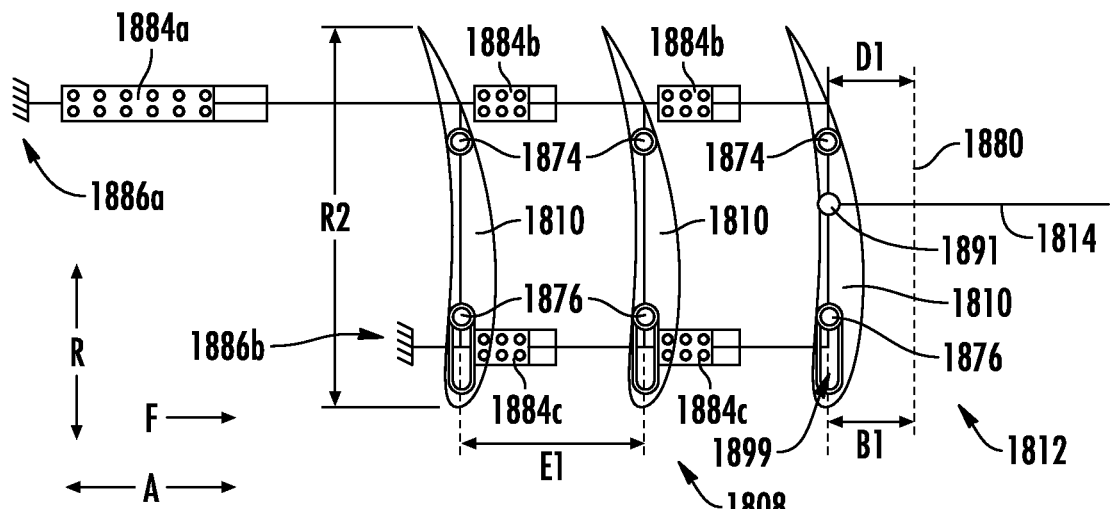
FIG. 25 is a schematic, side view of another embodiment of components of a cascade assembly in a deployed configuration.

Referring now to FIG. 25, a schematic, side view of another embodiment of a cascade assembly 1808 is depicted in a deployed configuration. This embodiment differs from that in FIGS. 19 and 20 in that each cascade segment 1810 is not provided with individual cascade segments as shown in FIGS. 19 and 20. However, it should be appreciated that other features of this embodiment could also be applicable to embodiments having distinct cascade members such as that of FIGS. 19 and 20.

FIG. 25 provides an actuation assembly 1812 configured to act on a reaction point 1891 of the cascade assembly 1808. An actuation arm 1814 is provided, as could any suitable transmission between the actuation assembly 1812 and the cascade assembly 1808. An upper bearing 1874 and a lower bearing 1876 are provided for each of the plurality of cascade segments 1810. The relative positions of the cascade segments 1810 may be controlled by control of the upper and lower bearings 1874, 1876. For example, one or more bearing tracks (not shown) may be provided. The cascade assembly 1808 and the actuation assembly 1812 may also be configured to cooperate such that the upper and/or lower bearings 1874, 1876 run along a linear path, for example through the use of a lower track or segment slot 1899 in the cascade segments 1810 in which the lower bearings 1876 are controlled.

Figure 26:
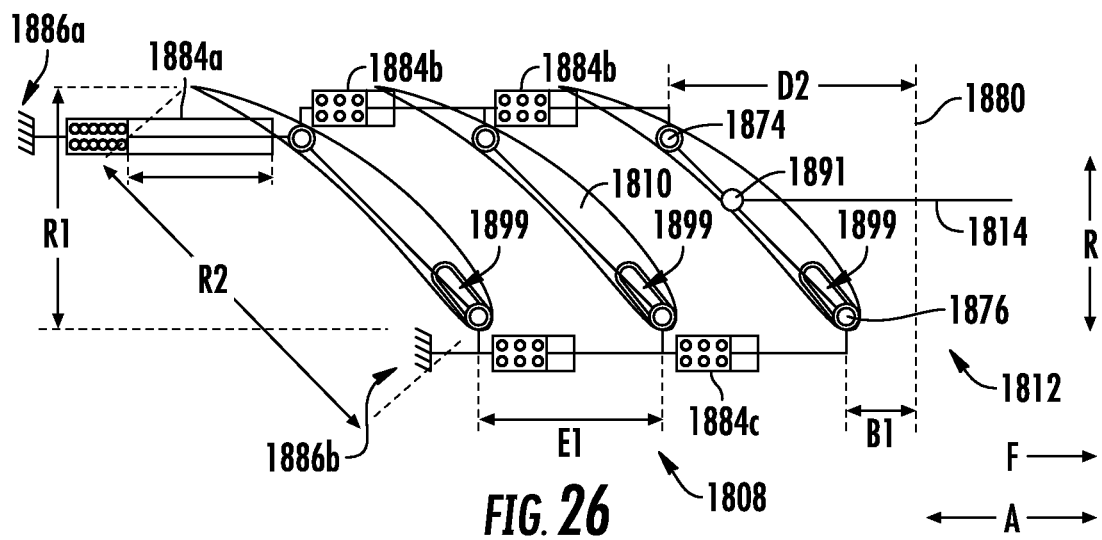
FIG. 26 is a schematic, side view of the components of FIG. 25 in a second stowed configuration.
Figure 27:
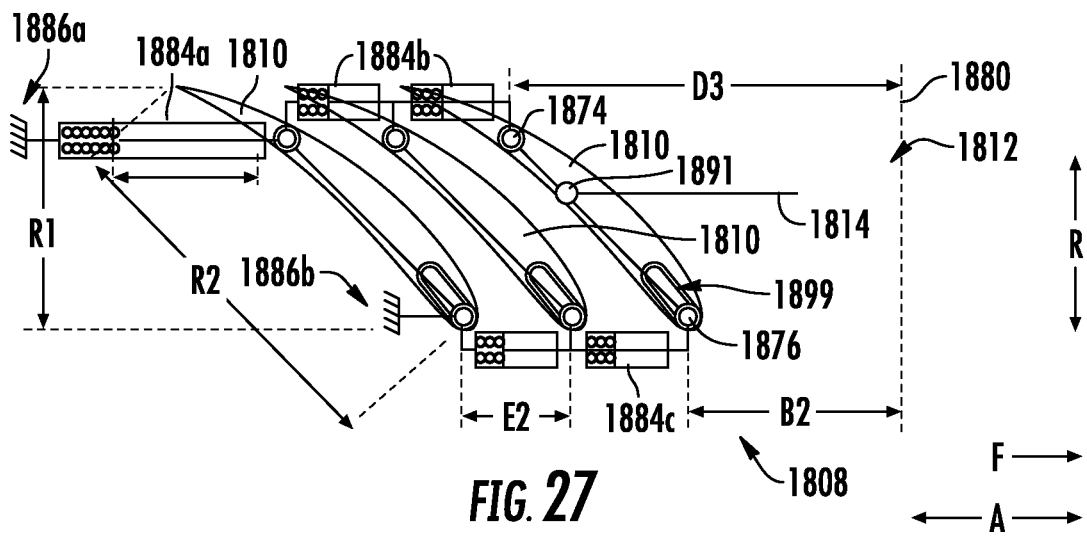
FIG. 27 is a schematic, side view of the components of FIG. 25 in a first stowed configuration.

One or more connections between the cascade assembly 1808 and another engine component such as the nacelle (not shown) may be provided to counter a force provided by the actuation assembly 1812. As shown in FIGS. 25-27, a first fixed point 1886a is configured to control movement of the upper bearings 1874 and a second fixed point 1886b is provided to control movement of the lower bearings 1876. A first linear biasing member 1884a is provided between the first fixed point 1886 and connection to the upper bearing 1874 of at least one cascade segment 1810. In the present embodiment, no biasing member is connected between the second fixed point 1886b and the lower bearing 1876 of at least one cascade segment 1810. Based on this configuration, relative movement in the axial direction A between the upper bearings 1874 and the lower bearings 1876 is facilitated. It should also be appreciated that this relative movement could be achieved with a biasing member (not shown) connected between the second fixed point 1886b and the lower bearing 1876, for example by providing different spring rates or travel distances of the different biasing members.

Additional biasing members are provided to further control actuation of the cascade assembly 1808. A second linear biasing member 1884b is provided between each of the upper bearings 1874 and a third linear biasing member 1884c is provided between each of the lower bearings 1876. As will be discussed in greater detail below, tuning of the various biasing members can be used to control timing and distance of various stowage and deployment operations.

Relative movement in the axial direction A between the upper bearings 1874 and the lower bearings 1876 is used to tilt or rotate the cascade segments 1810 as shown in FIG. 26. As shown, the first biasing member resists this stowing actuation force, but compresses whereas the connection between the second fixed point 1886b and the lower bearing 1876 does not. With use of a reference plane 1880, for example indicative of a nacelle component (not shown) an axial displacement of the upper bearings 1874 and the lower bearings 1876 is measurable. As shown in FIG. 25, a first upper axial displacement D1, representative of a rest state wherein the upper bearings 1874 of the cascade assembly 1808 are completely deployed and the first and second linear biasing members 1984a, 1984b are fully extended, is achieved.

Also in FIG. 25, a first lower axial displacement B1, representative an "at rest" state wherein the lower bearings 1876 of the cascade assembly 1808 are completely deployed and the third linear biasing members 1984c are fully extended. A segment spacing may also be defined based on an axial distance between adjacent bearings. In this embodiment, bearing spacing between adjacent upper bearings 1874 remains constant with bearing spacing between adjacent lower bearings 1876. Accordingly, reference will be made to a first segment spacing E1 representative of upper and lower segment spacings. However, it should be appreciated that upper and lower segment spacings may be tuned to differ in various embodiments, for example to account for different thicknesses at leading and trailing edges for compact stowage.

As described above, the cascade assembly 1808, in contrast with that in FIGS. 19 and 20, is biased towards the deployed configuration. Based on aspects of various engine and nacelle design, either configuration could be tailored to efficiently deploy and stow. For example, by providing a cascade assembly that is biased towards deployment as in FIGS. 25-27, and individual cascade members (not shown) that are biased towards stowage, as depicted in FIGS. 19 and 20, the counteracting spring forces may reduce forces and strain on components of the cascade assembly 1808 and the actuation assembly 1812.

Moving from FIG. 25 to FIG. 26, an actuation force on the reaction point 1891 causes compression of the first linear biasing member 1884a and resulting movement of the upper bearings 1874. As used herein, the terms "compression" and "expansion" refer to change in axial distance of a biasing member, and not of any specific spring movement, recognizing that an expanding spring may control a compression in distance. As shown, a second upper axial displacement D2 is now measured, while the first lower axial displacement B1 and the first segment spacing E1 remain the same. As such, the upper bearings 1874 have shifted while the lower bearings 1876 remain in place, and the cascade segments 1810 maintain their positions relative to one another. The movement from FIG. 25 to FIG. 26 is accomplished by overcoming spring force of the first linear biasing member 1884a. In this embodiment, the second linear biasing members 1884b and the third linear biasing members 1884c do not begin compressing until after the first linear biasing member 1884a has reached the point in FIG. 26. Various other configurations are contemplated, for example wherein all biasing members compress simultaneously but at varied rates. Preferential compression of the first linear biasing member 1884a facilitates rotation to a stowage position, for example to allow the cascade segments 1810 to fit inside a limited radial dimension of the nacelle assembly (not shown). The decrease in radial extent is indicated by the second radial extent R2 in FIG. 25 decreasing to the first radial extent R1 in FIG. 26. Based on the control of this rotational change, the first linear biasing member 1984a may also be referred to as a rotational biasing member.

Also shown in FIG. 26, the lower bearings are movable within a segment slot 1899. This slotted movement allows for lowering of the cascade segments 1810 further into the bypass passage (not shown) in the deployed configuration. Additionally, the segment slot 1899 facilitates movement along a linear track of the upper bearings 1874 and movement along a distinct linear track of the lower bearings 1876. It should be appreciated that the segment slot 1899 could additionally or alternatively control the upper bearings 1874 directly to achieve this purpose.

Moving from FIG. 26 to FIG. 27, the cascade segments 1810 are moved closer to one another for stowage by force imparted to the reaction point 1891 by the actuation assembly 1812. This imparted force overcomes the resistance in the second linear biasing members 1884b and the third linear biasing members 1884c. A result is that a second segment spacing E2, less than the first segment spacing E1 of FIGS. 25 and 26, is measured. As described above, it is also conceivable that the third linear biasing members 1884c are configured to resist compression more or less than the second linear biasing members 1884b, resulting in differential spacing between upper and lower portions of adjacent cascade segments 1810. As a result of the compression between adjacent cascade segments 1810, a third upper axial displacement D3 and a second lower axial displacement B2 are also measured. The third upper axial displacement D3 is greater than the second upper axial displacement D2 and the second lower axial displacement B2 is greater than the first lower axial displacement B1. Accordingly, the plurality of upper bearings 1874 are configured to travel a greater linear distance along their upper path than the plurality of lower bearings 1876 are on their lower path.

Figure 28:
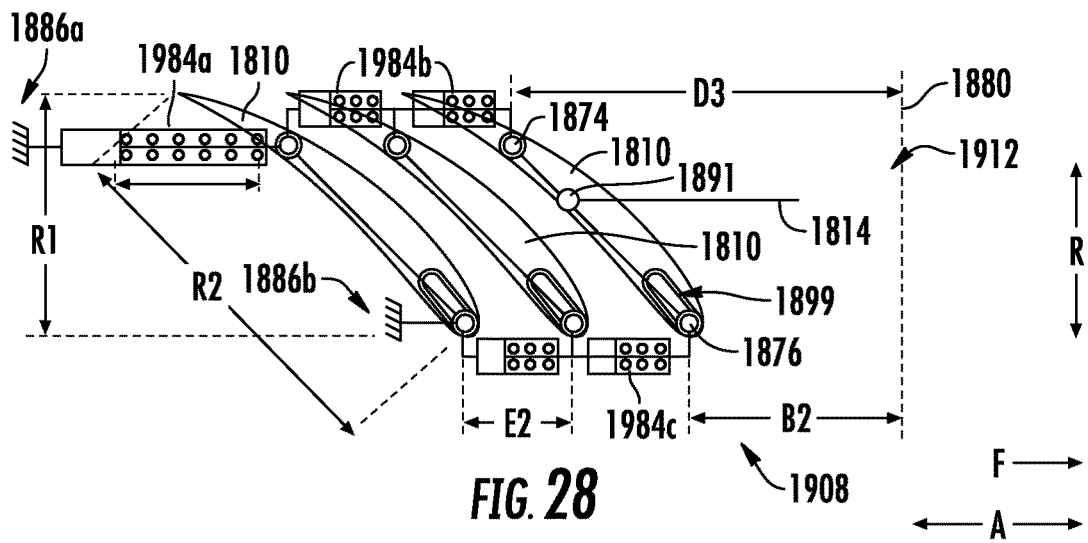
FIG. 28 is a schematic, side view of another embodiment of components of a cascade assembly in a first stowed configuration.
Figure 29:
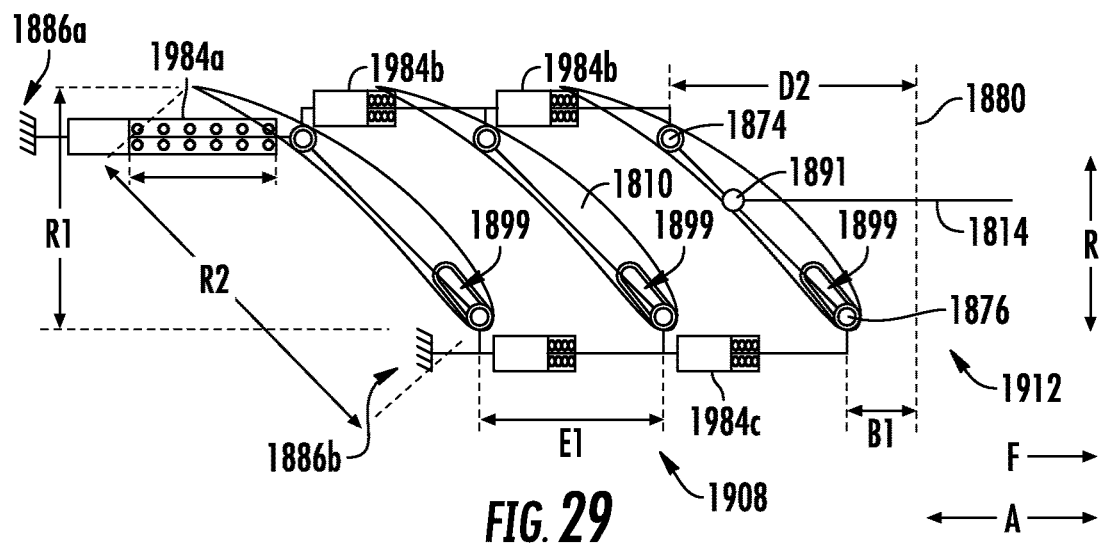
FIG. 29 is a schematic, side view of the components of FIG. 28 in a second stowed configuration.
Figure 30:
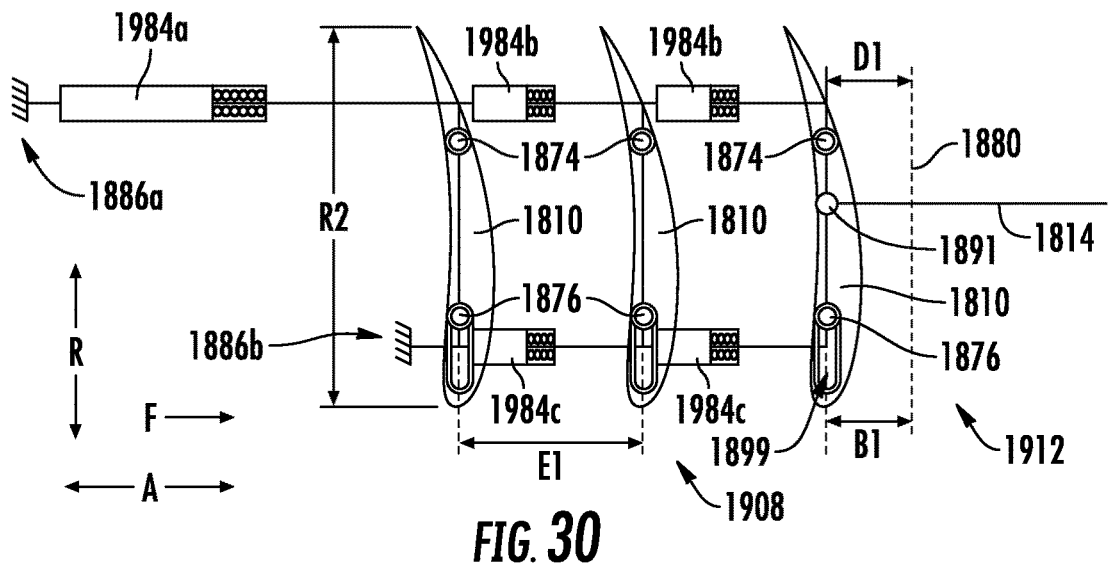
FIG. 30 is a schematic, side view of the components of FIG. 28 in a deployed configuration.

Referring now to FIG. 28, a schematic, side view of another embodiment of components of a cascade assembly 1908 is depicted in a first stowed configuration. As depicted, the cascade assembly 1908 is actuatable by an actuation assembly 1912. The cascade assembly 1908 and the actuation assembly 1912 differ from those in FIGS. 25-27 in that various biasing members provide force in the opposite direction. Accordingly, the actuation assembly 1912 is configured to provide greater force in the deployment direction rather than the stowage direction as in FIGS. 25-27. As shown in FIGS. 28-30, each of a first linear biasing member 1984a, a plurality of second linear biasing members 1984b, and a plurality of third linear biasing members 1984c is arranged to bias the cascade assembly 1908 towards to stowed configuration.

Moving from FIG. 28 to FIG. 29, a first deployment operation is performed. In this operation, the spacing is increased between adjacent cascade segments 1810 from the second segment spacing E2 to the first segment spacing E1. In this embodiment, axial expansion is performed preferential to rotation during deployment. Similar to the rationale described with reference to FIGS. 25-27 for performing rotation before axial compression during stowage, this configuration allows the cascade assembly 1908 to clear obstructions such as a nacelle assembly (not shown) prior to rotation for full deployment. As such, while the second lower axial displacement B2 is reduced to the first lower axial displacement B1 and the third upper axial displacement D3 is reduced to the second upper axial displacement D2, the amount of each reduction is the same such that rotation is not performed.

Moving from FIG. 29 to FIG. 30, a second deployment operation is performed to achieve complete deployment of the cascade assembly 1908. In this operation, rotation is performed by expanding the first linear biasing member 1984a to reduce from the second upper axial displacement D2 to the first upper axial displacement D1. As there is no change in the first lower axial displacement B1 already achieved in FIG. 29, rotation is effected.

Figure 31:
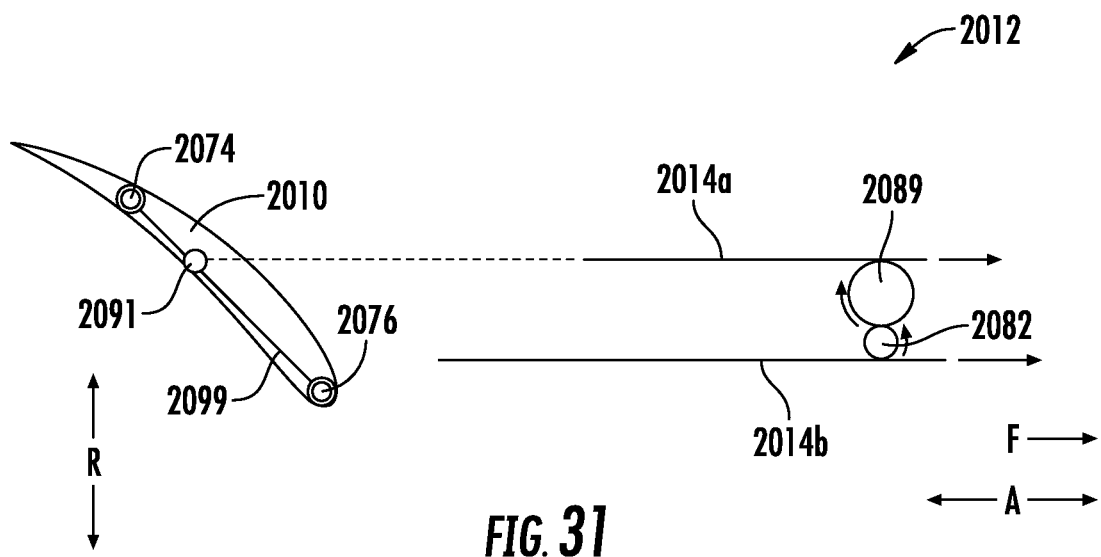
FIG. 31 is a schematic, side view of an actuation assembly according to an embodiment.

Referring now to FIG. 31, a schematic, side view of components of an actuation assembly 2012 is provided. The configuration of FIG. 31 may be used to operate any of the various embodiments of the cascade assembly described herein. As shown in FIG. 31, a first actuation arm 2014a is provided to connect the actuation assembly 2012 with a cascade assembly (not shown) herein represented by connection to a cascade segment 2010. The first actuation arm 2014a is controlled by a cascade gear 2089, which provides a motive force to the cascade assembly (not shown) through the first actuation arm 2014a. For example, the cascade gear 2089 may be a directly or an indirectly driven pinion gear engaged with a rack configuration of the first actuation arm 2014a. Rotation, axial expansion, axial displacement, and radial expansion can be effected by movement of the first actuation arm 2014a as described elsewhere herein. For example, an upper bearing 2074 may be configured to follow an upper linear path and a lower bearing 2076 may be configured to follow a lower linear path of less distance than the upper linear path. As shown in FIG. 31, the first actuation arm 2014a is connected to the cascade segment 2010 via a reaction point 2091. By locating the reaction point 2091 at a position other than a midpoint of a bearing spacing 2099, which in this embodiment is of a fixed distance, rotation can be controlled with the same linear movement, for example facilitated by a slotted configuration of the cascade segment 1810 as described above with reference to FIGS. 25-30.

In addition to the first actuation arm 2014a, a second actuation arm 2014b is also provided in FIG. 31. The second actuation arm 2014b may be configured to deploy another component, for example a cascade cover (not shown) as described above. The second actuation arm 2014b in this embodiment is controlled by the same motive force as the first actuation arm 2014a by connection to a cover gear 2082. The cover gear 2082 is engaged with the cascade gear 2089 such that they rotate in opposite directions. In the above-described rack and pinion configuration, this opposite rotation facilitates linear movement in the same direction. Accordingly, actuation of the cascade gear 2089 is operable to move the first actuation arm 2014a in a first direction at the same time as moving the second actuation arm 2014b in the first direction. In this way, the cascade assembly (not shown) can be deployed in the first direction simultaneously with movement of the cascade cover (not shown) from a closed position to an open or deployed position in which an intermediate opening (not shown) in the nacelle assembly (not shown) is revealed for thrust reversing. It should also be appreciated that the second actuation arm 2014b may additionally or alternatively control further features, for example blocker doors (not shown) as described above.

Figure 32:
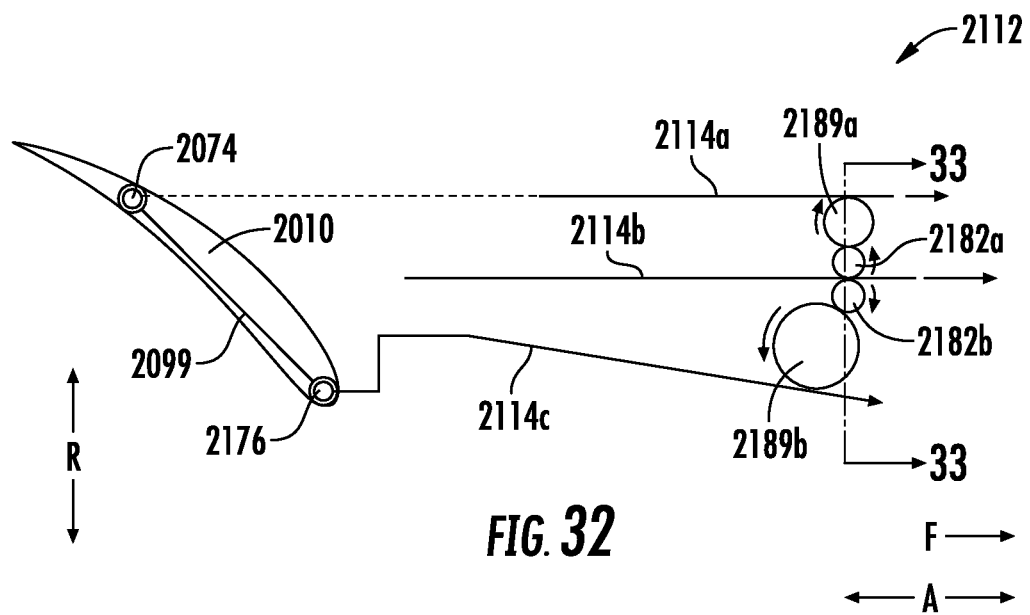
FIG. 32 is a schematic, side view of an actuation assembly according to another embodiment.

Referring now to FIG. 32, a schematic, side view of components of another embodiment of an actuation assembly 2112 is provided. In contrast with the embodiment of FIG. 31 the actuation assembly 2112 is configured to act directly on at least one of an upper bearing 2174 of the cascade segment 2010. The upper bearing 2174 receives force from the actuation assembly 2112 via a first actuation arm 2114a. The first actuation arm 2114a may be driven by a first cascade gear 2189a, for example as described with reference to FIG. 31 above. The first cascade gear 2189a is configured to interface with a second actuation arm 2114b, for example to operate a cascade cover (not shown) as described above with reference to FIG. 31.

Additionally in FIG. 32, a third actuation arm 2114c is provided to act directly on at least one lower bearing 2176. Between the first actuation arm 2114a and the third actuation arm 2114c, it should be appreciated that independent control of the lower bearings 2176 and the upper bearings 2174 can be achieved. For example, a size of a second cascade gear 2189b configured with respect to a connected first cascade gear 2189a to regulate relative movement speeds of the upper and lower bearings 2174, 2176. The second cascade gear 2189b as shown in FIG. 32 is larger than the first cascade gear 2189a, thus providing slower movement of the upper bearings 2174 than the lower bearings 2176 with all else being equal. The second cascade gear 2189b is connected with the first cascade gear 2189a through a first cover gear 2182a and a second cover gear 2182b. In the depicted embodiment, the first and second cover gears 2182a, 2182b are configured to rotate at equal speeds on either side of the second actuation arm 2114b. In this embodiment, even if the second cover gear 2182b were configured to rotate at the same speed as the first cover gear 2182a, differential movement could still be achieved, for example by angling the third actuation arm 2114c away from the lower linear bearing path. In this embodiment, the reduced movement per rotation in that lower linear bearing path would facilitate relatively faster movement in the upper linear bearing path and thus rotation of the cascade segment 2010 during deployment.

Figure 33:
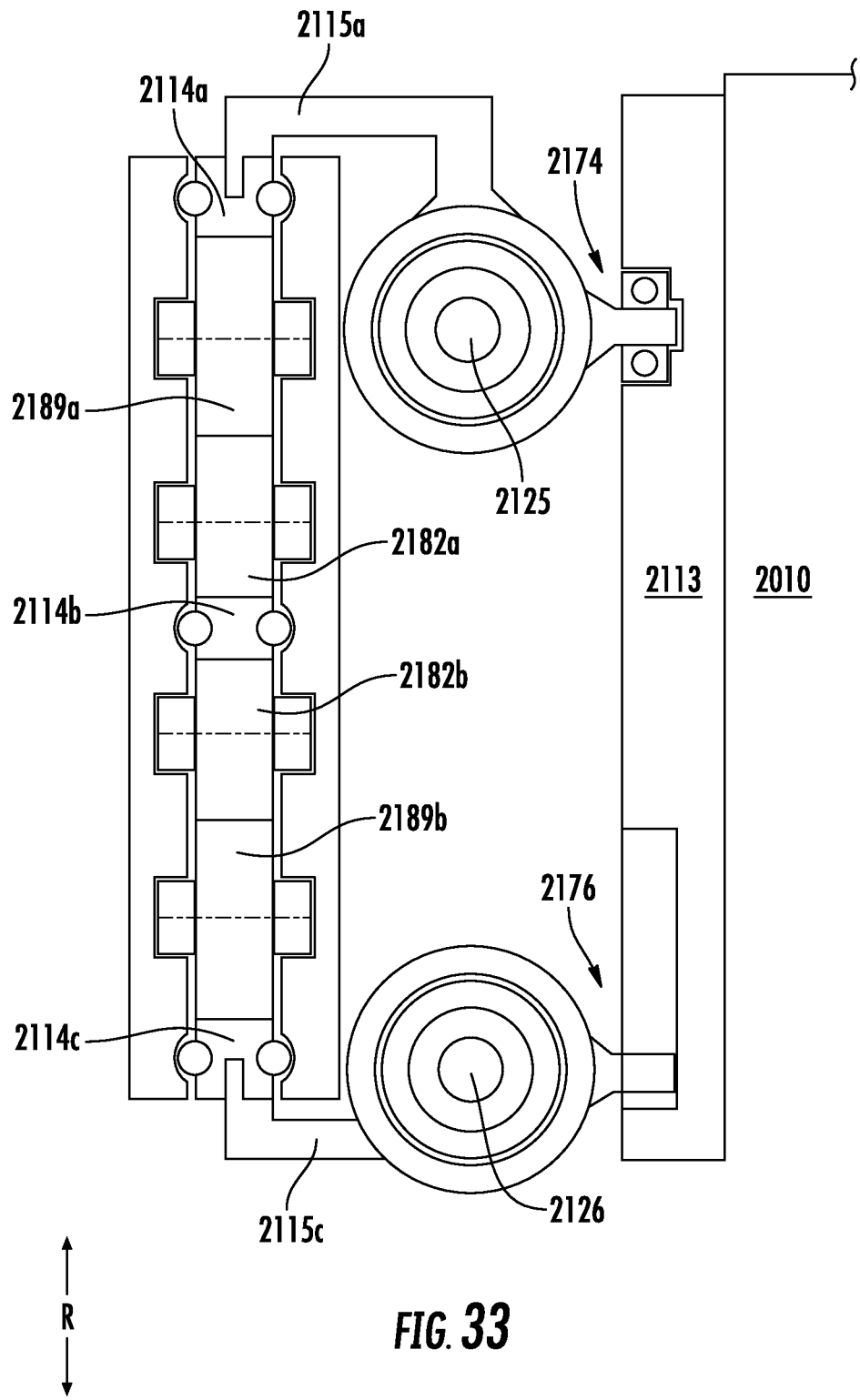
FIG. 33 is a sectional, schematic, longitudinal view of the actuation assembly of FIG. 32 in greater detail.

Referring now to FIG. 33, a sectional, schematic, longitudinal view of the actuation assembly 2112 of FIG. 32 is shown in greater detail. As can be seen in FIG. 33, control of the cascade assembly via the upper and lower bearings 2174, 2176 is not necessarily direct. As shown, the first actuation arm 2114a imparts movement to a first intermediate arm 2115a movable along an upper guide 2125. Movement of the first intermediate arm 2115a in turn controls the upper bearing 2174. The second actuation arm 2114b as shown may go directly back towards further components such as a cascade cover (not shown) and/or blocker doors (not shown) or may further have intermediate members (not shown) provided therebetween. The third actuation arm 2114c imparts movement to a third intermediate arm 2115c movable along a lower guide 2126. It should be appreciated that the upper guide 2125 is operable to control the upper bearings 2174 on the upper bearing path and the lower guide 2126 is operable to control the lower bearings 2176 on the lower bearing path. As shown in FIG. 33, the lower bearing 2174 is an assembly including a pin and slot joint, for example that depicted in FIGS. 25-30 as the segment slot 1899. However, it should be understood that any suitable bearing may be used as the upper bearings 2174 or the lower bearings 2176, and further configurations may ensure relative movement between at least some of the upper and/or lower bearings 2174, 2176 with the corresponding cascade segments 2010. As shown in FIG. 33, a cascade support 2113 may be provided to interface between the upper and lowering bearings 2174, 2176 and the corresponding cascade segments 2010.

Figure 34:
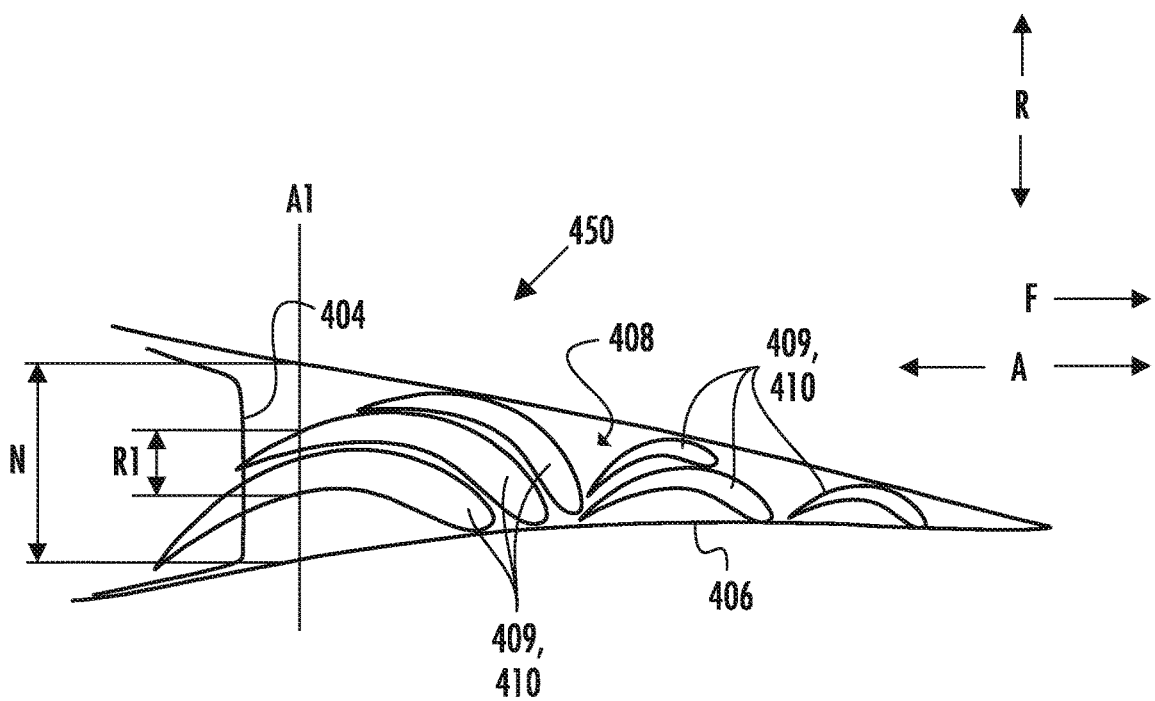
FIG. 34 is a schematic, side view of a cascade assembly in a stowed configuration.

Referring now to FIG. 34, an embodiment of a cascade assembly 408, for example to be provided for a thrust reverser assembly, is shown schematically with a plurality of cascade members 409 forming a respective plurality of cascade segments 410 in a stowed configuration within a nacelle assembly 450.

As depicted, the nacelle assembly 450 includes a first nacelle component 404, such as a fan cowl described with reference to FIGS. 2-4, and a second nacelle component 406, such as a transcowl as described with reference to FIGS. 2-4. The plurality of cascade members 409 is contained at least partially within the first and second nacelle components 404, 406 in the depicted stowed configuration. It should be understood that the plurality of cascade members 409 that together from the cascade assembly 408 could be entirely contained within a single component such as the second nacelle component 406 or a transcowl when in the stowed configuration. Alternatively, as in the case of an axially translating cascade assembly 108 as described with reference to FIGS. 2-4, the plurality of cascade members 409 may be entirely contained within the first nacelle component 404 or the fan cowl.

Figure 35:
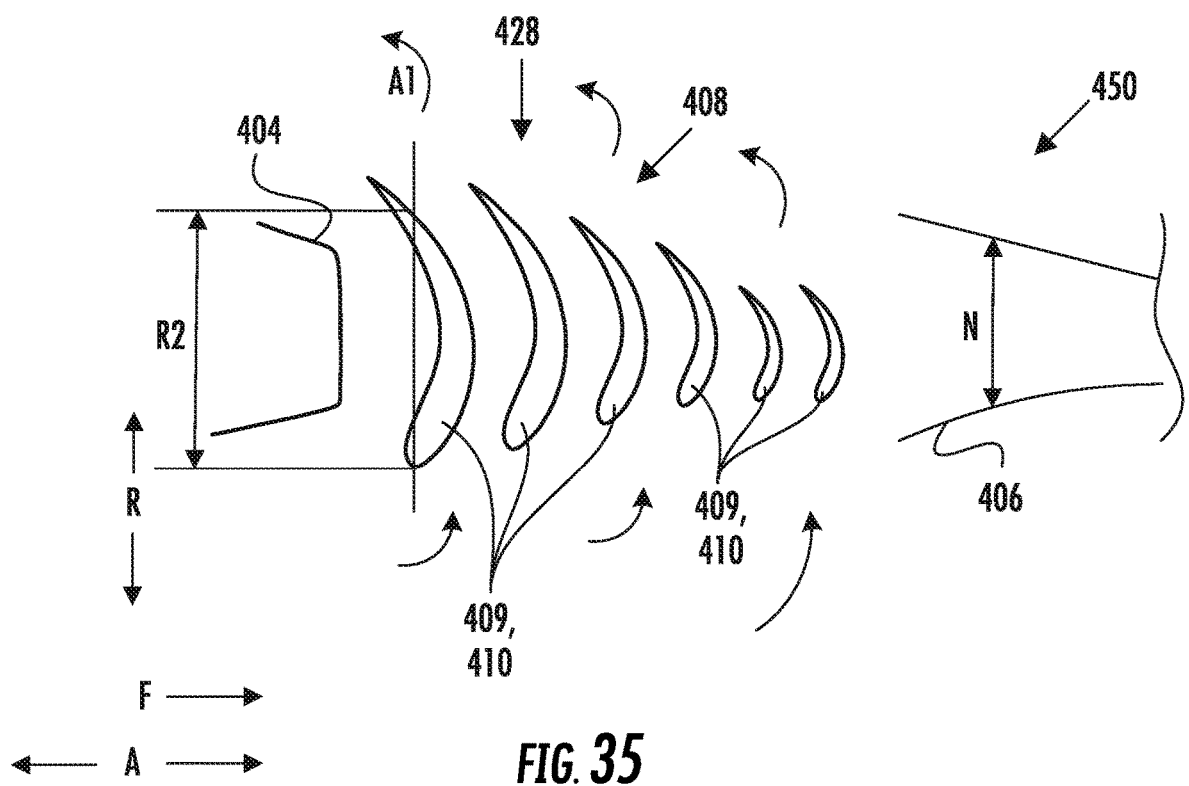
FIG. 35 is a schematic, side view of the cascade assembly of FIG. 34 in a deployed configuration.

FIG. 35 depicts the embodiment of the cascade assembly 408 shown in FIG. 34 with the plurality of cascade members 409 forming the respective plurality of cascade segments 410 in a deployed configuration. In the deployed configuration, the first nacelle component 404 and the second nacelle component 406 are moved apart from one another to form a cascade opening 428. The cascade opening 428 reveals the cascade assembly 408 in its deployed configuration. As described above, the cascade opening 428 may be provided by moving the second nacelle component 406 or transcowl aft in the axial direction A relative to the first nacelle component 404. In this case, the second nacelle component 406 may also be referred to as a cascade cover which is movable to reveal the cascade assembly 408 in an open position and to at least partially cover the cascade assembly 408 in a closed position. Although the second nacelle component 406 or transcowl depicted in FIGS. 34 and 35 is described as forming the cascade cover in the embodiment depicted, it should be understood that any number of existing components of the nacelle assembly 50 or further components of the turbofan engine 10 may be configured to form the cascade cover.

With the cascade opening 428 closed by a cascade cover as described above with reference to the second nacelle component 406 depicted, airflow through the cascade assembly 408 may be inhibited. For example, air may flow through the bypass airflow passage 56 (see FIG. 1) generally uninterrupted in the airflow direction F. For example, less than 10% of a mass flow of an air through the bypass airflow passage 56 may pass through the cascade opening 428 when the cascade opening 428 is closed by the cascade cover. With the cascade opening 428 revealed as in FIG. 35, flow is facilitated through the cascade assembly 408 as indicated by the unlabeled flow arrows. Airflow from inside the turbofan engine 10, e.g. from the bypass airflow passage 56 (see FIG. 1) can be redirected from the airflow direction F. In various embodiments the cascade assembly 408 is configured to redirect airflow to a direction generally opposing the airflow direction F. Although airflow through the cascade assembly 408 and cascade opening 428 may not exit exactly opposite the airflow direction F, airflow with any velocity component opposing the airflow direction F may beneficially provide reverse thrust.

For the purposes of comparison, radial extents R1, R2 of cascade assemblies 108, 208, 308, 408 as described herein can be related to radial dimensions or extents of other components based on a common axial position A1 relative to the longitudinal centerline 12 (see, e.g., FIGS. 3 and 4). For example, a nacelle thickness N may be defined at a fixed location in the axial direction A along the longitudinal centerline 12 relative to, e.g., the turbomachine 16 or the aircraft (not shown). At this fixed location, the nacelle thickness N can be compared to the first radial extent R1 or the second radial extent R2 defined at the same axial location. For example, as depicted in FIG. 34, the nacelle thickness N can in this manner be compared to the first radial extent R1 in the corresponding axial position A1 of the cascade assembly 408 in the stowed configuration. As shown in FIG. 35, the nacelle thickness N can be compared to the second radial extent R2 in the corresponding axial position A1 of the cascade assembly 408 in the deployed configuration. It should be understood that the axial position A1 is merely provided for reference anywhere within a range of movement of the measured components. As depicted, the reference measurements of first and second radial extents R1, R2 are taken at the axial position A1 in the stowed and deployed configurations, respectively, while the radial thickness N is taken in the stowed configuration.

In the depicted embodiment, at a given axial location, the nacelle thickness N is greater than the first radial extent R1 such that the nacelle assembly 50 can enclose the cascade assembly 408 in the stowed configuration. In this embodiment, the second radial extent R2, e.g. in the deployed configuration of the cascade assembly 408, is greater than the nacelle thickness N. In this manner, a radially larger, more effective aerodynamic surface or combination of aerodynamic surfaces may be provided as a cascade segment 410. Accordingly, the nacelle thickness N being less than the second radial extent R2 as described herein can facilitate a more effective reverse thrust given the same compactness of the turbofan engine 10, a more compact turbofan engine 10 given the same reverse thrust capabilities, or a combination of more effective reverse thrust and a more compact turbofan engine 10.

The embodiment of FIGS. 34 and 35 differs from the embodiments shown in FIGS. 8-11 in that each of the cascade segments 410 is formed by only one cascade member 409. To achieve the relative dimensions N, R1, R2 described above, each cascade member 409 is repositionable to a more compact dimension relative to its deployed configuration. For example, each cascade member 409 can be configured to rotate at least 30 degrees between the stowed configuration and the deployed configuration, such as at least 45 degrees, such as at least 60 degrees (60°), such as up to 120 degrees (120°), such as by approximately ninety degrees (90°) as depicted between FIGS. 34 and 35. Also as depicted, the plurality of cascade members 409 can be configured to nest with one another to further increase compactness in the stowed configuration. Although not shown for clarity in the schematic depictions of FIGS. 34 and 35, various configurations of a cascade actuation assembly 212 (see, e.g. FIGS. 8-18) may be employed to achieve the desired rotation depicted between FIGS. 34 and 35.

Figure 36:
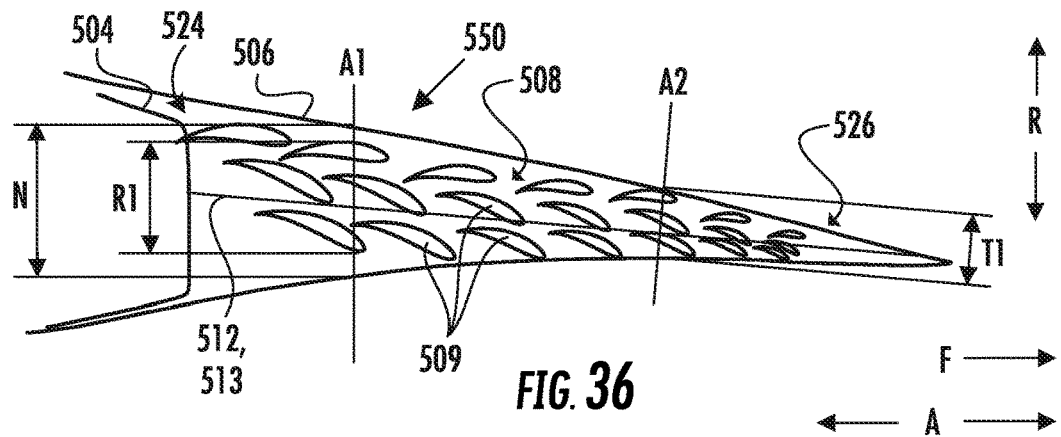
FIG. 36 is a schematic, side view of another embodiment of a cascade assembly in a stowed configuration.
Figure 37:
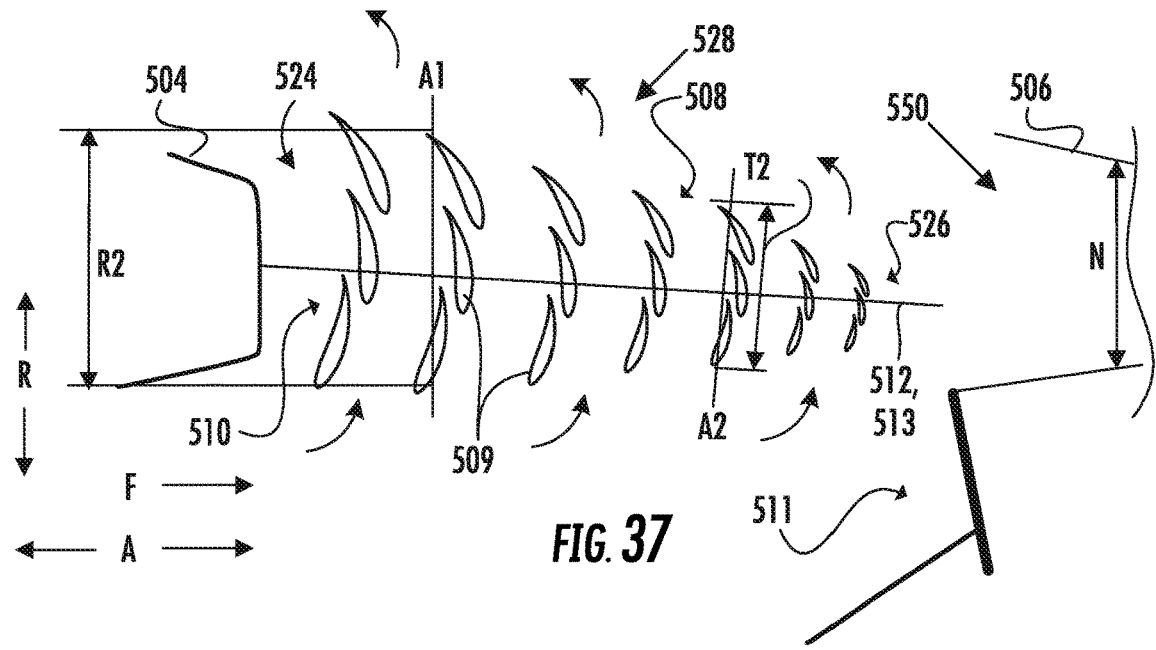
FIG. 37 is a schematic, side view of the cascade assembly of FIG. 36 in a deployed configuration.

Referring now to FIGS. 36 and 37, another embodiment of a cascade assembly 508 is shown schematically. FIG. 36 depicts the cascade assembly 508 with a plurality of cascade members 509 in a stowed configuration within a nacelle assembly 550, and FIG. 37 depicts the cascade assembly 508 with the plurality of cascade members 509 in a deployed configuration. As described above, the deployed configuration provides a second nacelle component 506 spaced apart from a first nacelle component 504.

The embodiment depicted in FIGS. 36 and 37 differs from that depicted in FIGS. 34 and 35 in that a plurality of cascade segments 510 of the cascade assembly 508 are each formed of a respective plurality of cascade members 509, as shown in FIG. 37. As depicted, three of the plurality of depicted cascade members 509 are configured to align to form a corresponding cascade segment 510 (similar to the embodiment of FIGS. 8 and 9). As depicted in FIG. 36, a first radial extent R1 can be measured as a total radial dimension of the plurality of cascade members 509 that cooperate to form a single cascade segment 510 when in the deployed configuration at a given first axial position A1.

Referring now particularly to FIG. 37, the embodiment is shown with each of the plurality of cascade members 509 forming the respective plurality of cascade segments 510 in a deployed configuration with a cascade opening 528 revealing the cascade assembly 508. As above, the cascade segment or segments 510 at the corresponding first axial position A1 in the deployed configuration define a second radial extent R2 generally corresponding to that defined with reference to FIGS. 34 and 35. It should be understood that the configuration of FIGS. 36-38 may enable an even larger radial extent R2 relative to the nacelle thickness N.

FIG. 37 also depicts a blocker assembly 511, for example including blocker doors, such as blocker doors 111 as described above with reference to FIG. 4. Although this embodiment is depicted with an independent blocker assembly 511, it is also possible to combine the blocker assembly 511 with another component such as the cascade assembly 508 as described above with reference to FIG. 3. The blocker assembly 511 is configured to redirect airflow in the turbofan engine 10 out of the cascade opening 528 through the cascade assembly 508.

Figure 38:
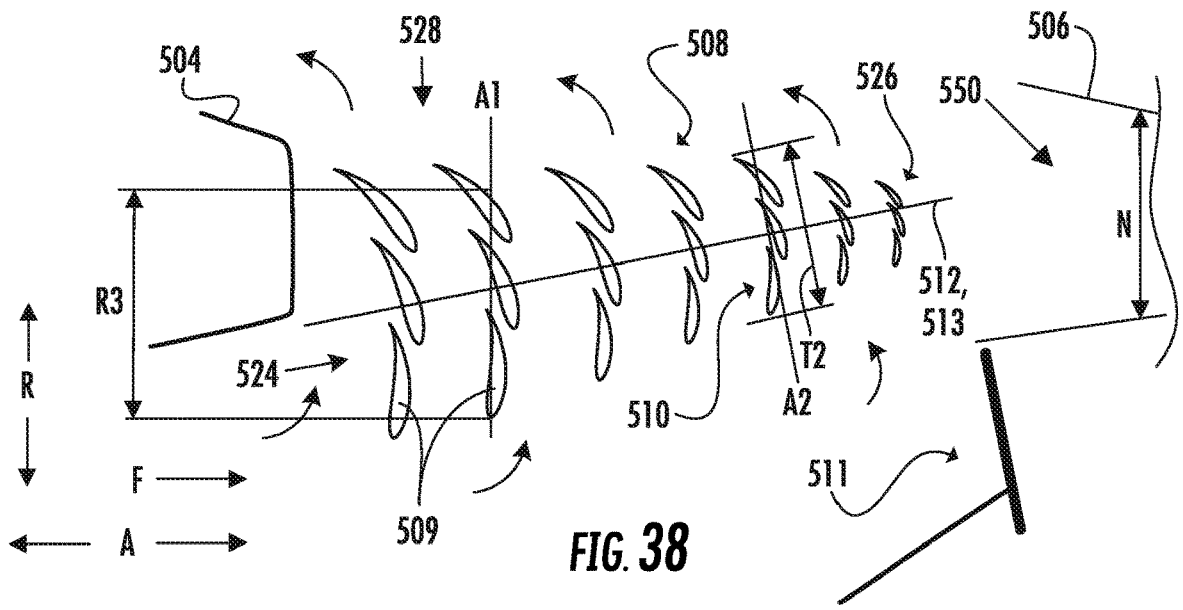
FIG. 38 is a schematic, side view of the cascade assembly of FIG. 36 in a deployed and lowered configuration.

FIG. 38 depicts a possible configuration of the embodiment of the cascade assembly 508 of FIGS. 36 and 37. FIG. 38 depicts the cascade assembly 508 in a radially lowered configuration. For example, the cascade assembly 508 as shown may be lowered in the radial direction R into airflow within the turbofan engine, e.g. the bypass airflow passage 56 (see FIG. 1). Lowering of the cascade assembly 508 may be achieved by translating and/or rotating the cascade assembly 508. For example, the cascade assembly 508 may be translated relative to the first nacelle component 504 and/or may be rotated relative to the airflow direction F. As depicted, the cascade assembly 508 is provided on a cascade support 513 configured to support and/or control individual ones of the cascade segments 510 and/or cascade members 509. As depicted, the cascade support 513 is configured to pivot at or near the aft end of a first nacelle component 504 or the fan cowl. The cascade support 513 may also provide support and/or control for other features such as the cascade actuation assembly (see FIGS. 8-18) and/or the blocker assembly 511.

As further shown in FIG. 38, a third radial extent R3 is defined as a result of the radially lowered configuration of the cascade assembly 508. The third radial extent R3 may differ from the second radial extent R2 (FIG. 37). For example, some embodiments of the cascade assembly 508 may be configured such that the third radial extent R3 is greater than the second radial extent R2.

The cascade support 513 depicted in schematic form in FIGS. 36-38 is also representative of a longitudinal centerline 512 of the cascade assembly 508. The longitudinal centerline 512 of the cascade assembly 508 may represent or approximate a line of symmetry of the cascade assembly 508 from a forward end 524 to an aft end 526 of the cascade assembly 508. For example, the longitudinal centerline 512 of the cascade assembly 508 may be a line defined such that the cascade assembly 508 extends perpendicular to its longitudinal centerline 512 in approximately equal measure on opposing sides of the longitudinal centerline 512 at the forward end 524 and the aft end 526 of the cascade assembly. In an embodiment, the cascade assembly 508 extends perpendicular to its longitudinal centerline 512 in approximately equal measure on opposing sides of the longitudinal centerline 512 along its entirety from its forward end 524 to its aft end 526.

The longitudinal centerline 512 of the cascade assembly 508 may be used to define a thickness of the cascade assembly 508 at one or more positions. As depicted in FIG. 36, a first cascade thickness T1 is defined with the plurality of cascade members 509 in the stowed configuration within a nacelle assembly 550. This first cascade thickness T1 as depicted is measured as the maximum perpendicular extent, relative to the longitudinal centerline 512 of the cascade assembly 508, of the cascade segment 510, or one or more of a cascade member 509 which may form the cascade segment 510, associated with a second axial position A2.

As shown in FIG. 37, a second cascade thickness T2 may be measured as the maximum perpendicular extent, relative to the longitudinal centerline 512 of the cascade assembly 508, of the cascade segment 510, or one or more of a cascade member 509 which form the cascade segment 510, associated with the second axial position A2. It should be understood that comparing the first cascade thickness T1 in the stowed configuration of FIG. 36 to the second cascade thickness T2 in the deployed configuration of FIG. 37 can produce a relative change in cascade thickness between the stowed and deployed configurations of the cascade assembly 508.

It should be understood that the first cascade thickness T1 and the second cascade thickness T2 may generally correlate to the first radial extent R1 and the second radial extent R2. As with the first and second radial extents R1, R2, the first and second cascade thicknesses T1, T2 may be related to the nacelle thickness N. For example, the first cascade thickness T1 may be less than the nacelle thickness N and the second cascade thickness T2 may be greater than the nacelle thickness N.

With reference again to FIG. 38, the second cascade thickness T2 may still be used to describe the thickness of a given cascade segment 510 relative to the longitudinal centerline 512 of the cascade assembly 508. It should be appreciated that this measurement of first and second cascade thicknesses T1, T2 does not change solely on tilt or angling of the cascade assembly 508 as it is taken relative to the longitudinal centerline 512 of the cascade assembly 508 and not the longitudinal centerline 12 of the turbofan engine 10 as described with reference to FIG. 1.

The embodiments shown in FIGS. 36-38 depict cascade segments 510 having a plurality of aerodynamic surfaces each formed by individual cascade members 509. One or more of the depicted cascade segments 510 can be configured as a high lift type aerodynamic feature to provide enhanced control of airflow through the cascade assembly 508. For example, cascade segments 510 can be designed as or to include slats, slots, flaps cuffs, fences, and/or vortex generators. It should be understood that providing a plurality of cascade members 509 in a given cascade segment 510 provides the opportunity for managing aerodynamic discontinuities to create desired flow properties such as increased lift, reduced drag, and/or increased flow redirection.

Figures 39, 40:
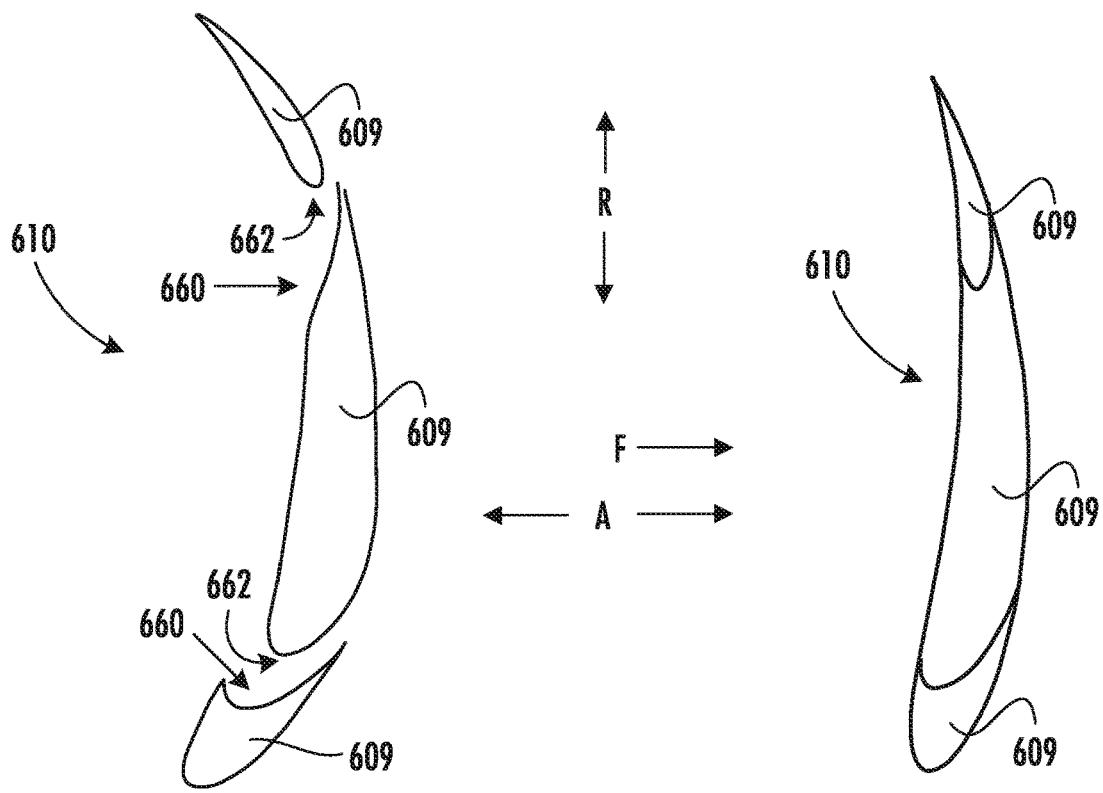
FIG. 39 is a schematic, side view of a plurality of cascade members in an expanded configuration.
FIG. 40 is a schematic, side view of the plurality of cascade members of FIG. 39 in a nested configuration.
Figure 41:
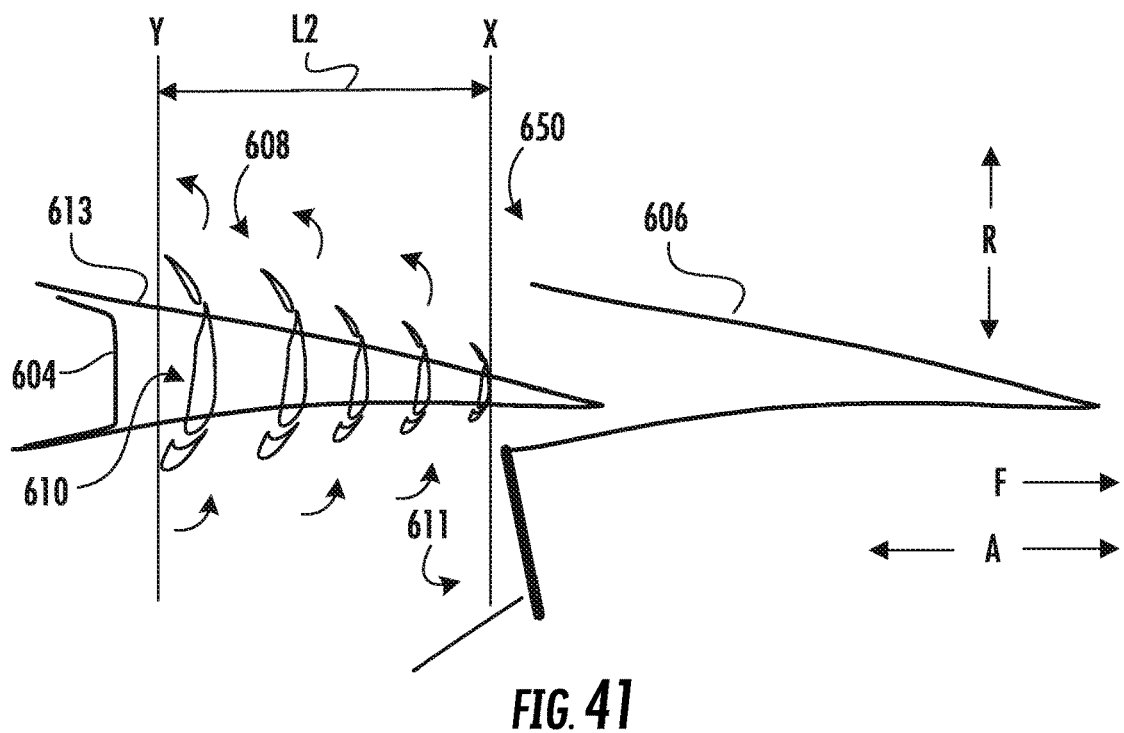
FIG. 41 is a schematic, side view of a cascade assembly in a deployed configuration, the cascade assembly having a plurality of cascade members as in FIGS. 39 and 40.

Turning now to FIG. 39, a schematic view of a plurality of cascade members 609 is depicted in an expanded configuration. The expanded configuration depicted may generally correspond with a deployed configuration of a cascade assembly 608 as shown in FIG. 41 and described below. The plurality of three cascade members 609 cooperate together to form a cascade segment 610. It should be understood that any number of cascade members 609 may cooperate or align to form the cascade segment 610, such as one, two, three, four, five, six, or more cascade members 609.

The expanded cascade members 609 may include one or more nesting features such as depicted first nesting features 660 and second nesting features 662 complementary to the first nesting features 660. The first nesting features 660 may be sized and shaped so as to nest, stow, or collapse compactly with appropriately sized and shaped second nesting features 662. It should be appreciated that various configurations of complementary first and second nesting features 660, 662 can be provided, and that the design of these nesting features may also be tuned for aerodynamic suitability. For example, features may be added to avoid turbulent flow and/or to provide damping.

Turning now to FIG. 40, a schematic view of the plurality of cascade members 609 shown in FIG. 39 is depicted in a nested configuration. The nested configuration depicted may generally correspond with a stowed configuration of the cascade members 609 as shown and described with reference to previous embodiments. It should be appreciated that the complementary first and second nesting features 660, 662 facilitate compact stowage of the plurality of cascade members 609, for example within a nacelle assembly 650 in a stowed configuration.

As above, the complementary first and second nesting features 660, 662 can be sized and shaped to reduce dimensions of the nested configuration of the plurality of cascade members 609 by compactly nesting. Exemplary first and second nesting features 660, 662 include a depression corresponding with protrusion, for example as shown in FIG. 39 with generally rounded depression and protrusion configurations. In this configuration, an airfoil of a leading one of the plurality of cascade members 609 can be extended with the first nesting feature 660 while an effective leading edge can be provided with the second nesting feature 662 on the next trailing one of the plurality of cascade members 609. It should also be understood that the cascade segment 610 may have one or more cascade members 609 with one or more first and second nesting features 660, 662 and also one or more cascade members 609 without first and second nesting features 660, 662. As depicted with dashed lines in FIG. 40, it should further be appreciated that various embodiments of the first and second nesting features 660, 662 could be provided, for example to add or remove all or part of a slat cove configuration from one or more of the first and second nesting features 660, 662.

Turning now to FIG. 41, a schematic, side view of the cascade assembly 608 in a deployed configuration is shown, where the cascade assembly has a plurality of cascade members 609 forming cascade segments 610 configured for nesting as in FIGS. 39 and 40. FIG. 41 also depicts a configuration of a cascade support 613, wherein the cascade support 613 may generally conform to available space in the nacelle assembly 650. As shown, a second nacelle component 606 is deployable from a first nacelle component 604 to reveal the cascade support 613 and associated cascade assembly 608 through an opening in the cascade assembly 608 as generally described above. The second nacelle component 606 may be operably connected to a blocker assembly 611 configured to redirect airflow as indicated by the unlabeled arrows. Movement of the second nacelle component 606 may also trigger or otherwise facilitate movement of the plurality of cascade segments 610 into the deployed configuration depicted.

Figure 42:
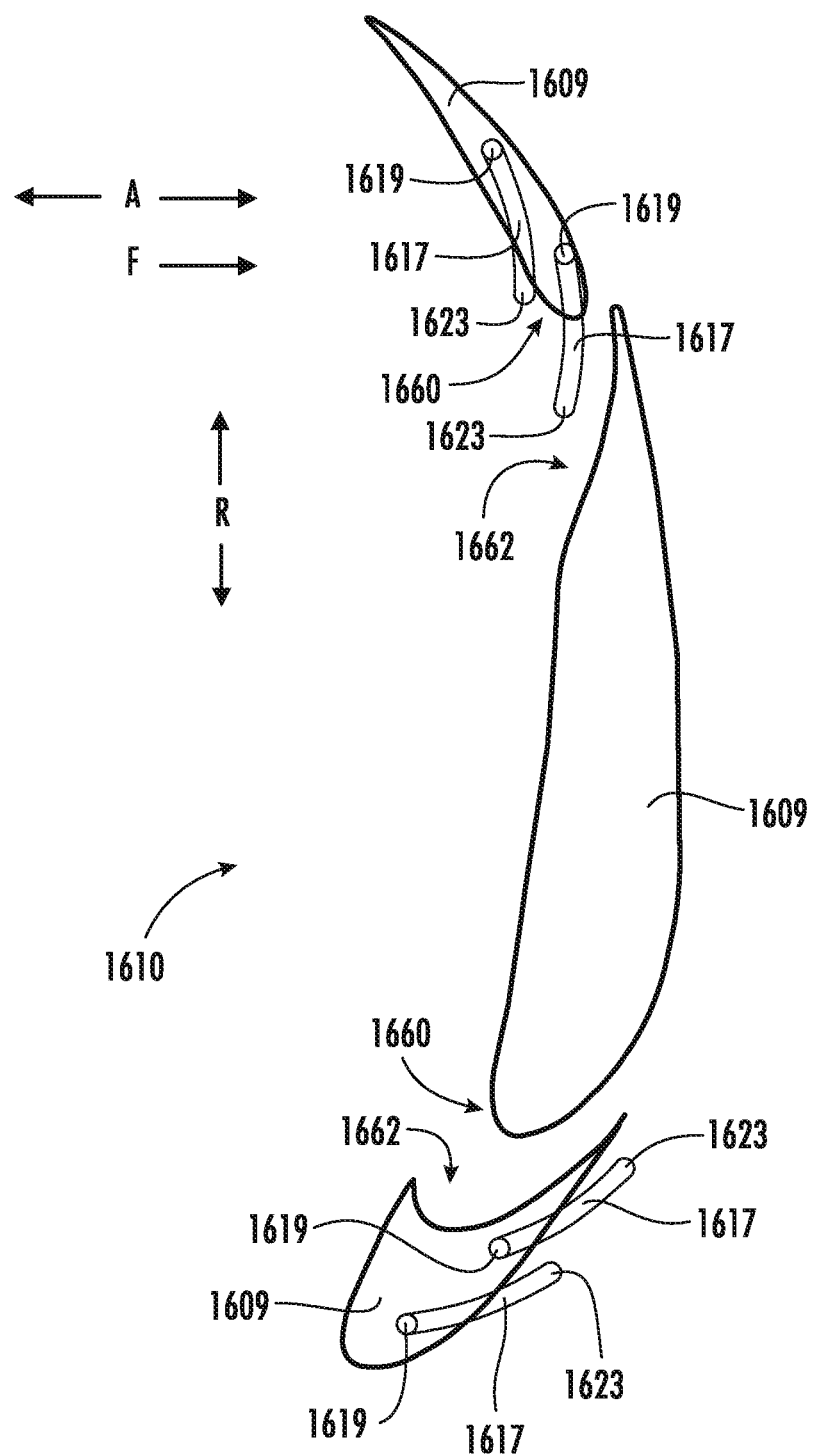
FIG. 42 is a schematic side view of another embodiment of a plurality of cascade members.

Turning now to FIG. 42, further embodiments of a cascade segment 1610 may be provided for use in a cascade assembly 608 as in FIG. 41. FIG. 42 depicts an exemplary embodiment of a cascade segment 1610 including a plurality of actuation tracks 1617 configured to facilitate relative movement between a plurality of cascade members 1609. The depicted embodiment provides pairs, which may be disposed parallel one another, of actuation tracks 1617 to control movement of lower and upper cascade members 1609. Various other embodiments may provide fewer or greater numbers of actuation tracks 1617. The actuation tracks 1617 may be anchored to a cascade support, such as the cascade support 113 as described with reference to FIGS. 5 and 6, or may be anchored to another, for example a central, one of the cascade members 1609 as shown in FIG. 42.

The actuation tracks 1617 depicted in FIG. 42 are each configured to control at least one corresponding actuation constraint 1619. As shown, each of the actuation constraints 1619 is contained at a first extreme position corresponding to the deployed configuration of FIG. 42 where first nesting features 1660 are spaced apart from corresponding second nesting features 1662. A second position 1623 is also provided for each of the actuation constraints 1619, the second position 1623 corresponding to a stowed configuration where the first nesting features 1660 are adjacent to, and in some embodiments abutting, the corresponding second nesting features 1662. The embodiment of FIG. 42 may represent a second deployed configuration beyond the deployed configuration of FIG. 18, and it should be appreciated that these configurations and features may optionally be combined.

Figure 43:
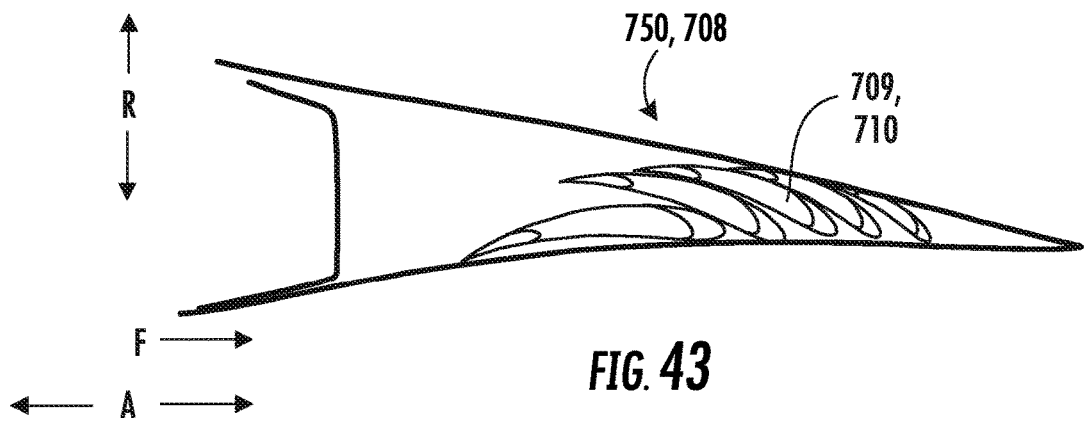
FIG. 43 is a schematic, side view of the cascade assembly as in FIG. 41 in a stowed configuration according to a first embodiment.
Figure 44:
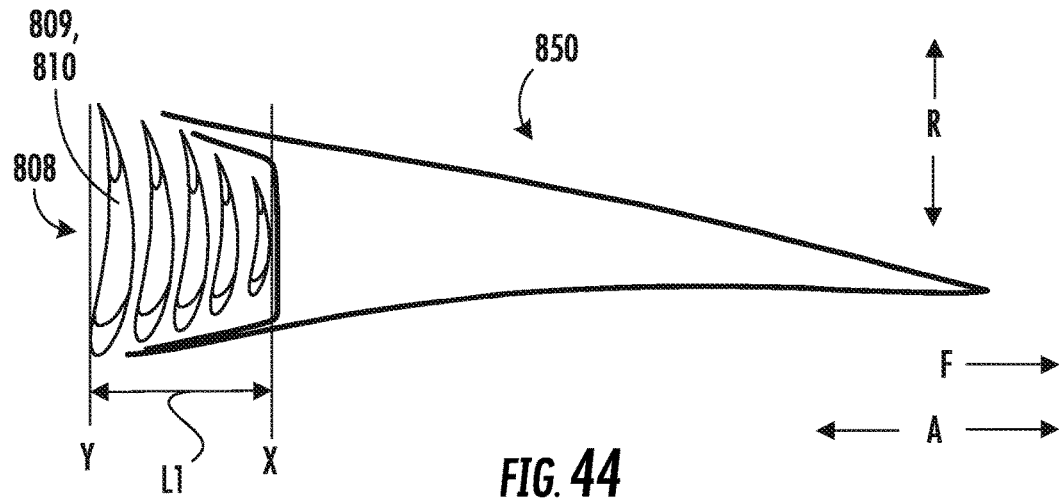
FIG. 44 is a schematic, side view of the cascade assembly as in FIG. 41 in a stowed configuration according to a second embodiment.
Figure 45:
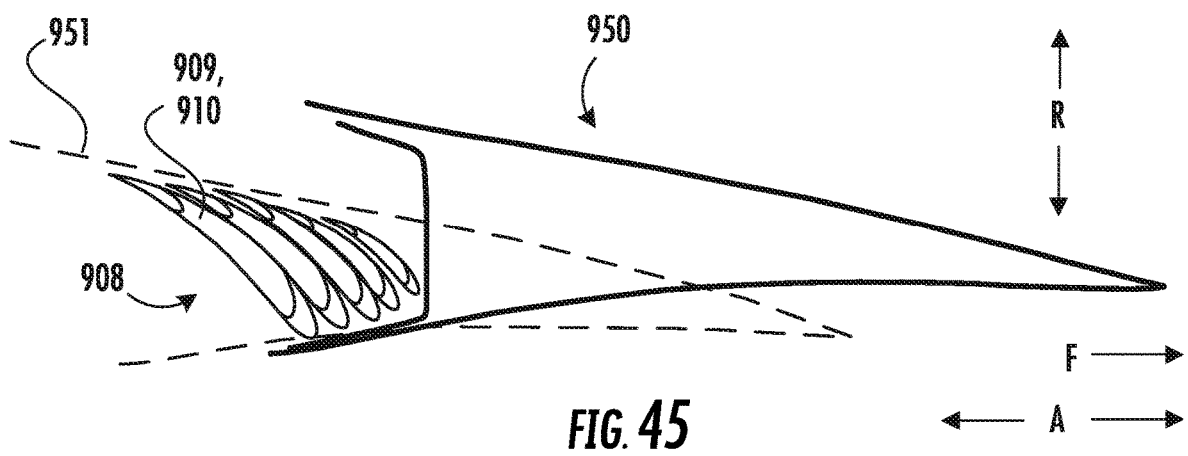
FIG. 45 is a schematic, side view of the cascade assembly as in FIG. 41 in a stowed configuration according to a third embodiment.

FIGS. 43, 44, and 45 depict exemplary embodiments employing a cascade segment, for example the cascade segment 610 according to the embodiments of FIGS. 39-42. However, it should be appreciated that the configurations of FIGS. 43, 44, and 45 could also be applied to any of the other described embodiments of cascade segments 110, 210, 310, 410, 510, 610 described herein. Accordingly, reference will be made to FIGS. 43, 44, and 45 using a generic configuration of an exemplary cascade segment, such as the cascade segment 610, with the understanding that any configuration of cascade segment or other related feature may be employed as well.

FIG. 43 is a schematic, side view of a cascade assembly 708 as in FIG. 41 in a stowed configuration according to a first embodiment. In this first embodiment, a plurality of cascade segments 710 is depicted in the stowed configuration and also in the nested configuration. As depicted, the plurality of cascade segments 710 is configured generally in the axial position of the cascade assembly 708 in a deployed configuration. A relatively compact configuration of a nacelle assembly 750 can be achieved by one or more techniques as described above, for example rotation and nesting of a plurality of cascade members 709.

FIG. 44 depicts a second embodiment that differs from the embodiment in FIG. 43 in that a plurality of cascade members 809 or cascade segments 810 of a cascade assembly 808 are not rotated, but are axially translated in the stowed configuration as described with reference to FIGS. 3 and 4. According to this embodiment, the plurality of cascade members 809 may still be nested in groups according to corresponding cascade segments 810. By axially translating the cascade assembly 808 as described above, a nacelle assembly 850 may still be advantageously configured by reducing a radial dimension of the nacelle assembly 850 near a trailing edge of the nacelle assembly 850.

From FIG. 44 it should be appreciated that an axial dimension of the cascade assembly 808 may also be defined. For example, the plurality of cascade members 809 can define an aft end X and a forward end Y in both the stowed and deployed configurations. FIG. 44 depicts a stowed configuration as described above, where the aft end X and the forward end Y define a first end-to-end distance L1. In comparison, FIG. 41 depicts a related deployed configuration where the aft end X and the forward end Y define a second end-to-end distance L2. As should be appreciated, moving from the stowed configuration of FIG. 44 to the deployed configuration of FIG. 41 can result in an increased second end-to-end distance L2. Various actuation mechanisms, such as those described with reference to FIGS. 8-18 may be employed to increase end-to-end distance, for example from the first end-to-end distance L1 to the second end-to-end distance L2 when moving from the stowed configuration to the deployed configuration. In this manner, such an axially expanding configuration of the cascade assembly 808 may further decrease size requirements of the nacelle assembly 850.

FIG. 45 depicts a third embodiment that differs from the embodiments in FIGS. 43 and 44 in that a plurality of cascade members 909 or cascade segments 910 of a cascade assembly 908 are rotated and axially translated in the stowed configuration relative to their respective positions in the deployed configuration. As depicted with a dashed nacelle boundary line 951, the configuration of FIG. 45 may further increase the possible compactness of a nacelle assembly 950 configured to cover the cascade assembly 908 in the stowed configuration.

Figure 46:
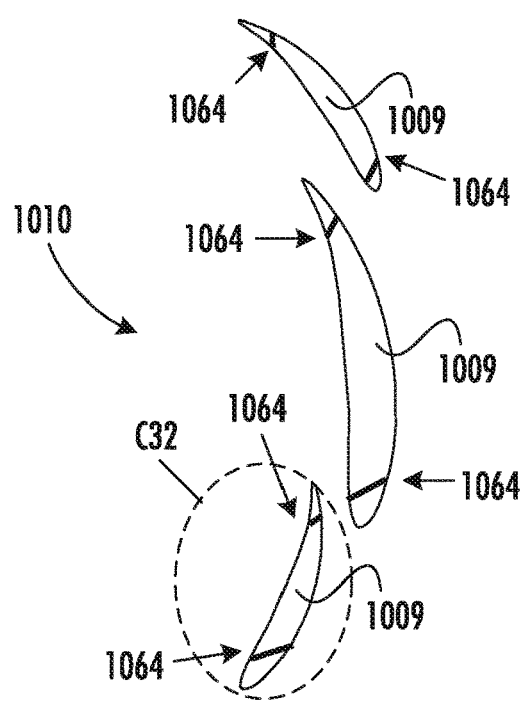
FIG. 46 is a schematic, side view of a plurality of cascade members in an expanded configuration according to another embodiment.

Turning now to FIG. 46, an embodiment of a plurality of cascade members 1009 aligned to form a cascade segment 1010 in a deployed configuration of a corresponding cascade assembly (not shown) is depicted. The embodiment of FIG. 46 differs from previous embodiments in that one or more flow control features 1064 are provided on, in, or defined by at least one of the cascade members 1009. The flow control features 1064 may further aid aerodynamic interaction between adjacent cascade members 1009 of the cascade segment 1010 as described above. For example, allowing controlled flow through a plurality of through holes defining flow control features 1064 in a leading one of the cascade members 1009 may facilitate flow adhesion and reduce the chance of flow separation in use.

Figure 47:
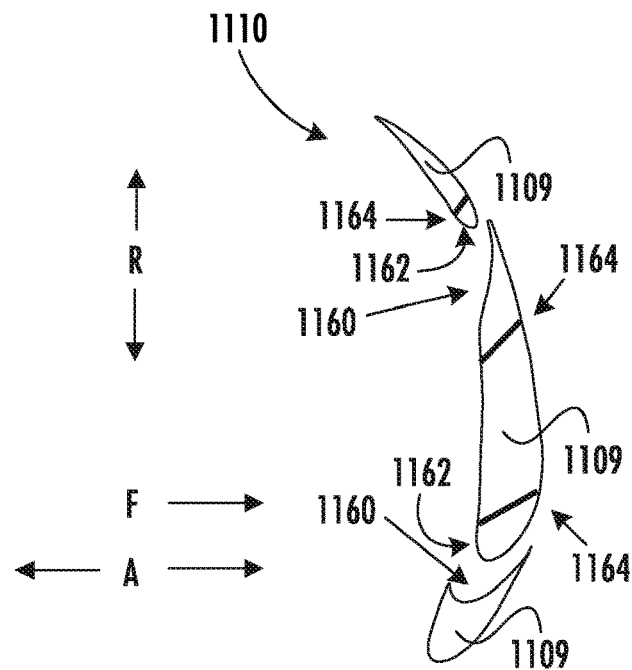
FIG. 47 is a schematic, side view of a plurality of cascade members in an expanded configuration according to yet another embodiment.

Turning now to FIG. 47, an embodiment of a plurality of cascade members 1109 aligned to form a cascade segment 1110 in a deployed configuration of a corresponding cascade assembly (not shown) is depicted. The embodiment of FIG. 47 differs from that in FIG. 46 in that corresponding first and second nesting features 1160, 1162 are provided as generally described with reference to FIGS. 39 and 40 above. The corresponding first and second nesting features 1160, 1162 may further be configured to interact with one or more flow control features 1164 aerodynamically. For example, the one or more flow control features 1164 may be configured to control flow around the nesting features 1160, 1162 to facilitate flow adhesion, reduce drag, and/or increase lift.

Figure 48:
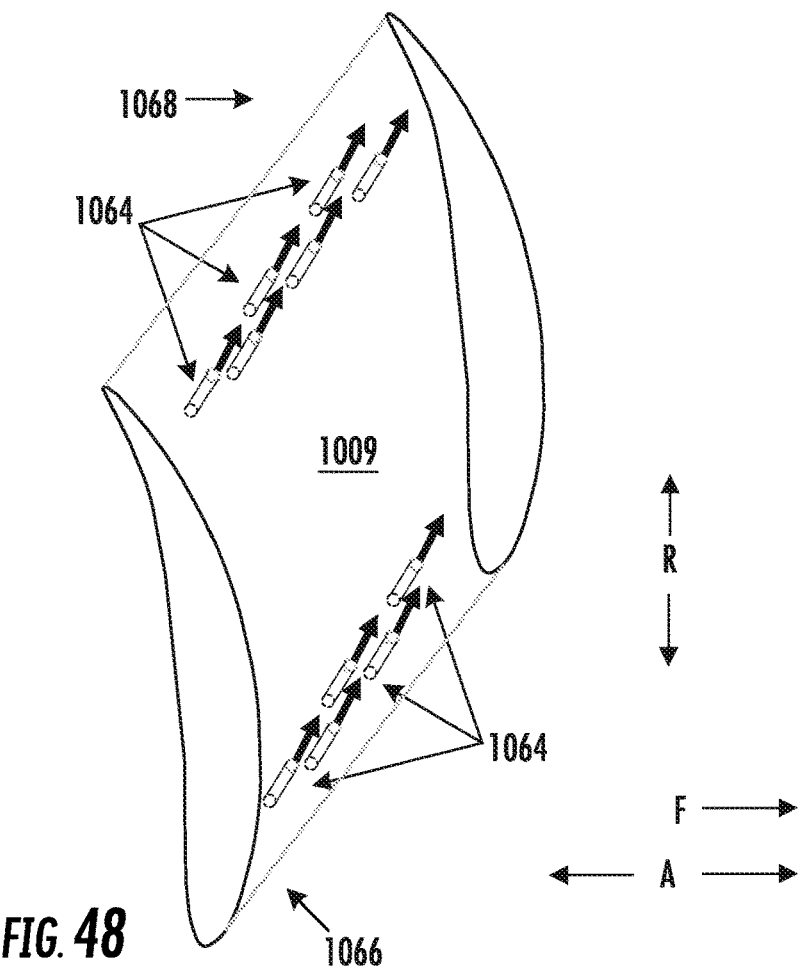
FIG. 48 is a close-up, schematic, perspective view of one of the plurality of cascade members of FIG. 46.

FIG. 48 is a close up isometric view of a cascade member 1009 of FIG. 46 as depicted in circle C32 of FIG. 46. However, it should be understood that the flow control features 1064 as described with reference to the embodiment of FIG. 46 could be employed in other embodiments described herein. As depicted, a plurality of flow control features 1064 is provided at a leading edge 1066 of the cascade member 1009 and another plurality of flow control features 1064 is provided at a trailing edge 1068 of the cascade member 1009. As described above, the flow control features 1064 may be passive features to enhance flow control and provide high lift separated flow control. Various pitched and/or yawed jets may be employed as flow control features 1064. It should be understood that the flow control features 1064 may be individually tailored for a given position to avoid flow separation, increase aerodynamic loading capabilities, and/or increase thrust reverse flow turning. Relatively complex configurations of flow control features 1064 may be provided using advanced and/or additive manufacturing techniques as described above.

This written description uses examples to disclose the preferred embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects are provided by the subject matter of the following clauses:

A cascade thrust reverser assembly for a turbofan engine, the turbofan engine comprising a nacelle assembly defining a bypass passage, the cascade thrust reverser assembly comprising: at least one cascade assembly configured to be at least partially enclosed by the nacelle assembly, the cascade assembly comprising a plurality of cascade segments; and an actuation assembly operably connected to the plurality of cascade segments, wherein the actuation assembly is configured to: increase an axial extent of the cascade assembly; and rotate the plurality of cascade segments.

The cascade thrust reverser assembly of any preceding clause, wherein the actuation assembly comprises a rotational guide, the rotational guide configured to control at least one of the plurality of cascade segments between a minimum segment rotation and a maximum segment rotation.

The cascade thrust reverser assembly of any preceding clause, wherein at least one of the plurality of cascade segments comprises a plurality of cascade members, and wherein the rotational guide is configured to increase a linear extent of the plurality of cascade members when moving from the minimum segment rotation to the maximum segment rotation.

The cascade thrust reverser assembly of any preceding clause, wherein the at least one of the plurality of cascade segments further comprises a segment biasing member, wherein the segment biasing member is configured to decrease the linear extent of the plurality of cascade members.

The cascade thrust reverser assembly of any preceding clause, wherein the at least one of the plurality of cascade segments comprises a leading member, a trailing member, and an intermediate member, wherein the segment biasing member comprises a spring anchored to the leading member and to the trailing member.

The cascade thrust reverser assembly of any preceding clause, wherein the spring is configured to conform to the intermediate member.

The cascade thrust reverser assembly of any preceding clause, wherein the at least one cascade assembly comprises a plurality of cascade assemblies circumferentially spaced apart from one another.

The cascade thrust reverser assembly of any preceding clause, further comprising a plurality of linear guides disposed between the plurality of cascade assemblies.

The cascade thrust reverser assembly of the preceding clause, wherein the actuation assembly comprises a linear actuator, wherein movement of the linear actuator in a first direction increases the axial extent of the cascade assembly and rotates the plurality of cascade segments.

The cascade thrust reverser assembly of any preceding clause, wherein the actuation assembly further comprises a rotational actuator, wherein force generated by the linear actuator causes the rotational actuator to rotate the plurality of cascade segments.

The cascade thrust reverser assembly of any preceding clause, wherein the actuation assembly further comprises a linear stop, the linear stop sized and shaped to impinge the rotational actuator, causing the rotational actuator to rotate the plurality of cascade segments.

The cascade thrust reverser assembly of any preceding clause, wherein the actuation assembly is configured such that the linear stop impinges the rotational actuator proximate a maximum travel of the linear actuator in the first direction.

The cascade thrust reverser assembly of any preceding clause, further comprising a cascade cover, wherein movement of the linear actuator in the first direction moves the cascade cover from a closed position to an open position.

The cascade thrust reverser assembly of any preceding clause, further comprising: at least one linear biasing member configured to control the axial extent of the cascade assembly; and at least one rotational biasing member configured to control rotation of the plurality of cascade segments.

The cascade thrust reverser assembly of any preceding clause, further comprising: an upper path; a lower path; a plurality of upper bearings operably connected with corresponding ones of the plurality of cascade segments and movable along the upper path; and a plurality of lower bearings operably connected with corresponding ones of the plurality of cascade segments and movable along the lower path, wherein the at least one linear biasing member is configured to maintain a relative position between the plurality of upper bearings and the plurality of lower bearings, and wherein the at least one rotational biasing member is configured to facilitate relative movement between the plurality of upper bearings and the plurality of lower bearings.

The cascade thrust reverser assembly of any preceding clause, wherein the at least one linear biasing member comprises: a plurality of upper linear biasing members disposed between the plurality of upper bearings; and a plurality of lower linear biasing members disposed between the plurality of lower bearings.

The cascade thrust reverser assembly of any preceding clause, wherein the at least one rotational biasing member is operably connected to the plurality of upper bearings or to the plurality of lower bearings.

The cascade thrust reverser assembly of any preceding clause, wherein the plurality of upper bearings is configured to travel a greater linear distance on the upper path than the plurality of lower bearings on the lower path.

The cascade thrust reverser assembly of any preceding clause, wherein at least one of the plurality of cascade segments comprises a plurality of cascade members and a segment biasing member, wherein the segment biasing member is configured to decrease a linear extent of the plurality of cascade members, and wherein a segment biasing force of the segment biasing member opposes a linear biasing force of the at least one linear biasing member and a rotational biasing force of the at least one rotational biasing member.

A turbofan engine comprising a cascade thrust reverser assembly, the turbofan engine comprising a nacelle assembly defining a bypass passage, the cascade thrust reverser assembly comprising: at least one cascade assembly configured to be at least partially enclosed by the nacelle assembly, the cascade assembly comprising a plurality of cascade segments; and an actuation assembly operably connected to the plurality of cascade segments, wherein the actuation assembly is configured to: increase an axial extent of the cascade assembly; and rotate the plurality of cascade segments.

The turbofan engine of any preceding clause, wherein the actuation assembly comprises a rotational guide, the rotational guide configured to control at least one of the plurality of cascade segments between a minimum segment rotation and a maximum segment rotation.

The turbofan engine of any preceding clause, wherein at least one of the plurality of cascade segments comprises a plurality of cascade members, and wherein the rotational guide is configured to increase a linear extent of the plurality of cascade members when moving from the minimum segment rotation to the maximum segment rotation.

The turbofan engine of any preceding clause, wherein the at least one of the plurality of cascade segments further comprises a segment biasing member, wherein the segment biasing member is configured to decrease the linear extent of the plurality of cascade members.

The turbofan engine of any preceding clause, wherein the at least one of the plurality of cascade segments comprises a leading member, a trailing member, and an intermediate member, wherein the segment biasing member comprises a spring anchored to the leading member and to the trailing member.

The turbofan engine of any preceding clause, wherein the spring is configured to conform to the intermediate member.

The turbofan engine of any preceding clause, wherein the at least one cascade assembly comprises a plurality of cascade assemblies circumferentially spaced apart from one another.

The turbofan engine of any preceding clause, further comprising a plurality of linear guides disposed between the plurality of cascade assemblies.

The turbofan engine of the preceding clause, wherein the actuation assembly comprises a linear actuator, wherein movement of the linear actuator in a first direction increases the axial extent of the cascade assembly and rotates the plurality of cascade segments.

The turbofan engine of any preceding clause, wherein the actuation assembly further comprises a rotational actuator, wherein force generated by the linear actuator causes the rotational actuator to rotate the plurality of cascade segments.

The turbofan engine of any preceding clause, wherein the actuation assembly further comprises a linear stop, the linear stop sized and shaped to impinge the rotational actuator, causing the rotational actuator to rotate the plurality of cascade segments.

The turbofan engine of any preceding clause, wherein the actuation assembly is configured such that the linear stop impinges the rotational actuator proximate a maximum travel of the linear actuator in the first direction.

The turbofan engine of any preceding clause, further comprising a cascade cover, wherein movement of the linear actuator in the first direction moves the cascade cover from a closed position to an open position.

The turbofan engine of any preceding clause, further comprising: at least one linear biasing member configured to control the axial extent of the cascade assembly; and at least one rotational biasing member configured to control rotation of the plurality of cascade segments.

The turbofan engine of any preceding clause, further comprising: an upper path; a lower path; a plurality of upper bearings operably connected with corresponding ones of the plurality of cascade segments and movable along the upper path; and a plurality of lower bearings operably connected with corresponding ones of the plurality of cascade segments and movable along the lower path, wherein the at least one linear biasing member is configured to maintain a relative position between the plurality of upper bearings and the plurality of lower bearings, and wherein the at least one rotational biasing member is configured to facilitate relative movement between the plurality of upper bearings and the plurality of lower bearings.

The turbofan engine of any preceding clause, wherein the at least one linear biasing member comprises: a plurality of upper linear biasing members disposed between the plurality of upper bearings; and a plurality of lower linear biasing members disposed between the plurality of lower bearings.

The turbofan engine of any preceding clause, wherein the at least one rotational biasing member is operably connected to the plurality of upper bearings or to the plurality of lower bearings.

The turbofan engine of any preceding clause, wherein the plurality of upper bearings is configured to travel a greater linear distance on the upper path than the plurality of lower bearings on the lower path.

The turbofan engine of any preceding clause, wherein at least one of the plurality of cascade segments comprises a plurality of cascade members and a segment biasing member, wherein the segment biasing member is configured to decrease a linear extent of the plurality of cascade members, and wherein a segment biasing force of the segment biasing member opposes a linear biasing force of the at least one linear biasing member and a rotational biasing force of the at least one rotational biasing member.

A cascade thrust reverser assembly for a turbofan engine, the turbofan engine comprising a nacelle assembly defining a bypass passage, the cascade thrust reverser assembly comprising: a cascade assembly configured to be at least partially enclosed by the nacelle assembly, the cascade assembly comprising one or more cascade members, the one or more cascade members movable between: a stowed configuration wherein the one or more cascade members define a first radial extent; and a deployed configuration wherein the one or more cascade members define a second radial extent, wherein the one or more cascade members form a cascade segment in the deployed configuration, and wherein the second radial extent is greater than the first radial extent.

The cascade thrust reverser assembly of any preceding clause, wherein the nacelle assembly defines a nacelle thickness in a radial direction at an axial position when the one or more cascade members of the cascade assembly are in the stowed configuration, where the nacelle thickness is less than the second radial extent of the one or more cascade members at the axial position.

The cascade thrust reverser assembly of any preceding clause, wherein the nacelle thickness is greater than the first radial extent of the one or more cascade members.

The cascade thrust reverser assembly of any preceding clause, wherein the cascade assembly defines a forward end and an aft end, wherein a distance between the forward end and the aft end is increased by moving the one or more cascade members from the stowed configuration to the deployed configuration.

The cascade thrust reverser assembly of any preceding clause, wherein at least two cascade members of the one or more cascade members align to form the cascade segment defining the second radial extent.

The cascade thrust reverser assembly of any preceding clause, further comprising: a cascade actuation assembly, wherein the cascade actuation assembly is operably connected to the one or more cascade members and configured to move the one or more cascade members between the stowed configuration and the deployed configuration.

The cascade thrust reverser assembly of any preceding clause, further comprising: a blocker assembly configured to redirect an airflow through the cascade assembly, wherein the cascade actuation assembly is operably connected to the blocker assembly.

The cascade thrust reverser assembly of any preceding clause, wherein the cascade actuation assembly is further configured to rotate the one or more cascade members.

The cascade thrust reverser assembly of any preceding clause, wherein at least one of the one or more cascade members comprises a flow control feature configured to control flow separation across the one or more cascade members.

The cascade thrust reverser assembly of any preceding clause, further comprising: a cascade cover movable between: an open position wherein flow is facilitated through the cascade assembly; and a closed position wherein flow through the cascade assembly is inhibited.

A method of operating a cascade thrust reverser assembly for a turbofan engine, the method comprising: moving one or more cascade members of a cascade assembly from a stowed configuration defining a first radial extent to a deployed configuration defining a second radial extent, wherein the one or more cascade members form a cascade segment in the deployed configuration, and wherein the second radial extent is greater than the first radial extent; and flowing air across the one or more cascade members in the deployed configuration.

The method of the preceding clause, wherein the method further comprises: moving a cascade cover between an open position wherein flow is facilitated through the cascade assembly and a closed position wherein flow through the cascade assembly is inhibited.

The method of any preceding clause, wherein the cascade cover defines a nacelle thickness in a radial direction at an axial position of the cascade assembly, where the nacelle thickness is less than the second radial extent of the cascade segment formed by the one or more cascade members.

The method of any preceding clause, wherein the nacelle thickness is greater than the first radial extent of the one or more cascade members.

The method of one of the previous clauses, further comprising: aligning at least two cascade members of the one or more cascade members to form the cascade segment and define the second radial extent.

The method of any preceding clause, further comprising: actuating a cascade actuation assembly operably connected to the cascade assembly, wherein actuating the cascade actuation assembly moves the one or more cascade members of the cascade assembly forming the cascade segment from the stowed configuration to the deployed configuration.

The method of any preceding clause, further comprising: moving, by actuating the cascade actuation assembly, a blocker assembly; and redirecting airflow, with the blocker assembly, through the cascade assembly.

The method of any preceding clause, further comprising: rotating, by actuating of the cascade actuation assembly, the one or more cascade members of the cascade assembly forming the cascade segment.

A turbofan engine comprising a cascade thrust reverser assembly, the turbofan engine comprising: a cascade assembly comprising one or more cascade members, the one or more cascade members movable between: a stowed configuration wherein the one or more cascade members define a first radial extent; and a deployed configuration wherein the one or more cascade members define a second radial extent, wherein the one or more cascade members form a cascade segment in the deployed configuration, and wherein the second radial extent is greater than the first radial extent.

The turbofan engine of the preceding clause, further comprising: a turbomachine; a nacelle at least partially surrounding the turbomachine; and a bypass passage defined between the turbomachine and the nacelle, wherein the plurality of cascade members is configured to facilitate flow from the bypass passage across the cascade assembly in the deployed configuration.

We claim:

1. A cascade thrust reverser assembly for a turbofan engine, the turbofan engine comprising a nacelle assembly defining a bypass passage, the cascade thrust reverser assembly comprising:
    at least one cascade assembly configured to be at least partially enclosed by the nacelle assembly, the cascade assembly comprising a plurality of cascade segments;
    an actuation assembly operably connected to the plurality of cascade segments, wherein the actuation assembly is configured to:
    increase an axial extent of the cascade assembly; and rotate the plurality of cascade segments;
    at least one linear biasing member configured to control the axial extent of the cascade assembly; and
    at least one rotational biasing member configured to control rotation of the plurality of cascade segments.

2. The cascade thrust reverser assembly of claim 1, wherein the actuation assembly comprises a rotational guide, the rotational guide configured to control at least one of the plurality of cascade segments between a minimum segment rotation and a maximum segment rotation.

3. The cascade thrust reverser assembly of claim 2, wherein at least one of the plurality of cascade segments comprises a plurality of cascade members, and wherein the rotational guide is configured to increase a linear extent of the plurality of cascade members when moving from the minimum segment rotation to the maximum segment rotation.

4. The cascade thrust reverser assembly of claim 3, wherein the at least one of the plurality of cascade segments further comprises a segment biasing member, wherein the segment biasing member is configured to decrease the linear extent of the plurality of cascade members.

5. The cascade thrust reverser assembly of claim 4, wherein the at least one of the plurality of cascade segments comprises a leading member, a trailing member, and an intermediate member, wherein the segment biasing member comprises a spring anchored to the leading member and to the trailing member.

6. The cascade thrust reverser assembly of claim 5, wherein the spring is configured to conform to the intermediate member.

7. The cascade thrust reverser assembly of claim 5, further comprising a plurality of linear guides disposed between the plurality of cascade assemblies.

8. The cascade thrust reverser assembly of claim 1, wherein the at least one cascade assembly comprises a plurality of cascade assemblies circumferentially spaced apart from one another.

9. The cascade thrust reverser assembly of claim 1, wherein the actuation assembly comprises a linear actuator, wherein movement of the linear actuator in a first direction increases the axial extent of the cascade assembly and rotates the plurality of cascade segments.

10. The cascade thrust reverser assembly of claim 9, further comprising a cascade cover, wherein movement of the linear actuator in the first direction moves the cascade cover from a closed position to an open position.

11. The cascade thrust reverser assembly of claim 9, wherein the actuation assembly further comprises a rotational actuator, wherein force generated by the linear actuator causes the rotational actuator to rotate the plurality of cascade segments.

12. The cascade thrust reverser assembly of claim 11, wherein the actuation assembly further comprises a linear stop, the linear stop sized and shaped to impinge the rotational actuator, causing the rotational actuator to rotate the plurality of cascade segments.

13. The cascade thrust reverser assembly of claim 12, wherein the actuation assembly is configured such that the linear stop impinges the rotational actuator proximate a maximum travel of the linear actuator in the first direction.

14. The cascade thrust reverser assembly of claim 1, wherein at least one of the plurality of cascade segments comprises a plurality of cascade members and a segment biasing member, wherein the segment biasing member is configured to decrease a linear extent of the plurality of cascade members, and wherein a segment biasing force of the segment biasing member opposes a linear biasing force of the at least one linear biasing member and a rotational biasing force of the at least one rotational biasing member.

15. The cascade thrust reverser assembly of claim 1, further comprising:
an upper path;
a lower path;
a plurality of upper bearings operably connected with corresponding ones of the plurality of cascade segments and movable along the upper path; and
a plurality of lower bearings operably connected with corresponding ones of the plurality of cascade segments and movable along the lower path, wherein the at least one linear biasing member is configured to maintain a relative position between the plurality of upper bearings and the plurality of lower bearings, and wherein the at least one rotational biasing member is configured to facilitate relative movement between the plurality of upper bearings and the plurality of lower bearings.

16. The cascade thrust reverser assembly of claim 15, wherein the at least one linear biasing member comprises:
a plurality of upper linear biasing members disposed between the plurality of upper bearings; and
a plurality of lower linear biasing members disposed between the plurality of lower bearings.

17. The cascade thrust reverser assembly of claim 16, wherein the at least one rotational biasing member is operably connected to the plurality of upper bearings or to the plurality of lower bearings.

18. The cascade thrust reverser assembly of claim 15, wherein the plurality of upper bearings is configured to travel a greater linear distance on the upper path than the plurality of lower bearings on the lower path.

19. A cascade thrust reverser assembly for a turbofan engine, the turbofan engine comprising a nacelle assembly defining a bypass passage, the cascade thrust reverser assembly comprising:
at least one cascade assembly configured to be at least partially enclosed by the nacelle assembly, the cascade assembly comprising a plurality of cascade segments; and
an actuation assembly operably connected to the plurality of cascade segments, wherein the actuation assembly is configured to:
increase an axial extent of the cascade assembly; and
rotate the plurality of cascade segments;
wherein the actuation assembly comprises a linear actuator, wherein movement of the linear actuator in a first direction increases the axial extent of the cascade assembly and rotates the plurality of cascade segments; and
wherein the actuation assembly further comprises a rotational actuator, wherein force generated by the linear actuator causes the rotational actuator to rotate the plurality of cascade segments.

20. A cascade thrust reverser assembly for a turbofan engine, the turbofan engine comprising a nacelle assembly defining a bypass passage, the cascade thrust reverser assembly comprising:
at least one cascade assembly configured to be at least partially enclosed by the nacelle assembly, the cascade assembly comprising a plurality of cascade segments; and
an actuation assembly operably connected to the plurality of cascade segments, wherein the actuation assembly is configured to:
increase an axial extent of the cascade assembly; and
rotate the plurality of cascade segments;
wherein the actuation assembly comprises a rotational guide, the rotational guide configured to control at least one of the plurality of cascade segments between a minimum segment rotation and a maximum segment rotation;
wherein at least one of the plurality of cascade segments comprises a plurality of cascade members, and wherein the rotational guide is configured to increase a linear extent of the plurality of cascade members when moving from the minimum segment rotation to the maximum segment rotation;
wherein the at least one of the plurality of cascade segments further comprises a segment biasing member, wherein the segment biasing member is configured to decrease the linear extent of the plurality of cascade members; and
wherein the at least one of the plurality of cascade segments comprises a leading member, a trailing member, and an intermediate member, wherein the segment biasing member comprises a spring anchored to the leading member and to the trailing member.

* * * * *